US005654246A

United States Patent [19]
Newkirk et al.

[11] Patent Number: 5,654,246
[45] Date of Patent: Aug. 5, 1997

[54] METHODS OF MAKING COMPOSITE CERAMIC ARTICLES HAVING EMBEDDED FILLER

[75] Inventors: Marc Stevens Newkirk, Newark, Del.; Harry Richard Zwicker, Glen Mills, Pa.; Andrew Willard Urquhart, Newark; John Peter Biel, New Castle, both of Del.; Jack Andrew Kuszyk, Lincoln University, Pa.; Craig Barlow Shumaker, Newark, Del.; Harold Daniel Lesher, Wilmington, Del.; Terry Dennis Claar, Newark, Del.; Michael Kevork Aghajanian, Newark, Del.

[73] Assignee: Lanxide Technology Company, LP, Newark, Del.

[21] Appl. No.: 451,581

[22] Filed: May 26, 1995

Related U.S. Application Data

[63] Continuation-in-part of Ser. No. 7,387, Jan. 21, 1993, Pat. No. 5,420,095, which is a continuation of Ser. No. 811,895, Dec. 20, 1991, abandoned, which is a continuation of Ser. No. 443,733, Nov. 30, 1989, abandoned, which is a continuation-in-part of Ser. No. 415,180, Sep. 29, 1989, abandoned, and a division of Ser. No. 265,835, Nov. 1, 1988, Pat. No. 4,916,113, which is a continuation of Ser. No. 819,397, Jan. 17, 1986, Pat. No. 4,851,375, which is a continuation-in-part of Ser. No. 697,876, Feb. 4, 1985, abandoned.

[51] Int. Cl.$^6$ ................................................. C04B 38/00
[52] U.S. Cl. ..................................... 501/80; 501/97.2
[58] Field of Search ......................... 501/98, 97, 80

[56] References Cited

U.S. PATENT DOCUMENTS

| | | | |
|---|---|---|---|
| 1,362,237 | 12/1920 | Ros | 423/618 |
| 2,741,822 | 4/1956 | Udy | 25/157 |
| 3,108,887 | 10/1963 | Lenie | 501/99 X |
| 3,255,027 | 6/1966 | Talsma | 106/65 |
| 3,262,763 | 7/1966 | Bechtold | 501/98 X |
| 3,296,002 | 1/1967 | Hare | 106/40 |
| 3,298,842 | 1/1967 | Seufert | 106/65 |
| 3,408,312 | 10/1968 | Richards et al. | 501/98 X |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,514,271 | 5/1970 | Yates | 501/96 X |
| 3,551,101 | 12/1970 | Matsuo | 423/412 |
| 3,649,310 | 3/1972 | Yates | 501/92 X |
| 3,669,695 | 6/1972 | Iler | 501/96 X |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,354,991 | 10/1982 | Suzuki | 501/89 X |
| 4,478,785 | 10/1984 | Huseby | 501/96 X |
| 4,591,537 | 5/1986 | Aldinger | 501/96 X |
| 4,600,481 | 7/1986 | Sane et al. | 501/98 X |
| 4,851,375 | 7/1989 | Newkirk et al. | 501/88 |
| 4,916,113 | 4/1990 | Newkirk et al. | 501/89 |
| 4,956,137 | 9/1990 | Dwivedi | 264/60 |
| 5,017,533 | 5/1991 | Newkirk et al. | 501/127 |
| 5,051,382 | 9/1991 | Newkirk et al. | 501/98 X |
| 5,106,789 | 4/1992 | Lesher et al. | 501/98 X |
| 5,202,059 | 4/1993 | Kennedy | 252/389.31 |
| 5,420,085 | 5/1995 | Newkirk et al. | 501/98 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |

OTHER PUBLICATIONS

"Oxidation of Molten Aluminum Alloys, Reaction with Refractories"—M. Drouzy and M. Richard—Mar., 1974 Fonderie, France No. 332 pp. 121–128.

"Refractories for Aluminum Alloy Melting Furnaces"—B. Clavaud and V. Jost—Sep., 1980—Lillian Brassinga (from French) Jan., 1985.

"Nitridation Reactions of Molten Al–(Mg, Si) Alloys"—H. Scholz, P. Greil—Journal of Materials Science 26 (1991) 669–677.

"Synthesis of High Purity AlN by Nitridation of Li–Doped Al–Melt"—H. Scholz and P. Griel—Journal of the European Ceramic Society 6(1990) 237–242.

"Reaction Bonding of Aluminum Oxide (RBAO) Composites: Processing, Reaction Mechanisms and Properties"—N. Claussen, S. Wu and D. Holz—Journal of the European Ceramic Society 14 (1994) 97–109.

*Primary Examiner*—Karl Group
*Attorney, Agent, or Firm*—Jeffrey R. Rambers

[57] ABSTRACT

A method of making self-supporting ceramic composite structures having filler embedded therein includes infiltrating a permeable mass of filler with polycrystalline material comprising an oxidation reaction product obtained by oxidation of a parent metal such as aluminum. The self-supporting ceramic composite structure optionally contains therein non-oxidized constituents of the parent metal. The structure is formed by placing a parent metal adjacent to a permeable filler and heating the assembly to melt the parent metal and provide a molten body of parent metal which is contacted with a suitable oxidant. Within a certain temperature region and optionally, aided by one or more dopants in or on the parent metal, molten parent metal will migrate through previously formed oxidation reaction product into contact with the oxidant, causing the oxidation reaction product to grow so as to embed the adjacent filler and provide the composite structure. The parent metal may be provided as a body of metal placed in contact with an exterior surface of the permeable mass. Alternatively, the parent metal may be placed adjacent to the filler material by admixing a plurality of discrete bodies of parent metal (e.g., particulate metal) into the permeable mass. In this embodiment, the growth of oxidation reaction product still embeds the adjacent filler material without substantial change in the size or shape of the permeable mass, but does not result in the creation of voids at the former locations of the bodies of parent metal.

21 Claims, 39 Drawing Sheets

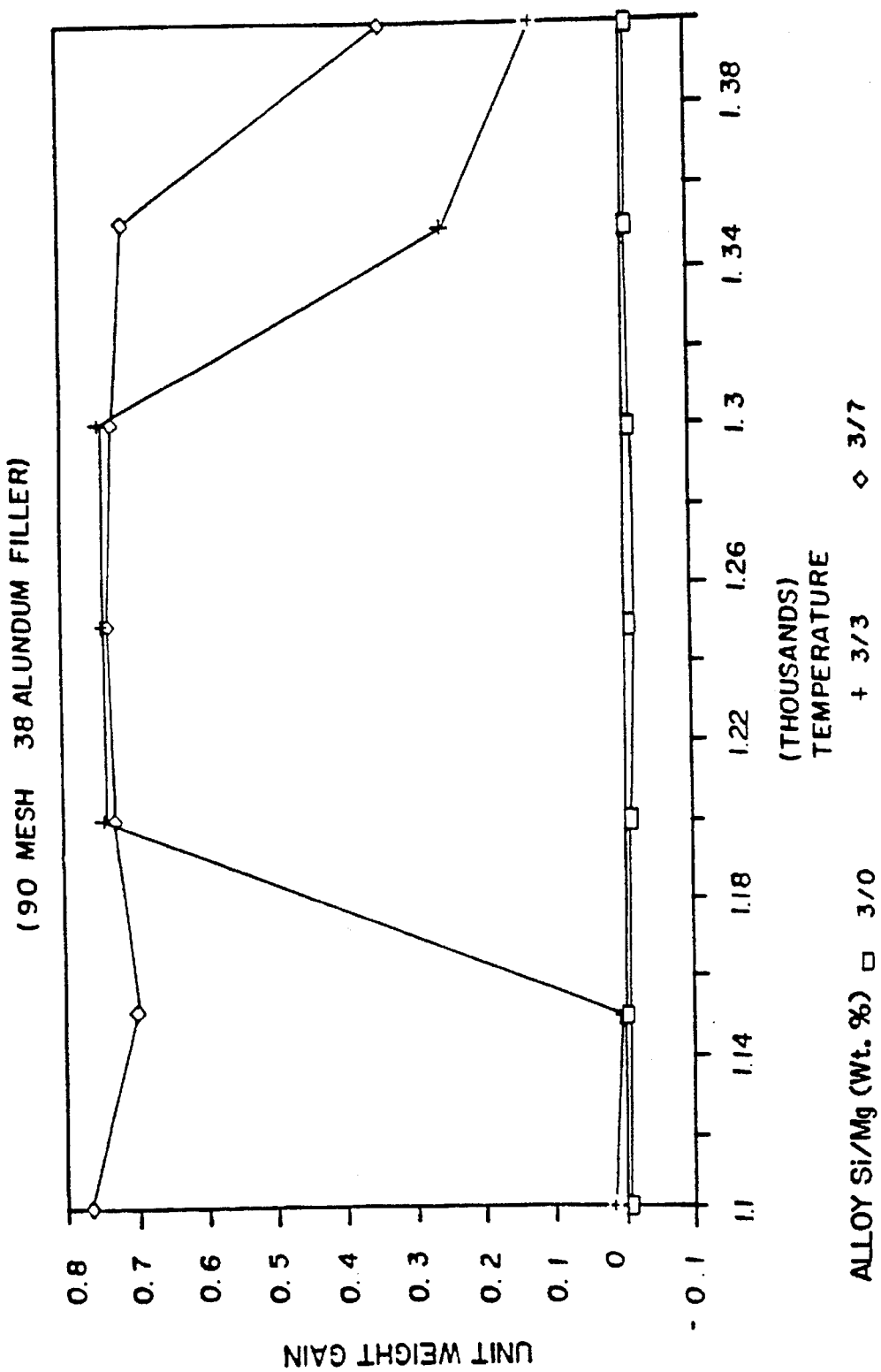

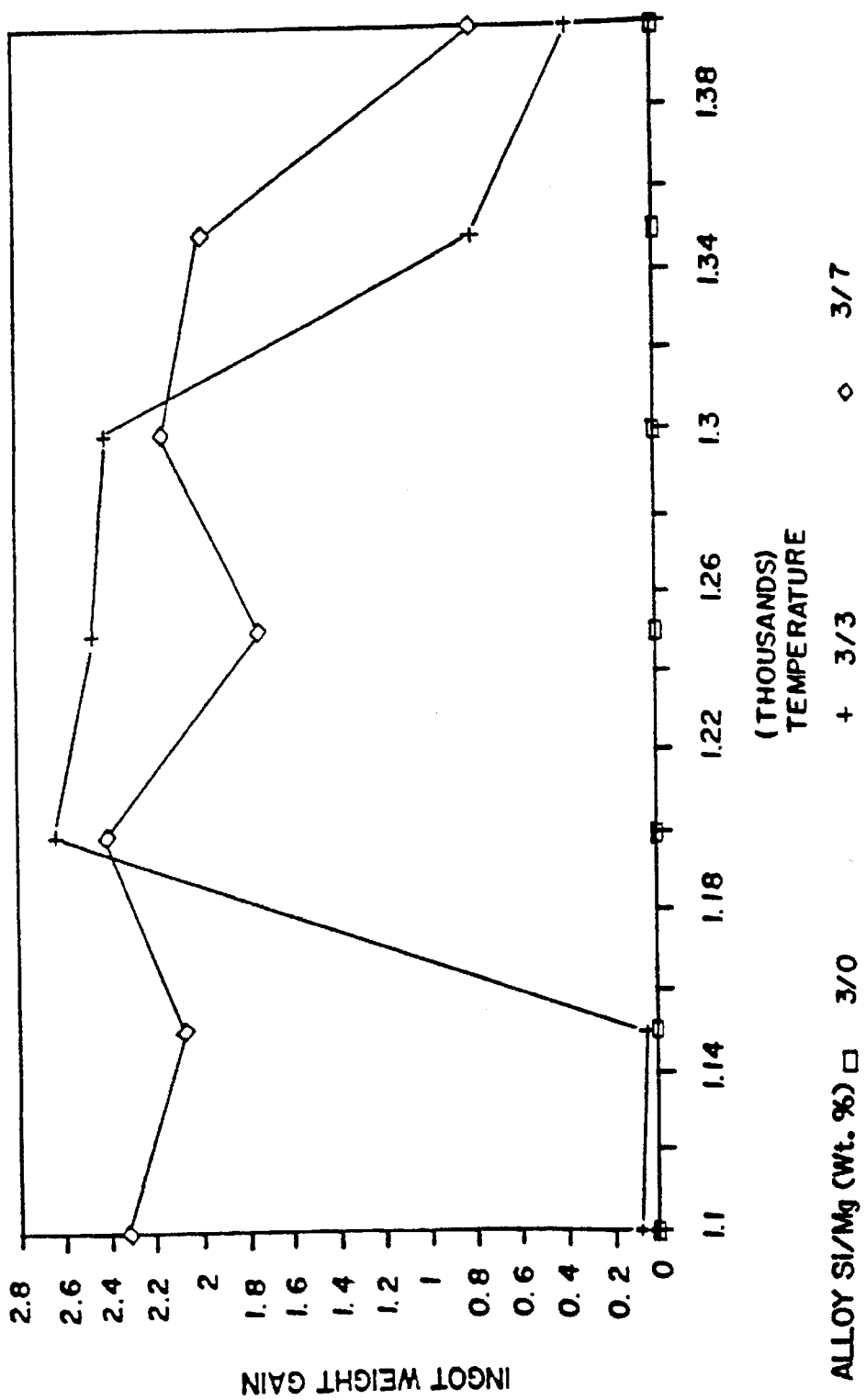

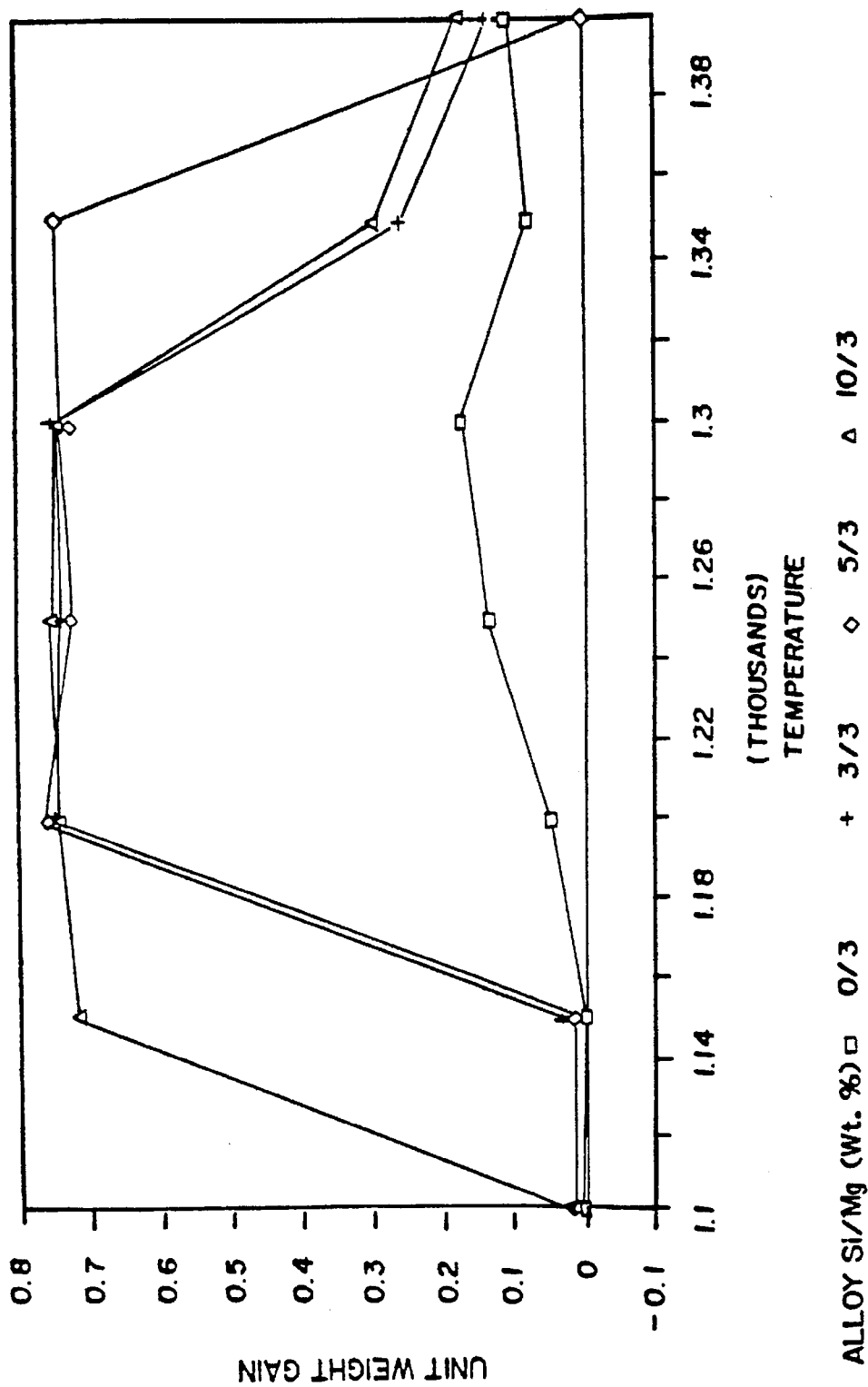

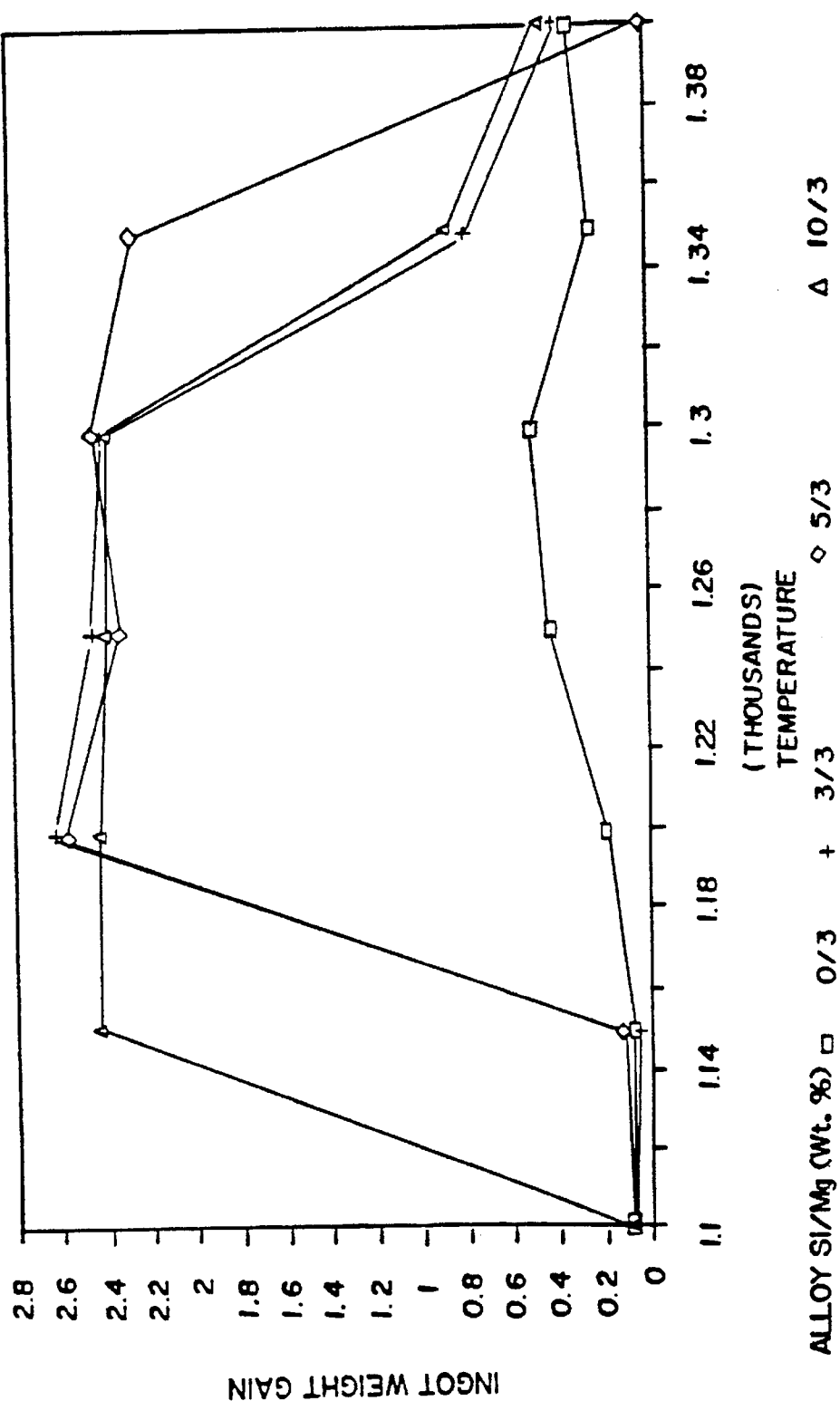

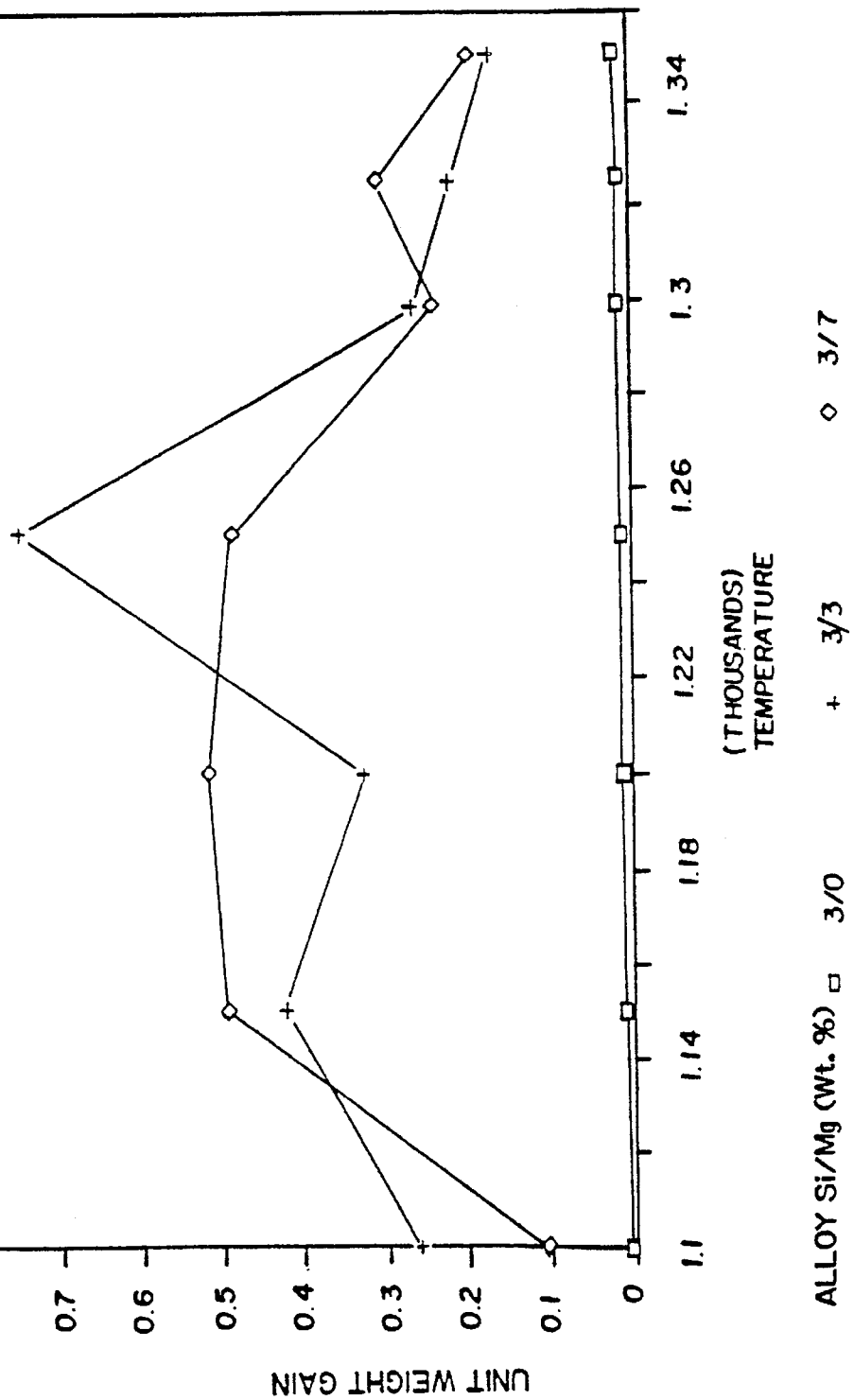

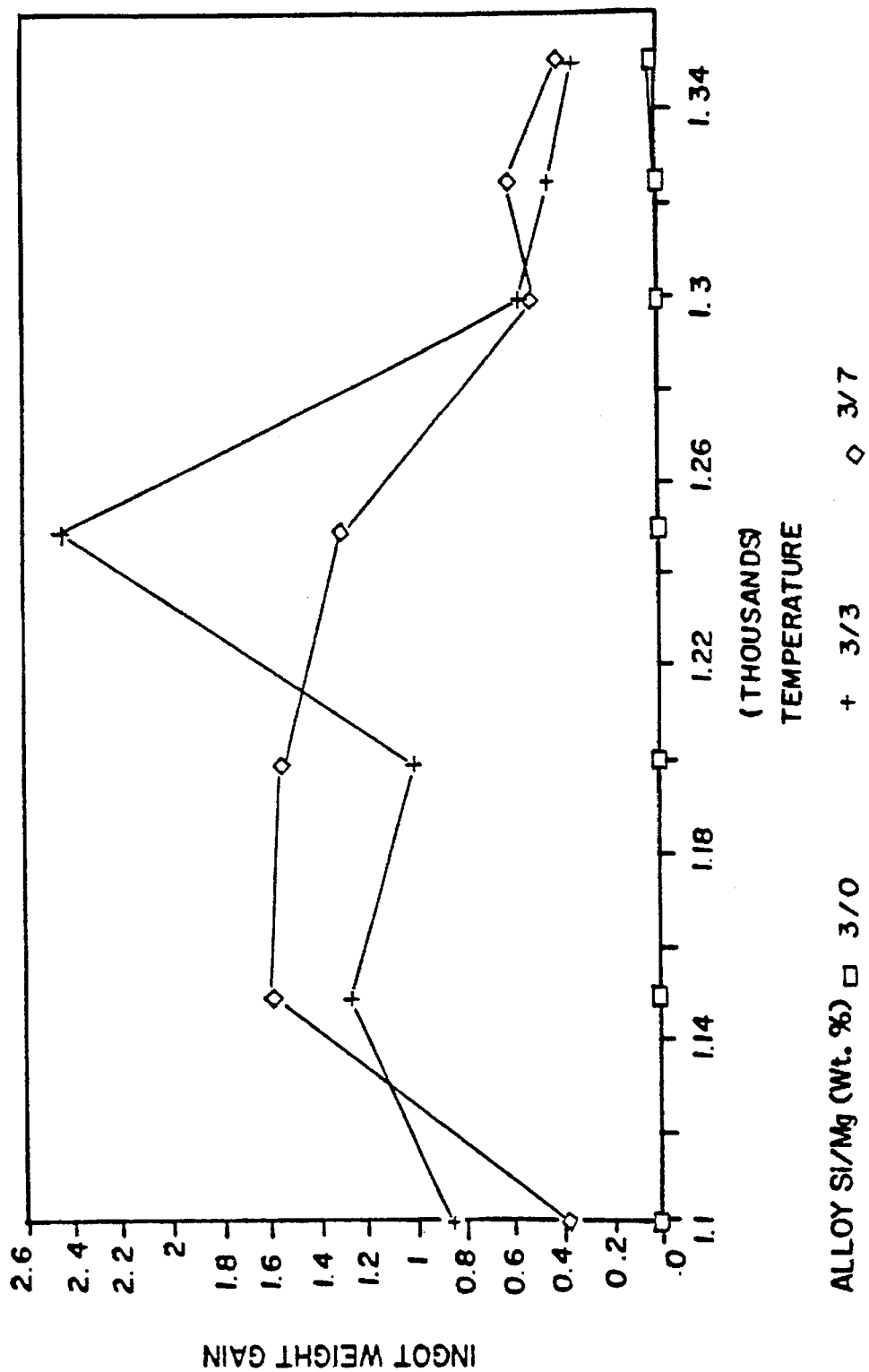

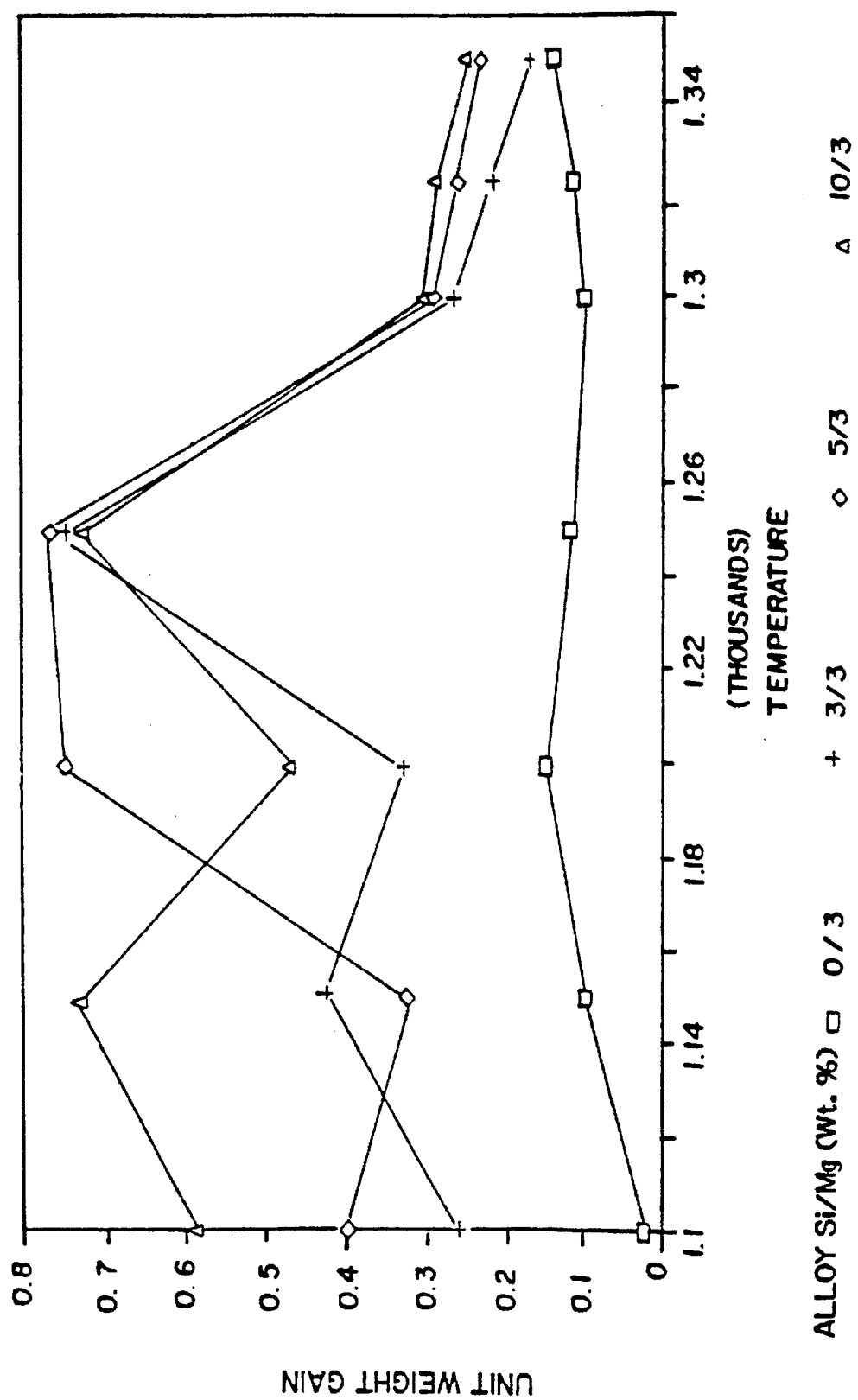

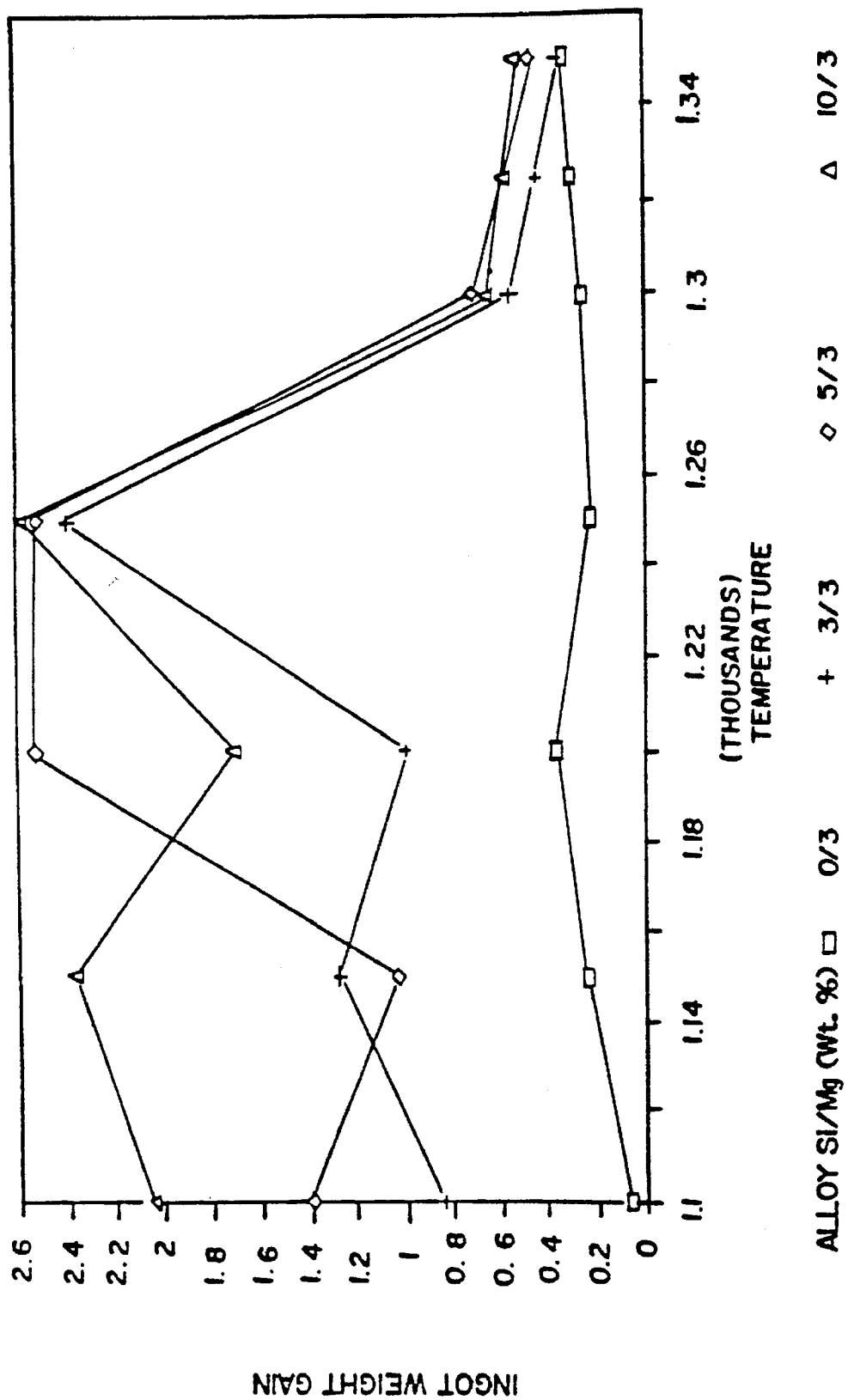

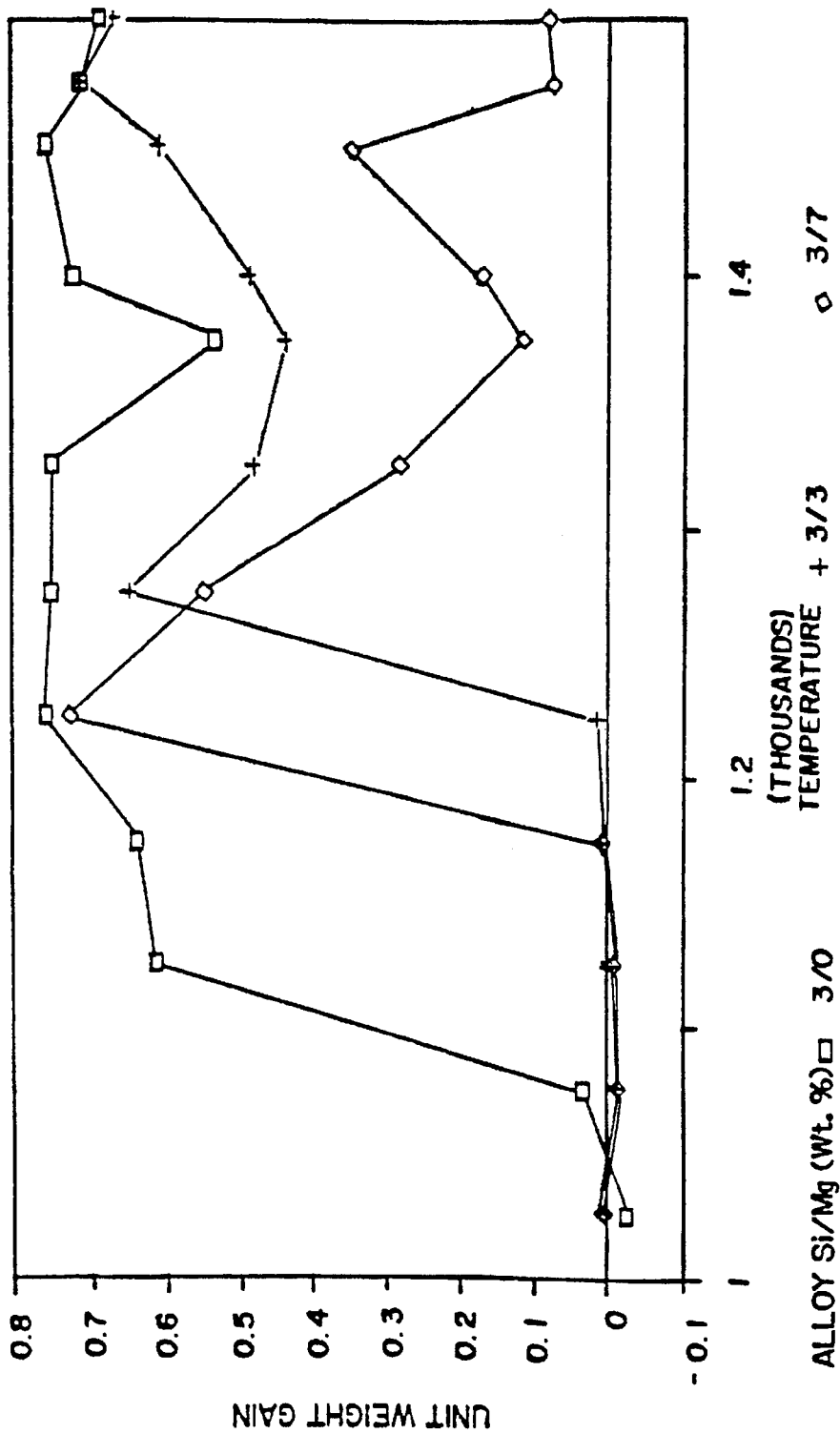

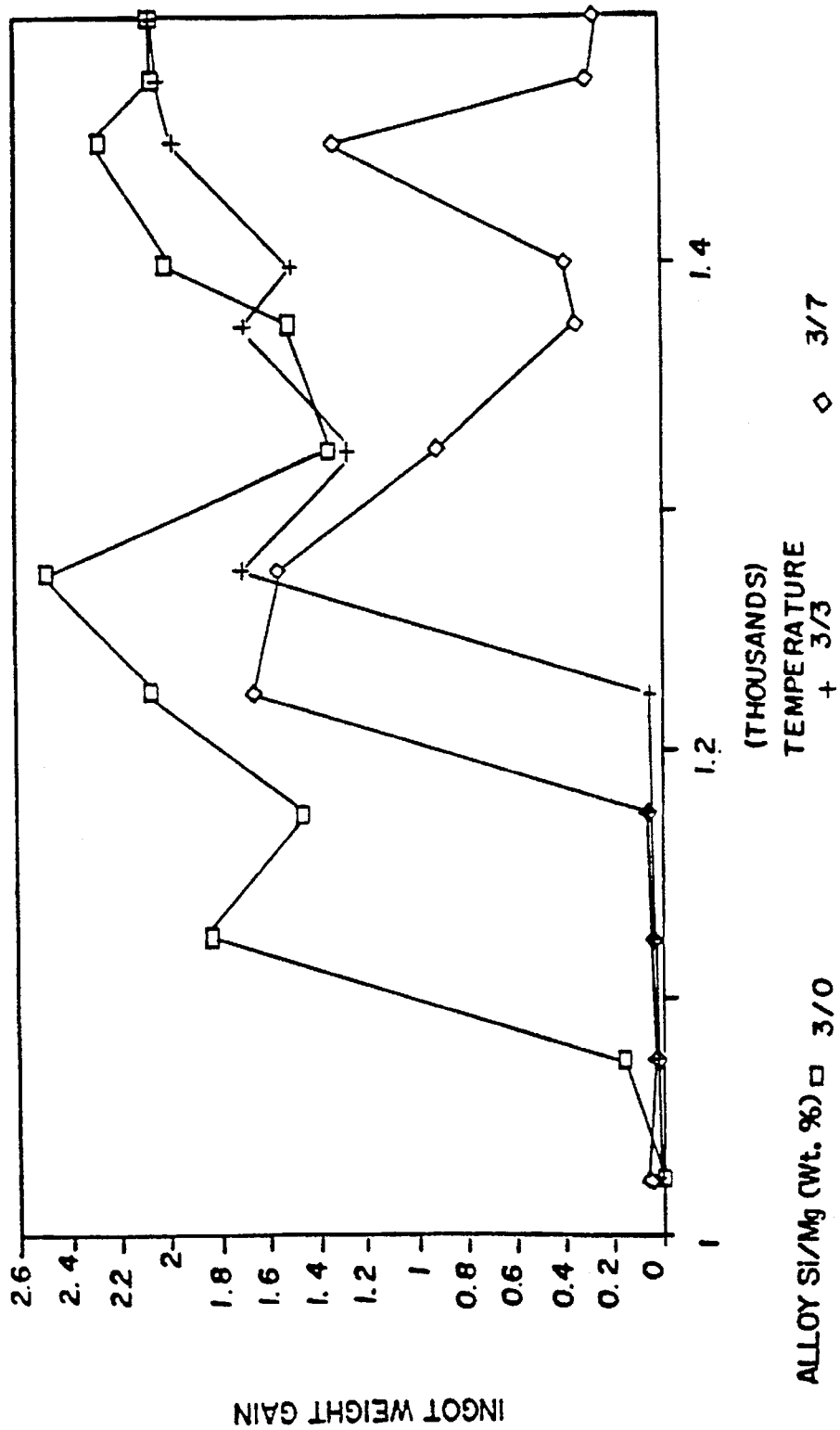

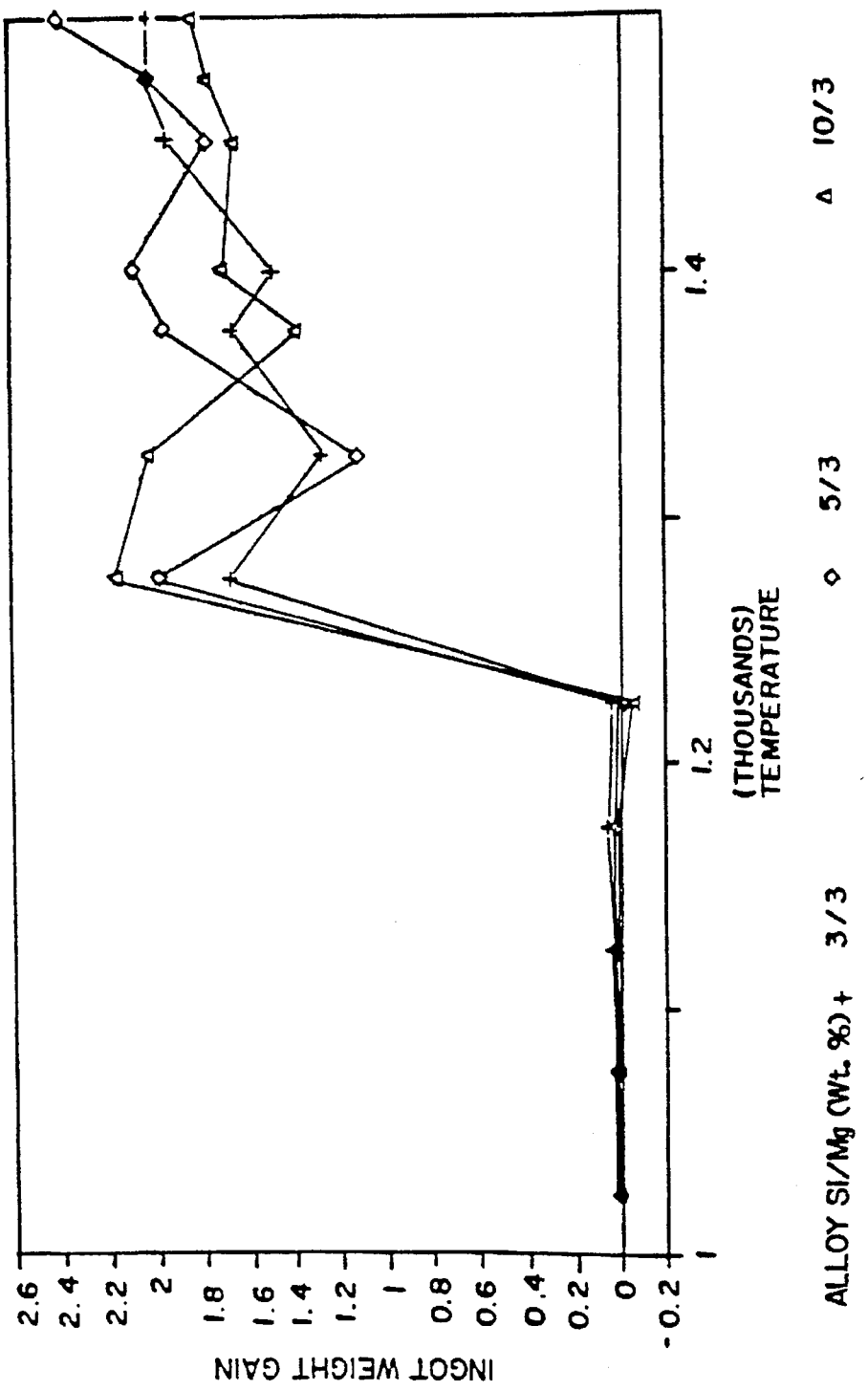

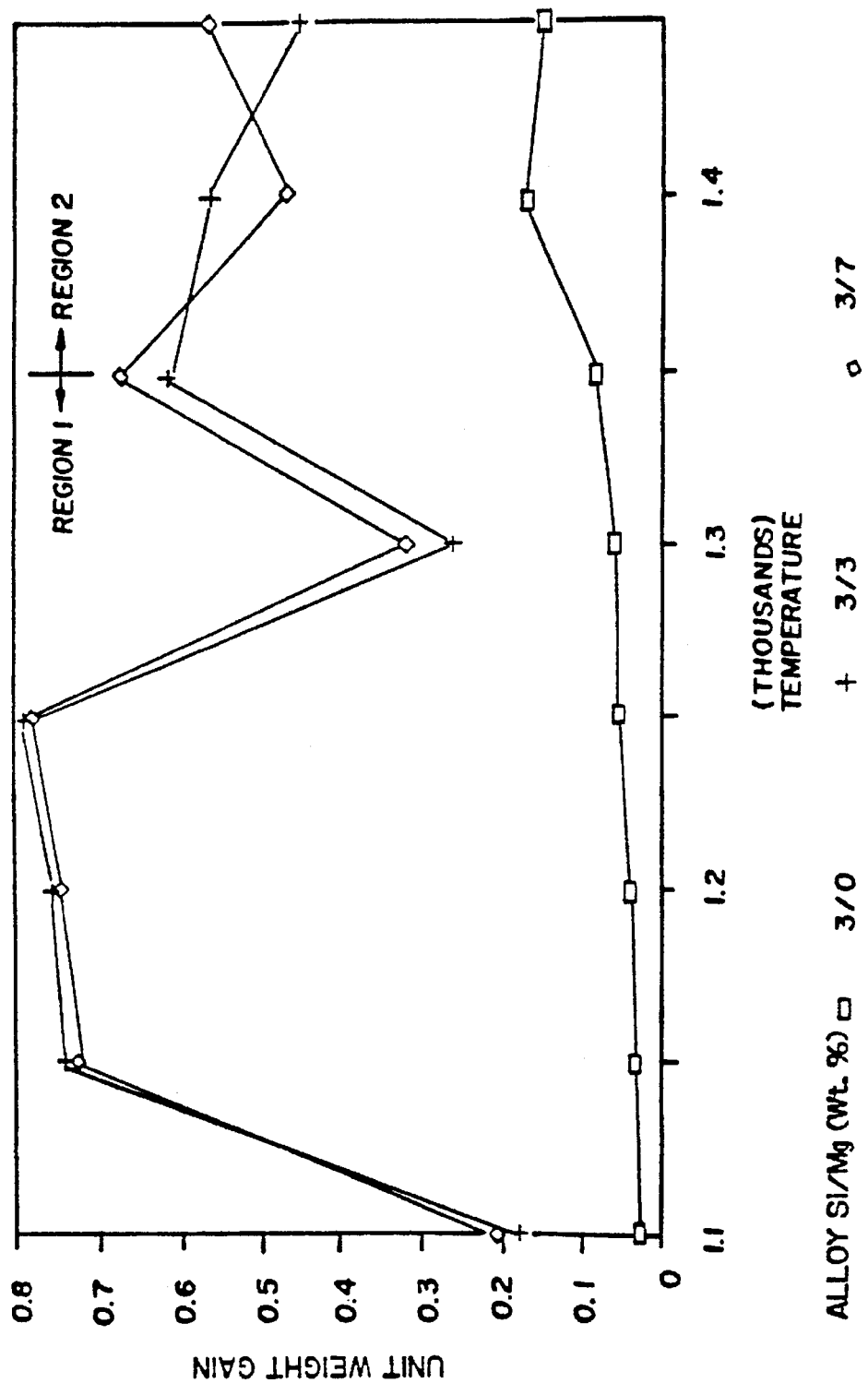

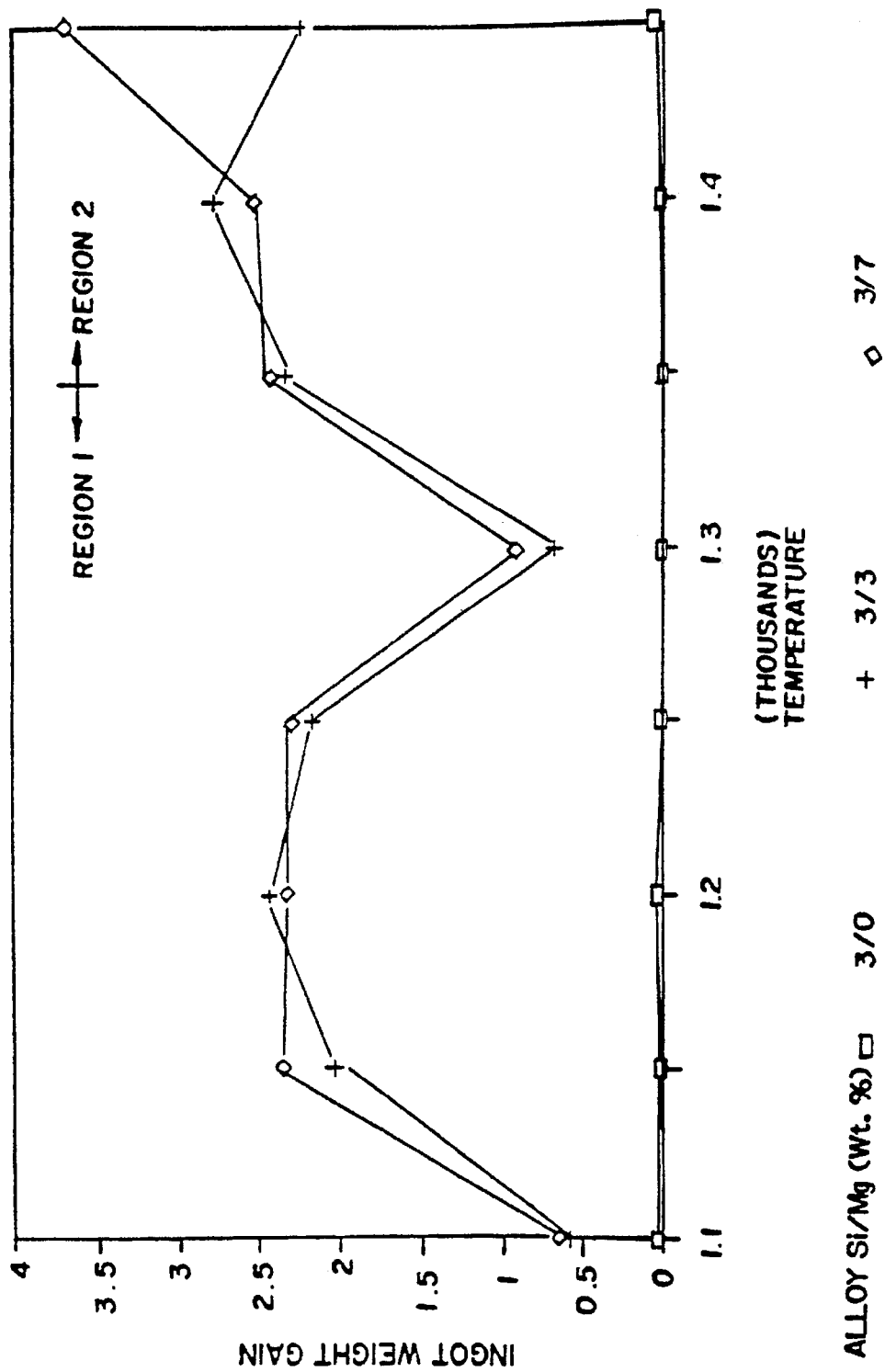

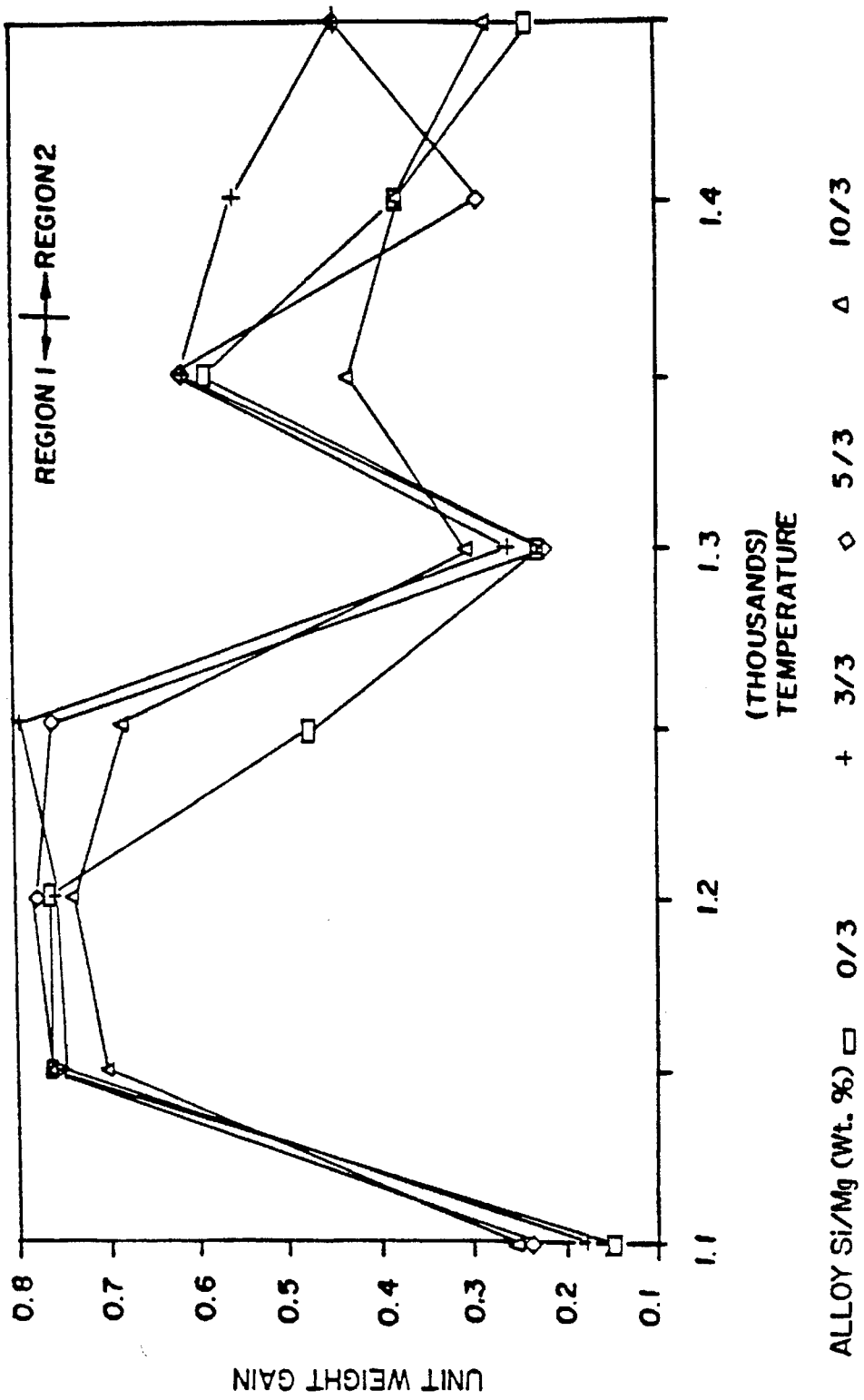

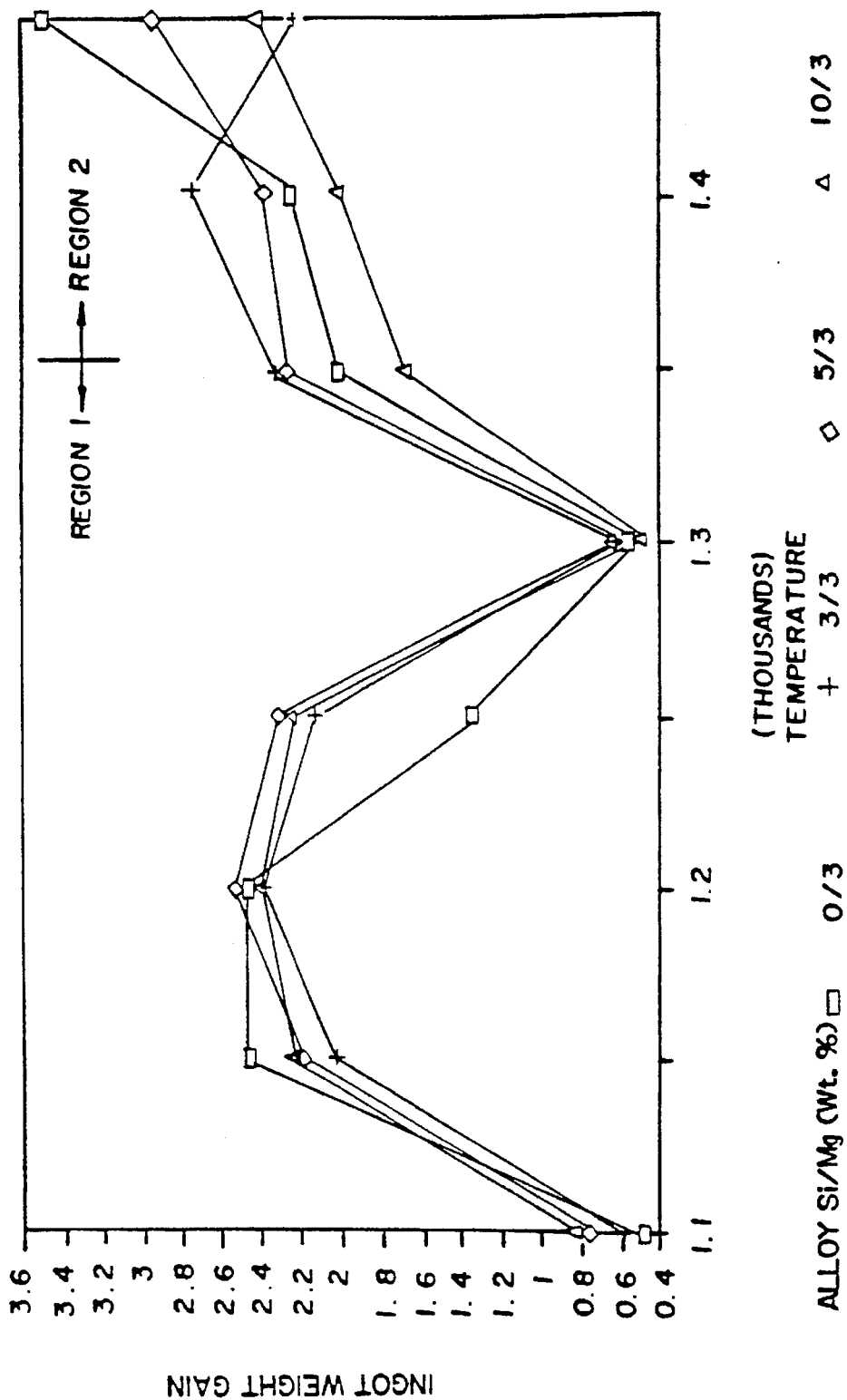

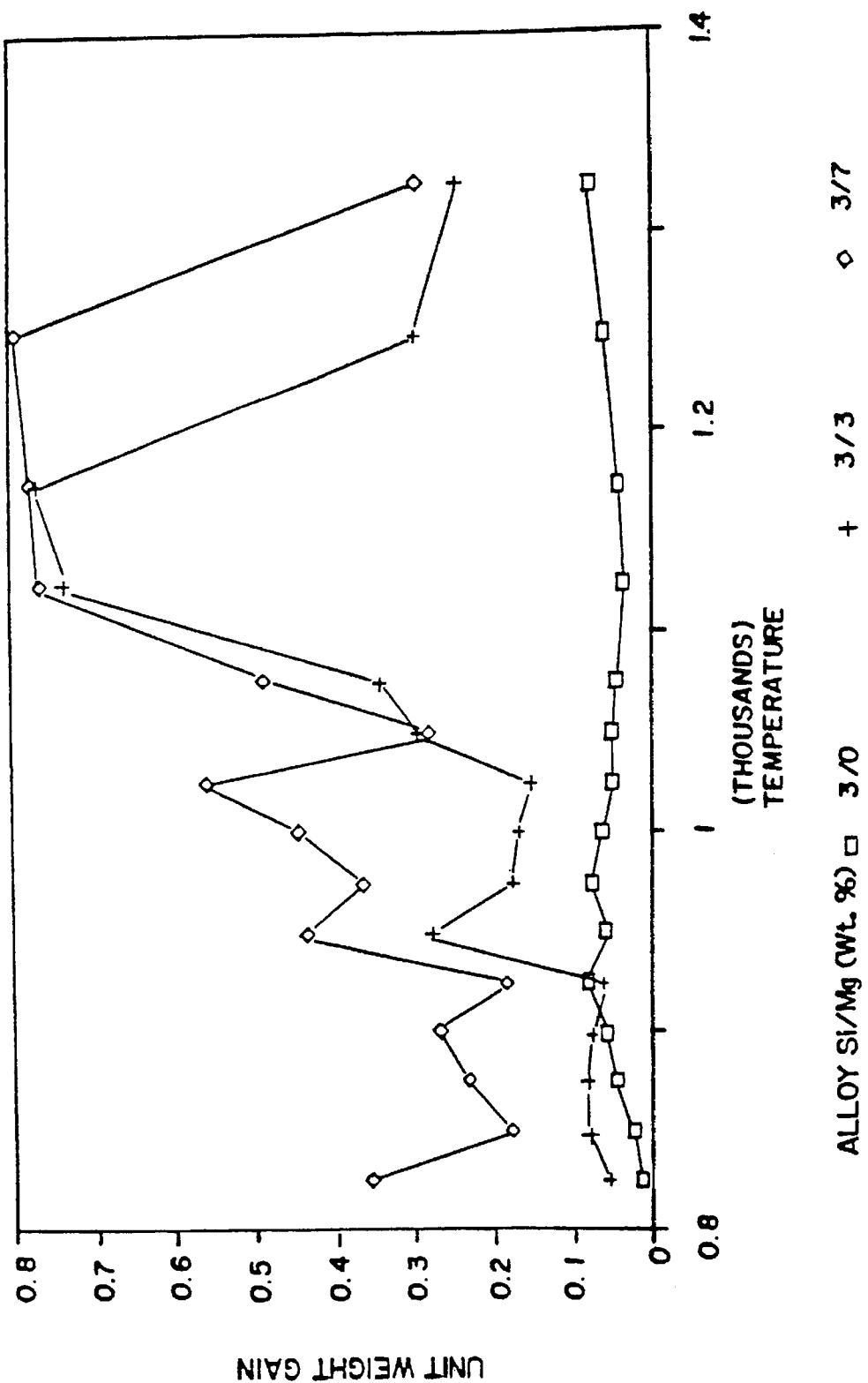

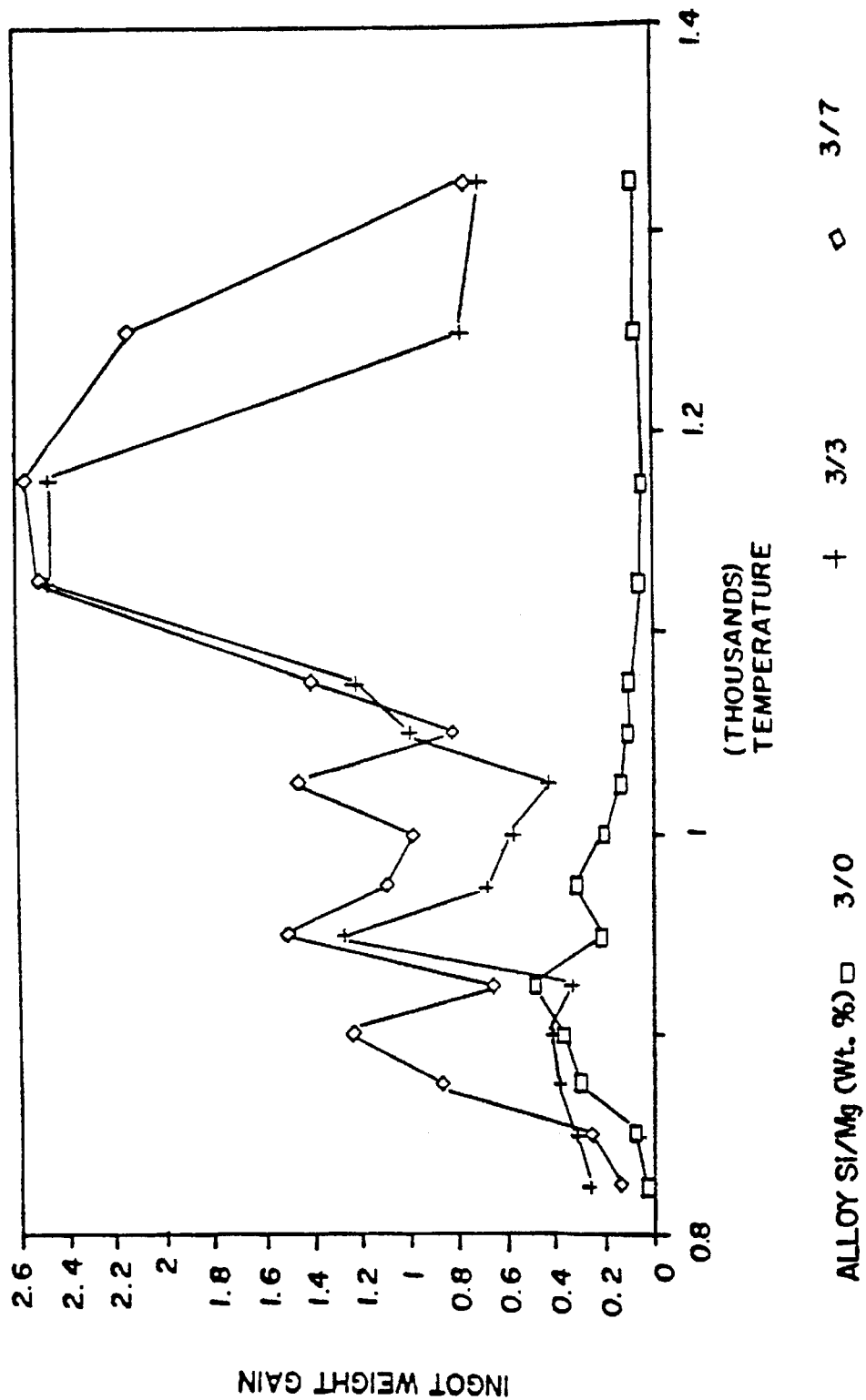

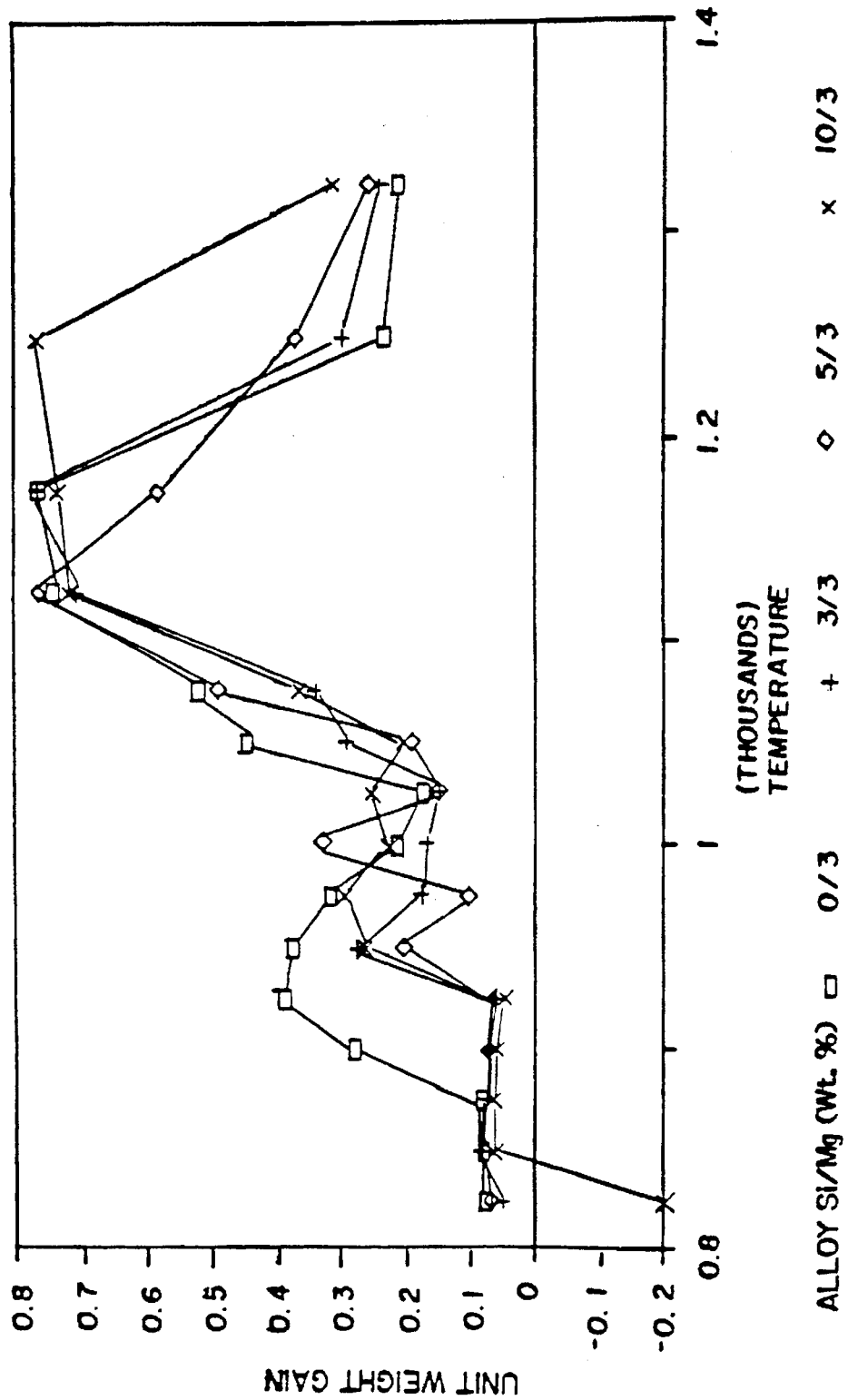

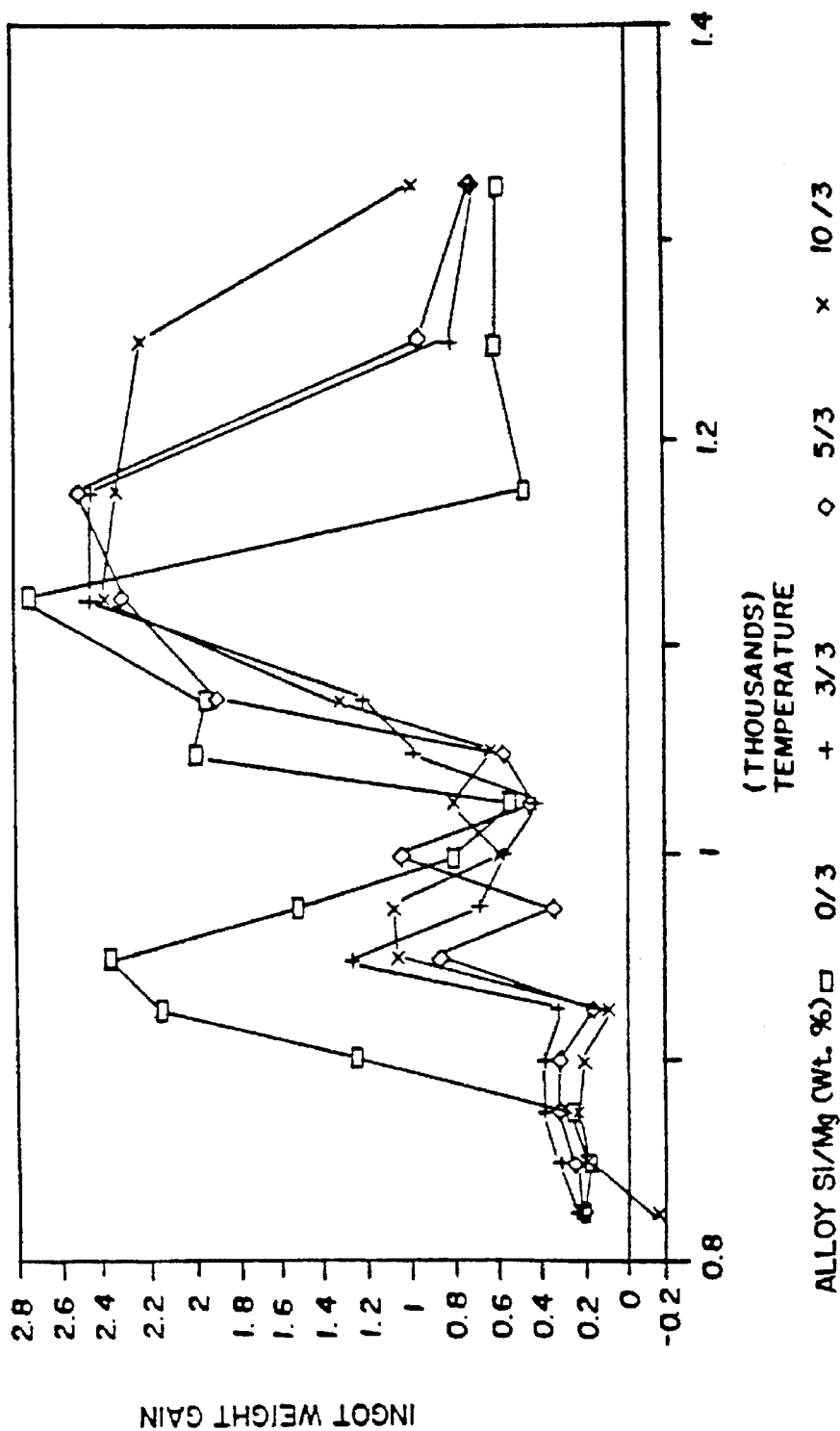

ALUMINA PARTICLE

ALPHA-ALUMIN + METAL CONSTITUENT

KANTHAL WIRE

| POWDER | ‖ GROWTH DIRECTION | ⊥ GROWTH DIRECTION DOWN | ⊥ GROWTH DIRECTION UP | 25-1133 AlN | 4-0787 Al | 9-250 Si₃N₄ 28H | 33-1160 β Si₃N₄ | 27-1402 Si 8F | 9-97 AlNi₃ | 36-1334 Al₂Si₂Sr |
|---|---|---|---|---|---|---|---|---|---|---|
| d(A) I | d(A) I | d(A) I | d(A) I | I hkl | I hkl | I hkl | I hkl | I hkl | I hkl | I hkl |
|  |  | 3.889 8 |  |  |  | 30 110 |  |  | 40 100 |  |
|  | 3.703 1 |  |  |  |  |  |  |  |  |  |
|  | 3.348 1 |  |  |  |  | 30 200 |  |  |  |  |
| 3.256 5 | 3.279 2 |  |  |  |  |  | 100 200 |  |  | 100 011 |
|  | 3.136 2 |  | 3.132 3 |  |  |  | 100 111 |  |  |  |
|  | 3.032 3 |  |  |  |  |  |  |  |  |  |
|  | 2.883 2 |  |  |  |  |  |  |  |  |  |
|  | 2.811 2 |  |  |  |  | 85 201 |  |  |  |  |
| 2.660 100 | 2.697 100 | 2.692 100 | 2.692 100 | 100 100 |  |  |  |  |  |  |
|  | 2.600 4 |  |  |  |  | 75 102 |  | 99 101 |  | 65 012 |
|  | 2.541 3 | 2.520 2 |  |  |  | 100 210 |  |  | 40 110 |  |
| 2.462 64 | 2.491 68 | 2.485 96 | 2.487 74 | 60 002 |  |  | 93 210 |  |  |  |
|  |  |  | 2.464 4 |  |  |  |  |  |  |  |
|  |  | 2.410 7 | 2.414 4 |  |  |  |  |  |  |  |
|  |  | 2.405 5 | 2.407 46 |  |  |  |  |  |  |  |
| 2.344 80 | 2.371 86 | 2.367 76 | 2.368 76 | 80 101 |  |  |  |  |  |  |
| 2.321 24 | 2.343 20 | 2.339 20 | 2.338 12 |  | 100 111 |  |  |  |  |  |
|  |  |  | 2.329 4 |  |  | 60 211 | 9 111 |  |  |  |
| 2.309 18 | 2.306 2 |  |  |  |  |  |  |  |  |  |
|  | 2.192 3 |  |  |  |  |  | 10 300 |  |  |  |
|  |  |  | 2.167 6 |  |  |  | 31 201 |  |  |  |
|  |  |  | 2.158 5 |  |  | 30 202 |  |  |  |  |
|  | 2.081 12 |  |  |  |  | 55 301 |  |  | 100 111 | 55 110 |
| 2.009 15 | 2.029 9 | 2.024 7 | 2.033 4 |  | 47 200 |  |  |  |  |  |
| 2.000 13 |  | 2.020 7 |  |  |  |  |  |  |  |  |
|  | 1.918 1 |  |  |  |  |  |  | 55 220 |  |  |
| 1.817 24 | 1.829 30 | 1.826 27 | 1.827 24 | 25 102 |  |  |  |  |  |  |
|  | 1.764 1 |  |  |  |  |  |  | 37 301 |  | 18 021 |
|  | 1.666 1 |  |  |  |  |  |  |  |  |  |
|  | 1.635 1 |  |  |  |  |  |  | 30 311 |  |  |
|  |  |  | 1.570 3 |  |  | 35 321 |  |  |  |  |
| 1.544 51 | 1.557 62 | 1.554 38 | 1.554 44 | 40 110 |  |  |  |  |  |  |
|  | 1.466 2 |  |  |  |  | 70 321 |  |  |  |  |
| 1.427 10 | 1.435 8 | 1.433 3 |  |  | 22 220 | 55 303 |  |  |  |  |
|  |  | 1.425 2 |  |  |  |  |  |  |  |  |
|  |  | 1.419 7 |  |  |  | 60 411 |  |  |  |  |
|  | 1.413 50 | 1.412 34 | 1.412 33 | 30 103 |  |  |  |  |  |  |
| 1.406 33 |  |  | 1.401 3 |  |  | 20 004 |  |  |  |  |
|  | 1.381 2 |  |  |  |  |  |  |  |  |  |
|  | 1.373 8 |  |  |  |  | 12 104 |  |  |  |  |
|  |  |  | 1.356 1 |  |  | 75 322 |  |  |  |  |
|  | 1.348 10 | 1.345 3 | 1.346 4 | 5 200 |  |  |  | 39 321 |  | 12 121 |
| 1.313 21 | 1.320 39 | 1.319 14 | 1.319 24 | 25 112 |  | 30 114 |  |  |  |  |
|  | 1.302 14 | 1.305 2 | 1.300 9 | 10 201 |  |  |  |  |  |  |
| 1.296 15 |  | 1.299 7 |  |  |  | 50 412 |  |  |  |  |
|  |  | 1.243 2 |  |  |  |  |  | 11 331 |  |  |
|  |  |  | 1.224 2 | 1 004 | 24 311 |  |  |  |  |  |
|  |  | 1.188 3 |  | 4 202 |  |  |  |  |  |  |

FIG. 15

METHODS OF MAKING COMPOSITE CERAMIC ARTICLES HAVING EMBEDDED FILLER

CROSS-REFERENCE TO RELATED APPLICATIONS AND PATENTS

This application is a continuation-in-part of commonly owned U.S. patent application Ser. No. 08/007,387, filed on Jan. 21, 1993, which issued on May 30, 1995, as U.S. Pat. No. 5,420,085, which was a continuation of U.S. patent application Ser. No. 07/811,895, filed on Dec. 20, 1991, now abandoned, which was a continuation of U.S. patent application Ser. No. 07/443,733, filed on Nov. 30, 1989, now abandoned, which was a continuation-in-part of U.S. patent application Ser. No. 07/415 180, which was filed on Sep. 29, 1989, now abandoned, as a divisional of U.S. patent application Ser. No. 07/265,835, filed on Nov. 1, 1988 which issued on Apr. 10, 1990, as U.S. Pat. No. 4,916,113, entitled "Methods of Making Composite Ceramic Articles," which was a continuation of U.S. patent application Ser. No. 06/819,397, filed Jan. 17, 1986 which issued on Jul. 25, 1989, as U.S. Pat. No. 4,851,375, entitled "Methods of Making Composite Ceramic Articles Having Embedded Filler", which was a continuation-in-part of U.S. patent application Ser. No. 06/697,876, filed Feb. 4, 1985, now abandoned, entitled "Composite Ceramic Articles and Methods of Making Same", all of which were filed in the names of Marc S. Newkirk et al. Also related are U.S. patent application Ser. No. 08/284,011, filed on Aug. 1, 1994, which is a continuation of U.S. patent application Ser. No. 08/017,940, filed on Feb. 16, 1993, which issued on Aug. 2, 1994, as U.S. Pat. No. 5,334,562, which was a continuation of U.S. patent application Ser. No. 07/659,473, which issued on Feb. 16, 1993, as U.S. Pat. No. 5,187,130, entitled "Methods of Making Composite Ceramic Articles Having Embedded Filler", which was a continuation of the above-cited U.S. patent application Ser. No. 07/415,180.

FIELD OF THE INVENTION

The present invention broadly relates to novel composite ceramic structures and to novel methods of making the same. In particular, the invention relates to composite ceramic structures having a polycrystalline matrix surrounding or embedding substantially inert filler materials and/or active filler materials and to methods of making the structures by "growing" an oxidation reaction product from a parent metal into a permeable mass of filler material.

BACKGROUND OF THE INVENTION

Traditional methods of preparing ceramic articles do not readily lend themselves to the preparation of ceramic matrix composite materials, especially fiber- and/or wire-reinforced ceramic matrix composite structures. A composite structure is one which comprises two or more different materials which are intimately combined in order to attain desired properties of the composite. For example, two different materials may be intimately combined by embedding one in a matrix of the other. A ceramic matrix composite structure typically comprises a ceramic matrix which embeds one or more diverse kinds of filler materials such as particulates, fibers, rods or the like.

Traditional methods of preparing ceramic articles involve the following general steps: (1) preparation of material in powder form; (2) grinding or milling of powders to obtain very fine particles; (3) formation of the powders into a body having the desired geometry (with allowance for shrinkage during subsequent processing), e.g., this step might be accomplished by uniaxial pressing, isostatic pressing, injection molding, tape casting, slip casting or any of several other techniques; (4) densification of the body by heating it to an elevated temperature such that the individual powder particles merge together to form a coherent structure, e.g., this step is preferably accomplished without the application of pressure (i.e., by sintering), although in some cases an additional driving force is required and can be provided through the application of external pressure either uniaxially (e.g., hot pressing) or isostatically (e.g., hot isostatic pressing); and (5) finishing, frequently by diamond grinding, as required.

In the preparation of ceramic matrix composite materials, the most serious difficulties with traditional methods arise in the densification step, number (4) above. The normally preferred method, pressureless sintering, can be difficult or impossible with particulate composites if the materials are not highly compatible. More importantly, normal sintering is impossible in most cases involving fiber composites even when the materials are compatible, because the merging together of the particles is inhibited by the fibers which tend to prevent the necessary displacements of the densifying powder particles. These difficulties have been, in some cases, partially overcome by forcing the densification process through the application of external pressure at high temperature. However, such procedures can generate many problems, including breaking or damaging of the reinforcing fibers by the external forces applied, limited capability to produce complex shapes (especially in the case of uniaxial hot pressing), and generally high costs resulting from low process productivity and the extensive finishing operations sometimes required.

Additional difficulties can also arise in the body formation step, number (3) above, if it is desired to maintain a particular distribution of the composite second phase within the matrix. For example, in the preparation of a fibrous ceramic matrix composite, the powder and fiber flow processes involved in the formation of the body can result in non-uniformities and undesired orientations of the reinforcing fibers, with a consequent loss in performance characteristics.

Other methods are also used as means for forming ceramic matrix composites. For example, the formation of a matrix structure by the reaction of gaseous species to form the desired ceramic (a process known as chemical vapor deposition) is employed currently for silicon carbide fiber-reinforced silicon carbide matrix composites. This method has met with only limited success, partly because the matrix deposition process tends to occur on all of the composite second phase surfaces at once, such that matrix development only occurs until the growing surfaces intersect, with the trapping of porosity within the body being an almost inevitable consequence. In addition, the rate of matrix deposition has been so low as to make such composites prohibitively expensive for all but the most esoteric applications.

A second non-traditional approach involves the infiltration of the composite particles or fibers with a flowable organic material containing the necessary elements to form the desired ceramic matrix. Ceramic formation occurs by chemical reaction on heating this material to an elevated temperature. Once again, limited success has been achieved, in this case because elimination of the large amounts of volatile materials (necessary constituents of the initial flowable infiltrant composition) during the heating process tends to leave behind a porous and/or cracked ceramic body.

Talsma (U.S. Pat. No. 3,255,027) discloses forming a particulate mixture comprising up to 81 weight percent filler, an aluminum alloy particulate and at least about 0.02 weight percent of the aluminum alloy as a fluxing agent which is preferably a metal oxide or hydroxide. The particulate mixture is fired in an oxygen-containing atmosphere to a temperature of at least 600° C. for a time sufficient to convert at least 11 percent of the aluminum to aluminum oxide. The formed body comprises 15–95 percent by volume porosity, less than 81 percent by weight of filler, less than 81 percent by weight of residual aluminum alloy and at least 19 percent by weight of aluminum oxide. However, Talsma teaches away from the use of a nitrogen-containing atmosphere.

Bechtold (U.S. Pat. No. 3,262,763) discloses refractory bodies produced by heating compacts which comprise by weight about 16–70 percent aluminum, 15–85 percent silicon nitride, 1–45 percent boron in a nitrogen or oxygen-containing atmosphere to a temperature between about 700° C. and about 1500° C. The bodies so formed contain some porosity and at least about 5 percent excess aluminum or silicon. The bodies may be electrically conductive or insulating. However, Bethtold does not teach the use of a substantially inert filler material to serve as a reinforcement phase for the body to be produced.

Bawa (U.S. Pat. No. 3,421,863) discloses a method for making a cermet material which is electrically insulating at elevated temperatures. The method comprises compression molding a particulate mass comprising 80–98 percent by weight of aluminum powder and 2–20 percent of aluminum silicate powder (such as Kaolin clay) and firing in an oxygen-containing atmosphere for about 4–8 hours at a temperature between about 1000° C. and about 1400° C. Bawa does not disclose the use of a nitrogenous atmosphere to produce an aluminum nitride-based ceramic body.

Seufert (U.S. Pat. No. 3,437,468) discloses certain composite materials made by a reaction process with molten aluminum. However, the matrix constituent of these materials inherently contains a large amount of magnesium aluminate spinel, a material of less desirable properties (for example, lower hardness) than certain other ceramics such as aluminum oxide. In addition, the process of the Seufert Patent requires that the ceramics be formed, in major part, by reaction of aluminum with magnesium oxide and silicon dioxide (in free or combined form) which reduces the flexibility of the process and dictates that substantial amounts of silicon (in addition to magnesium aluminate) will be present in the matrix of the final ceramic product.

Oberlin (U.S. Pat. No. 3,473,938) discloses a method for producing an aluminum oxide-based honeycomb structure by coating an aluminum honeycomb structure with a composition comprising 2–25 percent by weight of vanadium oxide ($B_2O_5$), 10–98 percent of a fluxing agent comprising alkali metal silicates and alkaline earth silicates, and 0–90 percent of one or more of the following: $Al_2O_3$, MgO, $Cr_2O_3$, $TiO_2$, $ZrSiO_4$, $MgSiO_3$, M-silicate and Al. The coated aluminum honeycomb structure is then heated in an oxygen atmosphere for at least 8 hours at a temperature between about 600° C. and about 900° C., then at least 10 hours at a temperature between about 900° C. and the melting point of the formed body. Again, Oberlin does not disclose the use of a nitrogenous atmosphere to produce aluminum nitride. Further, Oberlin uses a single body of metal and not a plurality of finely divided parent metal bodies.

DESCRIPTION OF COMMONLY OWNED PATENT APPLICATIONS AND PATENTS

The subject matter of this application is related to that of several other Commonly Owned Patents and Commonly Owned and Copending Patent Applications. Particularly, these other Patents and Patent Applications describe novel methods for making ceramic matrix composite materials (hereinafter sometimes referred to as "Commonly Owned Ceramic Matrix Patent Applications").

A novel approach to the formation of ceramic materials is disclosed generically in Commonly Owned U.S. patent application Ser. No. 08/232,797, filed Apr. 25, 1994, as a continuation of U.S. patent application Ser. No. 07/891,618, now U.S. Pat. No. 5,306,677, which issued on Apr. 26, 1994, as a continuation of U.S. patent application Ser. No. 07/631,229, now U.S. Pat. No. 5,118,647, which issued on Jun. 2, 1992, entitled "Novel Ceramic Materials," as a continuation of U.S. patent application Ser. No. 07/256,257, filed on Oct. 11, 1988, now abandoned, which was a continuation of U.S. patent application Ser. No. 07/013,857, filed on Feb. 12, 1987, now abandoned, which was a divisional of U.S. patent application Ser. No. 06/818,943, now U.S. Pat. No. 4,713,360, which issued on Dec. 15, 1987 in the names of Marc S. Newkirk et al. and is entitled "Novel Ceramic Materials and Methods for Making Same", which was a continuation-in-part of U.S. patent application Ser. No. 06/776,964, filed on Sep. 17, 1985, now abandoned, which was a continuation-in-part of U.S. patent application Ser. No. 06/705,787, filed Feb. 26, 1985), now abandoned (a European counterpart to which was published in the EPO on Sep. 25, 1985, which was a continuation-in-part of U.S. patent application Ser. No. 06/591,392, filed on Mar. 16, 1984, now abandoned. This Patent discloses a method of producing self-supporting ceramic matrix bodies grown as the oxidation reaction product of a molten parent precursor metal with a vapor-phase oxidant. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the parent metal, as described in (1) Commonly Owned U.S. patent application Ser. No. 07/995,318, filed on Dec. 22, 1992, now abandoned, which was a continuation of U.S. patent application Ser. No. 07/807,934, filed on Dec. 16, 1991, now abandoned, which was a continuation of U.S. patent application Ser. No. 07/462,329, filed on Mar. 28, 1990, now U.S. Pat. No. 5,073,527, which issued on Dec. 17, 1991, which was as continuation of U.S. patent application Ser. No. 07/256,256, filed on Oct. 11, 1988, now abandoned, which was a continuation of U.S. patent application Ser. No. 07/050,829, filed on May 15, 1987, now abandoned, which was a divisional of U.S. patent application Ser. No. 06/822,999, filed on Jan. 27, 1986, now abandoned, which was a continuation-in-part of U.S. patent application Ser. No. 06/776,965, filed on Sep. 17, 1985, now abandoned, which was a continuation-in-part of U.S. patent application Ser. No. 06/747,788, filed on Jun. 25, 1985, now abandoned (a European counterpart to which was published in the EPO on Jan. 22, 1986), which was a continuation of the above-cited U.S. patent application Ser. No. 06/822,999, which was a continuation-in-part of U.S. patent application Ser. No. 06/632,636, filed on Jul. 20, 1984, now abandoned; and in (2) Commonly Owned U.S. patent application Ser. No. 07/220,935, filed on Jun. 23, 1988, now U.S. Pat. No. 4,853,352, which issued on Aug. 1, 1989, in the names of Marc S. Newkirk et al. and entitled "Method of Making Self-Supporting Ceramic Materials and Materials Made Thereby".

A method for producing ceramic matrix composite bodies having a predetermined geometry or shape is disclosed in (1) Commonly Owned U.S. patent application Ser. No. 07/973,808, filed on Nov. 9, 1992, now U.S. Pat. No. 5,358,914, which issued on Oct. 25, 1994, which was a continuation of U.S. patent application Ser. No. 07/659,481, filed on Feb. 25, 1991, which issued on Nov. 10, 1992, as U.S. Pat. No. 5,162,273, which was a continuation of U.S. patent application Ser. No. 07/368,484, filed on Jun. 19, 1989, now abandoned, which was a continuation of U.S. patent application Ser. No. 07/109,972, filed on Oct. 19, 1987, now abandoned, which was a divisional of U.S. patent application Ser. No. 06/861,025, filed on May 8, 1986, now abandoned; and in (2) Commonly Owned U.S. patent application Ser. No. 07/338,471, filed Apr. 14, 1989, now U.S. Pat. No. 5,017,526, which issued on May 21, 1991, in the names of Marc S. Newkirk et al., and entitled "Method of Making Shaped Ceramic Composite", which was a continuation of the above-cited U.S. patent application Ser. No. 06/861,025, filed May 8, 1986 (and now abandoned) (a European counterpart to which was published in the EPO on Nov. 11, 1987). In accordance with the method in U.S. Pat. No. 5,017,526, the developing oxidation reaction product infiltrates a permeable preform of filler material in a direction towards a defined surface boundary. It was discovered that high fidelity is more readily achieved by providing the preform with a barrier means, as disclosed in Commonly Owned U.S. patent application Ser. No. 08/294,271, filed Aug. 22, 1994, as a divisional of U.S. patent application Ser. No. 07/819,308, filed on Jan. 9, 1992, which was a continuation-in-part of U.S. patent application Ser. No. 07/786,660, filed on Nov. 1, 1991, now abandoned, which was a continuation-in-part of U.S. patent application Ser. No. 07/724,236, filed on Jul. 1, 1991, now abandoned, which was a continuation-in-part of U.S. patent application Ser. No. 07/659,523, filed on Feb. 22, 1991, which was a continuation of U.S. patent application Ser. No. 07/295,488, filed on Jan. 10, 1989, now abandoned, which was a continuation of U.S. patent application Ser. No. 06/861,024, filed on May 8, 1986, which issued as U.S. Pat. No. 4,923,832, on May 8, 1990, in the names of Marc S. Newkirk et al., and entitled "Method of Making Shaped Ceramic Composites with the Use of a Barrier", a European counterpart to which was published in the EPO on Nov. 11, 1987. This method produces shaped self-supporting ceramic matrix bodies, including shaped ceramic matrix composites, by growing the oxidation reaction product of a parent metal to a barrier means which is spaced from the metal so as to establish a boundary or surface.

Ceramic matrix composites having a cavity with an interior geometry inversely replicating the shape of a positive mold or pattern are disclosed: (1) in Commonly Owned U.S. patent application Ser. No. 08/176,058, filed Jan. 3, 1994, as a continuation of U.S. patent application Ser. No. 07/983,191, filed on Nov. 30, 1992, which issued as U.S. Pat. No. 5,275,987 on Jan. 4, 1994, which was a continuation of U.S. patent application Ser. No. 07/763,681, filed on Sep. 23, 1991, which issued as U.S. Pat. No. 5,168,081 on Dec. 1, 1992, as a continuation of U.S. patent application Ser. No. 07/329,784, filed on Mar. 28, 1989, which issued as U.S. Pat. No. 5,051,382 on Sep. 24, 1991, in the names of Marc S. Newkirk et al. (both issued U.S. Patents entitled "Inverse Shape Replication Method of Making Ceramic Composite Articles and Articles Obtained Thereby"), which is a divisional of U.S. patent application Ser. No. 06/823,542, filed on Jan. 27, 1986, now U.S. Pat. No. 4,828,785, which issued on May 9, 1989, in the names of Marc S. Newkirk, et al., and is entitled "Inverse Shape Replication Method of Making Ceramic Composite Articles", a European counterpart to which was published in the EPO on Sep. 2, 1987; and (2) in Commonly Owned U.S. patent application Ser. No. 07/657,290, filed on Feb. 19, 1991, now U.S. Pat. No. 5,212,124, which issued on May 18, 1993, which was a continuation of U.S. patent application Ser. No. 07/308,420, filed on Feb. 8, 1989, now abandoned, which was a divisional of U.S. patent application Ser. No. 06/896,157, filed on Aug. 13, 1986, now U.S. Pat. No. 4,859,640, which issued on Aug. 22, 1989, in the name of Marc S. Newkirk, and entitled "Method of Making Ceramic Composite Articles with Shape Replicated Surfaces", a European counterpart to which was published in the EPO on Mar. 9, 1988.

The feeding of additional molten parent metal from a reservoir has been successfully utilized to produce thick ceramic matrix composite structures. Particularly, as disclosed in (1) Commonly Owned U.S. patent application Ser. No. 07/830,098, filed on Feb. 3, 1992, in the names of Jerry G. Weinstein et al., now abandoned, which was a continuation of U.S. patent application Ser. No. 07/478,845, filed on Feb. 12, 1990, now U.S. Pat. No. 5,086,019, which issued on Feb. 4, 1992, which was a continuation of U.S. patent application Ser. No. 07/168,358, filed on Mar. 15, 1988, now U.S. Pat. No. 4,918,034, which issued on Apr. 17, 1990, in the names of Jerry G. Weinstein et al., which was a continuation-in-part of Commonly Owned U.S. patent application Ser. No. 06/908,067, filed on Sep. 16, 1986, now U.S. Pat. No. 4,900,699, which issued on Feb. 13, 1990, in the names of Marc S. Newkirk et al. a European counterpart to which was published in the EPO on Mar. 30, 1988; and (2) Commonly Owned U.S. patent application Ser. No. 07/414,195, filed on Sep. 28, 1989, now U.S. Pat. No. 4,996,176, which issued on Feb. 26, 1991, in the names of Marc S. Newkirk et al., as a divisional of U.S. Pat. No. 4,900,699, all of the above commonly owned patents and patent applications entitled "Reservoir Feed Method of Making Ceramic Composite Structures and Structures Made Thereby", the reservoir feed method has been successfully applied to form ceramic matrix composite structures. According to the method of this invention, the ceramic matrix or ceramic matrix composite body which is produced comprises a self-supporting structure which includes a ceramic matrix obtained by the oxidation reaction of a parent metal with an oxidant to form a polycrystalline material. In conducting the process, a body of the parent metal and a permeable filler are oriented relative to each other so that formation of the oxidation reaction product will occur in a direction toward and into the filler. The parent metal is described as being present as a first source and as a reservoir, the reservoir of metal communicating with the first source due to, for example, gravity flow. The first source of molten parent metal reacts with the oxidant to begin the formation of the oxidation reaction product. As the first source of molten parent metal is consumed, it is replenished, preferably by a continuous means, from the reservoir of parent metal as the oxidation reaction product continues to be produced and infiltrates the filler. Thus, the reservoir assures that ample parent metal will be available to continue the process until the oxidation reaction product has grown to a desired extent.

A method for tailoring the constituency of the metallic component of ceramic matrix and ceramic matrix composite structures is disclosed in Commonly Owned U.S. patent application Ser. No. 07/389,506, filed on Aug. 2, 1989, now U.S. Pat. No. 5,017,533, which issued on May 21, 1991, in the names of Marc S. Newkirk et al. and is entitled "Method for In Situ Tailoring of the Metallic Component of Ceramic Articles and Articles Made Thereby", which was a continuation of U.S. patent application Ser. No. 06/908,454, filed on Sep. 17, 1986, and now abandoned, a European counterpart to which was published in the EPO on Apr. 6, 1988.

Moreover, the above-mentioned method for tailoring the constituency of the metallic component of ceramic matrix and ceramic matrix composite structures is also disclosed in Commonly Owned International patent application Ser. No. PCT/US93/06064 filed on Jun. 25, 1993, and designating the U.S., as a continuation-in-part of U.S. patent application Ser. No. 07/904,739, filed on Jun. 26, 1992, now U.S. Pat. No. 5,268,339, which issued on Dec. 7, 1993, which was a continuation-in-part of U.S. patent application Ser. No. 07/793,933, filed on Nov. 14, 1991, now U.S. Pat. No. 5,185,303, which issued on Feb. 9, 1993, in the names of Robert C. Kanther et al. and entitled, "Ceramic Articles with Tailored Metallic Components," which was a continuation of U.S. patent application Ser. No. 07/568,618, filed on Aug. 16, 1990, now U.S. Pat. No. 5,066,618, which issued on Nov. 19, 1991, in the names of Robert C. Kantner et al. and entitled "Ceramic Articles Having In Situ Tailored Metallic Component", which was a continuation of U.S. patent application Ser. No. 07/269,152, filed on Nov. 9, 1988, now abandoned, which was a continuation of U.S. patent application Ser. No. 07/152,518, filed on Feb. 5, 1988, which issued as U.S. Pat. No. 4,818,734, on Apr. 4, 1989, in the names of Robert C. Kanther et al., and entitled "Method For In Situ Tailoring the Metallic Component of Ceramic Articles", which was a continuation-in-part of the above-mentioned U.S. patent application Ser. No. 06/908,454, now abandoned. These Patents and the above-mentioned applications disclose methods for tailoring the constituency of the metallic component (both isolated and interconnected) of ceramic matrix and ceramic matrix composite bodies during the formation thereof to impart one or more desirable characteristics to the resulting body. Thus, desired performance characteristics for the resulting ceramic matrix or ceramic matrix composite body are advantageously achieved by incorporating the desired metallic component in situ, rather than from an extrinsic source, or by post-forming techniques.

As discussed in these Commonly Owned Ceramic Matrix Patent Applications and Patents, novel polycrystalline ceramic matrix materials or polycrystalline ceramic matrix composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum) is heated to an elevated temperature above its melting point to form a body of molten parent metal which reacts upon contact with an oxidant to form the oxidation reaction product of the molten parent metal and the oxidant. During the oxidation reaction the temperature is maintained in a range between the melting point of the parent metal and the melting point of the oxidation reaction product. At this temperature, the oxidation reaction product, or at least a portion thereof, is in contact with and extends between the body of molten parent metal and the oxidant, and molten parent metal is drawn or transported through the formed oxidation reaction product and towards the oxidant. The transported molten parent metal forms additional fresh oxidation reaction product upon contact with the oxidant, at the surface of the previously formed oxidation reaction product. As the process continues, additional molten parent metal is transported through this formation of polycrystalline oxidation reaction product thereby continually "growing" a ceramic structure of interconnected crystallites. The resulting ceramic matrix body may contain metallic constituents, such as non-oxidized constituents of the parent metal, and/or voids. The term "oxidation" is used in its broad sense in all of the Commonly Owned Ceramic Matrix Patent Applications and Patents and in this application, and refers to the loss or sharing of electrons by a metal to or with an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum, and the created growth alloy is utilized as the parent metal. When an oxidant comprising oxygen is utilized with such a growth alloy, the resulting oxidation reaction product comprises alumina, typically alpha-alumina.

Novel ceramic matrix composite structures and methods of making the same are also disclosed and claimed in certain of the aforesaid Commonly Owned Ceramic Matrix Patent Applications and Patents which utilize the oxidation reaction to produce ceramic matrix composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler, which can be shaped and treated to be self-supporting (e.g., a preform), and the parent metal is then heated to form a body of molten parent metal which is reacted with an oxidant, as described above, to form an oxidation reaction product. As the oxidation reaction product grows into and embeds the adjacent filler material, molten parent metal is drawn through the previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic matrix composite structure comprising a polycrystalline ceramic matrix embedding the filler. As also discussed above, the filler (or preform) may utilize a barrier means to establish a boundary or surface for the ceramic matrix composite structure.

E. S. Park and S. D. Poste disclose a novel method for making an open-cell rigid foam having a ceramic skeletal structure in Commonly Owned U.S. patent application Ser. No. 08/210,843 filed on Mar. 21, 1994, as a continuation of U.S. patent application Ser. No. 08/014,959, filed on Feb. 3, 1993, now U.S. Pat. No. 5,296,416, which issued on Mar. 22, 1994, which was a continuation of U.S. patent application Ser. No. 07/783,284, filed on Oct. 28, 1991, which issued as U.S. Pat. No. 5,185,297, on Feb. 9, 1993, which was a continuation of U.S. patent application Ser. No. 07/494,124, filed on Mar. 15, 1990, now U.S. Pat. No. 5,061,660, which issued on Oct. 29, 1991, as a continuation of U.S. patent application Ser. No. 07/278,207, filed on Nov. 30, 1988, and now abandoned, which was a continuation of U.S. patent application Ser. No. 07/089,376, filed on Aug.

26, 1987, now U.S. Pat. No. 4,808,558, which issued on Feb. 28, 1989 and is entitled, "Ceramic Foams," (a European counterpart to which was published in the EPO on Mar. 23, 1988), which was a continuation-in-part of U.S. patent application Ser. No. 06/908,116, filed on Sep. 16, 1986, now abandoned. The foam is produced by reacting a precursor metal to produce an oxidation reaction product which grows through a permeable layer of inert filler material to form an open cell structure. The filler material, which is deposited as a thin permeable layer on the surfaces of a metal foam, is chosen such that it maintains the original foam structure at the oxidation temperature. The resulting ceramic foam may comprise a tubular structure. Thus, depending on the processing conditions used, the ceramic tubules may have metallic cores, or may be hollow. The examples disclosed in the above-mentioned U.S. Patents and Patent Applications include AlN powder filler materials and a nitrogenous atmosphere.

Thus, the aforesaid Commonly Owned Ceramic Matrix Patent Applications and Patents describe the production of oxidation reaction products which are readily grown to form ceramic matrix and ceramic matrix composite bodies having sizes and thicknesses heretofore believed to be difficult, if not impossible, to achieve with conventional ceramic processing techniques.

The entire disclosures of all of the foregoing Commonly Owned Ceramic Matrix Patent Applications and U.S. Patents are expressly incorporated herein by reference.

SUMMARY OF THE INVENTION

In accordance with the present invention, there is provided a method for producing a self-supporting ceramic matrix composite structure comprising: (1) a ceramic matrix obtained by oxidation of a parent metal, e.g., an aluminum alloy, to form a polycrystalline material, the ceramic matrix comprising (i) the oxidation reaction product (e.g., alpha-aluminum oxide or aluminum nitride) of said parent metal with an oxidant (e.g., an oxidant comprising oxygen or nitrogen) and, optionally, (ii) one or more non-oxidized constituents of the parent metal; and (2) a filler embedded by the ceramic matrix.

Generally, this invention is based upon the discovery that the growth of a polycrystalline material resulting from the oxidation of a metal (hereinafter referred to as the "parent metal" and defined below), as described in the above-referenced Commonly Owned Ceramic Matrix Patents and Patent Applications, can be directed towards a permeable mass of filler material, sometimes herein referred to simply as "filler", which is placed adjacent the parent metal. The filler is engulfed and embedded within the growth of polycrystalline material to provide a composite ceramic structure. Under suitable process conditions, the molten parent metal oxidizes outwardly from its initial surface (i.e., the surface exposed to the oxidant) towards the oxidant and the filler by migrating through its own otherwise impermeable oxidation reaction product structure. The oxidation reaction product grows into the permeable mass of filler, which may comprise various refractory and/or non-refractory granular, fibrous, or other materials. This results in novel ceramic matrix composite structures comprising a dense matrix of a ceramic polycrystalline material embedding the filler material(s).

In the main embodiment of the present invention, the mass or aggregate of filler material or materials is positioned adjacent the parent metal in the assumed path of the oxidation reaction product growth therefrom. The filler material can comprise either a loose or bonded array or arrangement of materials, which array has interstices, openings, intervening spaces, or the like, to render it permeable to the oxidant and the oxidation reaction product growth. Further, the filler material may be homogeneous or heterogeneous, and as used herein and in the appended claims, the terms "filler" or "filler material" are intended to mean one or more materials unless indicated otherwise by the context. A matrix of the polycrystalline material resulting from the oxidation reaction product growth is grown around the filler material so as to embed the latter without substantially disturbing or displacing it. Thus, no external forces are involved which might damage or disturb the arrangement of the filler material and no awkward and costly high temperature, high pressure processes and facilities are required as in known conventional processes to achieve a dense composite ceramic structure. In addition, the stringent requirements of chemical and physical compatibility necessary for pressureless sintering to form ceramic composites are greatly reduced or eliminated by the present invention.

In the ceramic matrix growth process, the parent metal is heated to a temperature above its melting point thereby forming a body of molten parent metal which is reacted with the oxidant to form the oxidation reaction product of the molten parent metal and the oxidant. During the oxidation reaction the temperature is maintained in a range between the melting point of the parent metal and the melting point of the oxidation reaction product. At this temperature or within this temperature range, the body of molten parent metal is in contact with at least a portion of the oxidation reaction product which extends between the body of molten parent metal and the oxidant. Molten parent metal is drawn through the oxidation reaction product towards the adjacent filler material to sustain the continued formation of fresh oxidation reaction product at an interface between the oxidant and previously formed oxidation reaction product. The reaction is continued for a time sufficient to form a ceramic matrix which embeds at least a portion of the filler material, the ceramic matrix comprising the oxidation reaction product of the molten parent metal and the oxidant and, optionally, comprising therein inclusions of non-oxidized constituents of the parent metal, to form the ceramic matrix composite structure.

In another aspect of the present invention, a porous self-supporting ceramic composite body may be fabricated. Specifically, the porosity is intentionally created, and controlled as to size, shape, amount and location within the body. Such control is achieved by providing the parent metal in a form in which it may be at least partially distributed through at least a portion of the permeable mass of filler material or preform prior to the ceramic matrix growth process. The form of the parent metal may range from finely divided powders or particulates to reticulated, three-dimensionally interconnected, open-cell networks or foams. The process conditions are controlled to maintain the parent metal in a molten state in the presence of the oxidant with which it reacts on contact to form an oxidation reaction product. The process is continued to induce transport of the molten metal through the oxidation reaction product towards the oxidant to continue forming additional oxidation reaction product upon contact with the oxidant within the permeable mass. Concurrently, voids are formed throughout the permeable mass substantially or partially replicating the configuration of the parent metal as it existed in the original permeable mass.

The permeable mass for this particular aspect of the present invention comprises a parent metal and a filler, wherein the parent metal is distributed in at least a portion of said filler. In accordance with one embodiment of the invention, the permeable mass may be comprised of an aluminum parent metal particulate and a substantially non-reactive filler, such as alumina, magnesia or spinel particulate. In such an embodiment, one or more dopants as further described herein are employed, either alloyed into the aluminum parent metal or distributed through the filler, or both, in order to facilitate the oxidation of the parent metal and transport of the parent metal through its reaction product. This admixture is subjected to the oxidation reaction process as described above to develop the porous ceramic body.

In an alternative embodiment, the permeable mass may be comprised of a parent metal and a substance which is reducible by the molten parent metal in an oxidation-reduction reaction. The parent metal may be provided in a stoichiometric amount relative to the reducible material (sometimes referred to as a solid or liquid oxidant) or in stoichiometric deficiency or excess. In a particularly preferred embodiment of this alternative embodiment, the parent metal is present in a stoichiometric excess over that necessary to react with the reducible material component of the permeable mass. This excess metal so provided ensures a sufficient volume of residual or unreacted parent metal for participation in the subsequent or concurrent vapor-phase oxidation reaction to form additional oxidation reaction product or a different oxidation reaction product. In this alternate procedure, the preform is heated to a temperature sufficient to initiate the oxidation-reduction reaction (i.e., a "reaction-effective" temperature) prior to any substantial vapor-phase oxidation of the parent metal, whereby an oxidation-reduction product is first formed substantially through the bulk of the preform. In many cases, the oxidation-reduction reaction is exothermic, rapidly heating the preform and assisting in the conversion of the parent meal to its molten reactive form. In one variant of the present invention, all steps following the oxidation-reduction reaction are conducted under substantially isothermal conditions; however, temperature variations may be introduced to control or tailor growth and microstructure of the formed body.

The products of the present invention are generally fabricated, or may be adapted such as by machining, polishing, grinding, etc., for use as articles of commerce. The phrase "articles of commerce", as used herein, is intended to include, without limitation, industrial, structural and technical ceramic matrix composite bodies for applications where electrical, wear, thermal, structural or other features or properties are important or beneficial; and it is not intended to include recycle or waste materials such as might be produced as unwanted by-products in the processing of molten metal.

Definitions

"Active Filler", as used herein, means fillers which provide nucleation sites and/or assist or promote ceramic matrix formation.

"Alloy Side", as used herein, refers to that side of the ceramic matrix composite which corresponds to the surface of the preform or mass of filler material that initially contacted molten parent meal before the oxidation reaction product of that molten parent metal and an oxidant infiltrated the preform or mass of filler material.

"Aluminum", as used herein, means and includes essentially pure metal (e.g., relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means any gas present in addition to the primary or oxidizing gas (if utilized) comprising the vapor-phase oxidant that is either an inert gas or a reducing gas which is substantially non-reactive with the parent metal under the process conditions. Any oxidizing gas which may be present as an impurity in the gas(es) used should be insufficient to oxidize the parent metal to any substantial extent under the process conditions.

"Barrier" or "barrier means", as used herein, means any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Carcass" or "Parent Metal Carcass", as used herein, refers to any of the original body of parent metal remaining which has not been consumed during formation of the ceramic matrix body, or the ceramic matrix composite body, and typically, which remains in at least partial contact with the formed body. It should be understood that the carcass may also typically include some oxidized constituents of the parent metal and/or a second or foreign metal therein.

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1–40 percent by volume, but may include still more metal.

"Ceramic Matrix Composite" or "CMC" or "Ceramic Composite Body", as used herein, means a material comprising a two- or three-dimensionally interconnected ceramic matrix which has embedded a preform or filler material, and may further include a parent metal phase embedded therein, possibly in a two-or three-dimensionally interconnected network. The ceramic matrix may include various dopant elements to provide a specifically desired microstructure, or specifically desired mechanical, physical, or chemical properties in the resulting ceramic matrix composite.

"Dopants", as used herein, means materials (parent metal constituents or constituents combined with and/or included in or on a filler, or combined with the oxidant) which, when used in combination with the parent metal, favorably influence or promote the oxidation reaction process and/or modify the growth process to alter the morphology, microstructure, and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation.

Other dopants may improve the morphology of the composite by enhancing the nucleation and uniformity of the growth of the oxidation reaction product, or improve the physical, chemical, and mechanical properties of the ceramic matrix composite by modifying its microstructure. Dopants may be added to the filler material, they may be in the form of a gas, solid, or liquid under the process conditions, they may be included as constituents of the parent metal, or they may be added to any one of the constituents involved in the formation of the oxidation reaction product. Dopants may: (1) create favorable surface energy relationships which enhance or induce the wetting of the oxidation reaction product by the molten parent metal; and/or (2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in the molten parent metal, and/or (c) allow for transport of oxidant from the oxidizing atmosphere through any precursor oxide layer to combine subsequently with the molten parent metal to form another oxidation reaction product; and/or (3) cause microstructural modifications of the oxidation reaction product as it is formed or subsequently and/or alter the metallic constituent composition and properties of such oxidation reaction product; and/or (4) enhance growth nucleation and uniformity of growth of oxidation reaction product.

"Filler" or "Filler Material", as used herein, means either single constituents or mixtures of constituents which are substantially non-reactive with and/or of limited solubility in the parent metal and/or oxidation reaction product and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and coated fliers such as carbon fibers coated with alumina or silicon carbide to protect the carbon from attack, for example, by a molten aluminum parent metal. Fillers may also include metals. For example, refractory metals such as tungsten, tantalum and molybdenum could be used as fillers.

"Green", as used herein in conjunction with filler materials and preforms, refers to a filler material or preform before any growth of oxidation reaction product into the filler material or preform has occurred. Thus a filler material or preform that has been fired at an elevated temperature (for example, to volatilize a binder) should be considered to be "green" so long as the filler material or preform has not been infiltrated by either the parent metal or the oxidation reaction product.

"Growth Alloy", as used herein, means any alloy containing initially, or at some point during processing obtaining, a sufficient amount of requisite constituents to result in growth of oxidation reaction product therefrom. Growth alloy may differ from a parent metal in that the growth alloy may include constituents not present in the parent metal, but incorporated into the molten alloy during growth.

"Liquid-Phase Oxidant" or "Liquid Oxidant", as used herein, means an oxidant in which the identified liquid is the sole, predominant or at least a significant oxidizer of the parent or precursor metal under the conditions of the process.

Reference to a liquid oxidant means one which is a liquid under the oxidation reaction conditions. Accordingly, a liquid oxidant may have a solid precursor, such as a salt, which is molten at the oxidation reaction conditions. Alternatively, the liquid oxidant may have a liquid precursor (e.g., a solution of a material) which is used to impregnate part or all of the filler and which is melted or decomposed at the oxidation reaction conditions to provide a suitable oxidant moiety. Examples of liquid oxidants as herein defined include low melting glasses.

If a liquid oxidant is employed in conjunction with the parent metal and a filler, typically, the entire bed of filler, or that portion comprising the filler which is to be embedded within the desired ceramic matrix composite body, is impregnated with the oxidant (e.g., by coating or immersion in the oxidant).

A Metal "Different" from the Parent Metal, as used herein, means a metal which does not contain, as a primary constituent, the same metal as the parent metal (e.g., if the primary constituent of the parent metal is aluminum, the "different" metal could have a primary constituent of, for example, nickel).

"Nitrogen-Containing Gas Oxidant", as used herein, means a particular gas or vapor in which nitrogen is the sole, predominant or at least a significant oxidizer of the parent or precursor metal under the conditions existing in the oxidizing environment utilized. The nitrogen could be molecular nitrogen (i.e., $N_2$) or could be contained in a compound such as $NH_3$.

"Oxidant", as used herein, means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, any halogen or a combination thereof, sulphur, phosphorus, arsenic, carbon, boron, selenium, tellurium, and or compounds and combinations thereof, for example, silica or silicates (as sources of oxygen), methane, ethane, propane, acetylene, ethylene, propylene (the hydrocarbon as a source of carbon), and mixtures such as air, $H_2/H_2O$ and $CO/CO_2$ (as sources of oxygen). The latter two (i.e., $H_2/H_2O$ and $CO/CO_2$) being useful in reducing the oxygen activity of the environment.

"Oxidation", as used herein, means a chemical reaction in which an oxidant reacts with a parent metal, and that parent metal gives electrons to or shares electrons with the oxidant.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of the reaction of one or more metals with one or more oxidants.

"Oxygen-Containing Gas Oxidant", as used herein, means a particular gas or vapor in which oxygen is the sole, predominant or at least a significant oxidizer of the parent or precursor metal under the conditions existing in the oxidizing environment utilized.

"Parent Metal", as used herein, means that metal(s) (e.g., aluminum, silicon, hafnium, titanium, tin, zinc and/or zirconium) which is the precursor of a polycrystalline oxidation reaction product and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, etc.), the metal identified should be read with this definition in mind unless indicated otherwise by the context.

"Preform" or "Permeable Preform", as used herein, means a porous mass of filler or filler material which is manufactured with at least one surface boundary which essentially defines a boundary for growing oxidation reaction product, such mass retaining sufficient shape integrity and green strength to provide dimensional fidelity prior to being infiltrated by the ceramic matrix. The mass should be sufficiently porous or permeable to: (1) allow the vapor-phase oxidant (if a vapor-phase oxidant is used) to permeate the preform and contact the parent metal; and (2) accommodate development or growth of oxidation reaction product. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Product Releasers", as used herein, means materials that facilitate the release of the ceramic matrix composite from the parent metal carcass after growth of the oxidation reaction product is substantially completed.

"Reducible Substance", as used herein, means an element or compound which interacts with the molten parent metal and/or the oxidation reaction product (e.g., is reduced by the parent metal and/or oxidation reaction product and thus modifies the composition of the parent metal and/or provides an oxidant for formation of the oxidation reaction product). See also "Liquid Oxidant" and "Solid Oxidant."

"Reservoir", as used herein, means a separate body of parent metal positioned relative to a mass of filler or a preform so that, when the metal is molten, the reservoir may flow to replenish, or in some cases to initially provide and subsequently replenish, that portion, segment or source of parent metal which is in contact with the filler or preform and infiltrating and/or reacting to form the oxidation reaction product. The reservoir may also be used to provide a metal which is different from the parent metal.

"Second or Foreign Metal", as used herein, means any suitable metal, combination of metals, alloys, intermetallic compounds, or sources of either, which is, or is desired to be, incorporated into the metallic component of a formed ceramic matrix composite body in lieu of, in addition to, or in combination with unoxidized constituents of the parent metal. This definition includes intermetallic compounds, alloys, solid solutions or the like formed between the parent metal and a second metal.

"Solid-Phase Oxidant" or "Solid Oxidant", as used herein, means an oxidant in which the identified solid is the sole, predominant or at least a significant oxidizer of the parent or precursor metal under the conditions of the process. When a solid oxidant is employed in conjunction with the parent metal and a filler, it is usually dispersed throughout the entire bed of filler or that portion of the bed into which the oxidation reaction product will grow, the solid oxidant being, for example, particulates admixed with the filler or coatings on the filler particles. Any suitable solid oxidant may be thus employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal, the resulting oxidation reaction product comprises aluminum boride.

"Vapor-Phase Oxidant", as used herein, means an oxidant which contains or comprises a particular gas or vapor and further means an oxidant in which the identified gas or vapor is the sole, predominant or at least a significant oxidizer of the parent or precursor metal under the conditions existing in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "Oxygen-Containing Gas Oxidant" but not within the definition of a "Nitrogen-Containing Gas Oxidant" (an example of a "nitrogen-containing gas" oxidant is forming gas, which typically contains about 96 volume percent nitrogen and about 4 volume percent hydrogen) as those terms are used herein and in the claims.

"Weight Gain", as used herein, means the percentage weight gain of the ingot/filler combination with respect to the weight of the ingot alone before initiation of the oxidation reaction. The weight gain can therefore be calculated by measuring the weight of the ingot/filler combination after growth, subtracting the weight of the ingot/filler combination before growth, dividing the result by the weight of the ingot before growth and multiplying by 100.

BRIEF DESCRIPTION OF THE DRAWINGS

FIGS. 2a, 2b, 2c and 2d are graphs showing relative ingot weight gain and relative unit weight gain (as explained below) for a doped aluminum parent metal/filler material assembly treated in accordance with aspects of the present invention;

FIGS. 3a, 3b, 3c and 3d are graphs showing relative weight gains of various aluminum alloys treated in accordance with the present invention to embed in the oxidation reaction product thereof a particulate filler material of low purity;

FIGS. 4a, 4b, 4c and 4d are graphs showing relative ingot weight gain and relative unit weight gain for an aluminum parent metal assembly treated in accordance with the present invention to embed in the oxidation reaction product thereof 325 mesh magnesium aluminate spinel filler material;

FIGS. 5a, 5b, 5c and 5d are graphs showing relative ingot weight gain and relative unit weight gain for an aluminum parent metal assembly treated in accordance with the present invention to embed in the oxidation reaction product thereof 90 mesh, 98% pure SiC filler material;

FIGS. 8a, 8b, 8c and 8d are graphs showing relative ingot weight gain and relative unit weight gain for an aluminum parent metal treated in accordance with the present application to embed in the oxidation reaction product thereof 90 mesh, 99% pure SiC filler material in accordance with Example 6 of this specification;

FIG. 15 is a comparison of powder diffraction spectra obtained from a ceramic matrix composite produced in accordance with Example 27 to standard spectra;

DETAILED DESCRIPTION OF THE INVENTION AND PREFERRED EMBODIMENTS THEREOF

Figure 1A:
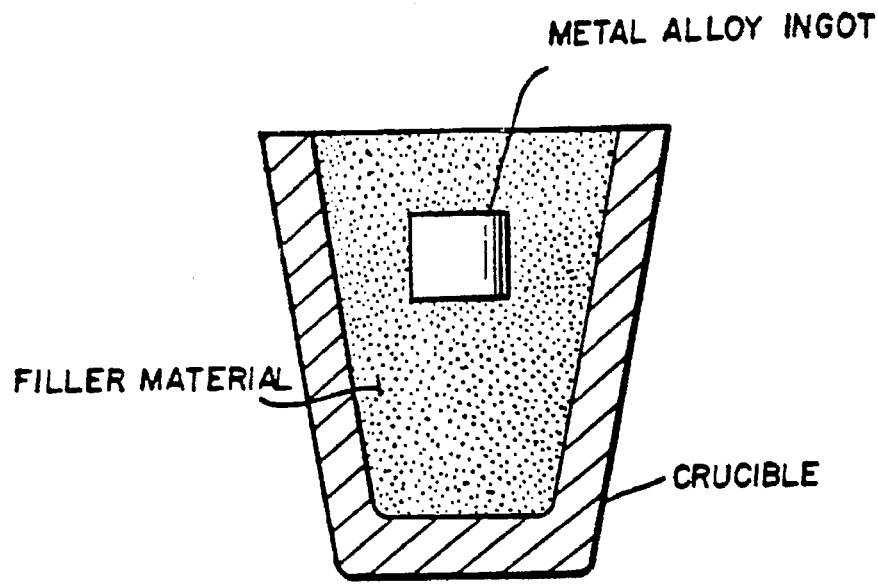
FIG. 1a is a schematic, vertical cross-sectional view showing an assembly of a parent metal ingot surrounded by a particulate filler material and confined within a refractory vessel.
Figure 1B:
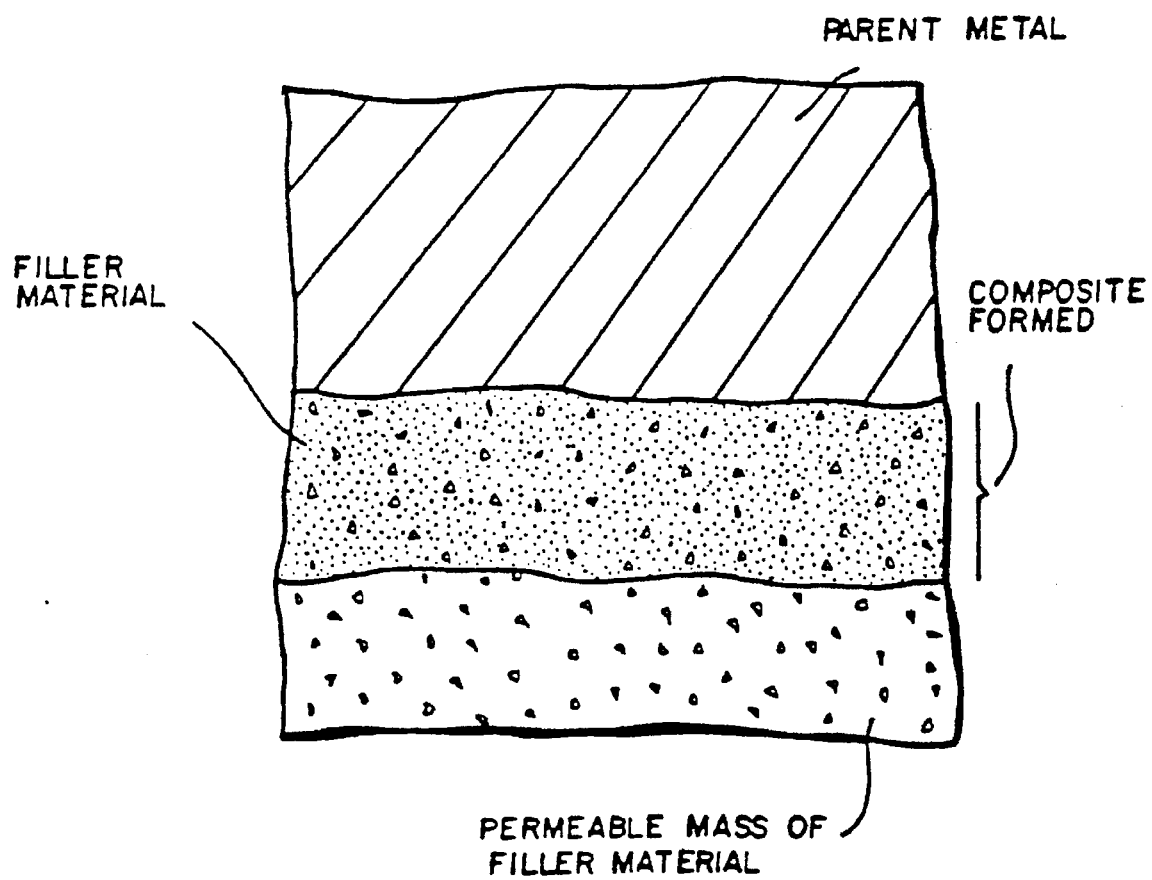
FIG. 1b is a schematic view on an enlarged scale of a portion of the assembly of FIG. 1a after permeation of a portion of the filler material by oxidation reaction product of the parent metal.
Figure 4C:
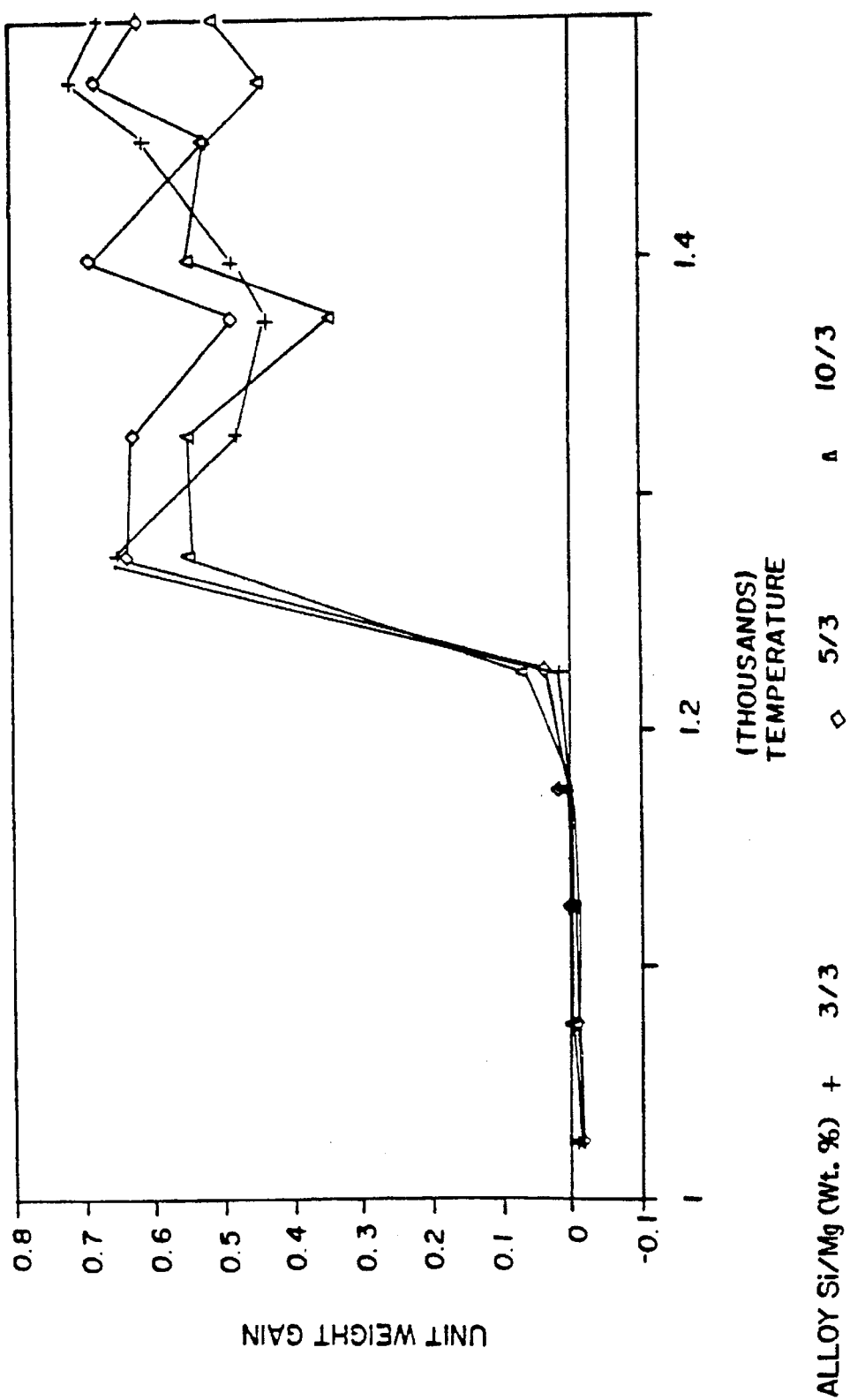

In the practice of a main embodiment of the present invention, the parent metal, which, for example, may comprise aluminum, silicon, hafnium, zinc, zirconium, tin or titanium, and a permeable mass of filler material (it is noted that filler material is referred to primarily herein, however, it should be understood that in many instances a "preform" comprising filler material could be used) are positioned adjacent to each other and oriented with respect to each other so that growth of the oxidation reaction product of the parent metal and an oxidant will be in a direction towards the filler material so that the filler material, or a part thereof, will be infiltrated by the growing oxidation reaction product and embedded therein. This positioning and orientation of the parent metal and filler material with respect to each other may be accomplished by simply embedding a body of parent metal within a bed of particulate filler material as illustrated in FIG. 1a or by positioning one or more bodies of parent metal within, on or adjacent a bed or other assembly of filler material. FIG. 1b is an enlarged view of a portion of FIG. 1a, after the filler material has been partially embedded by the oxidation reaction product. The filler may comprise, for example, a lattice of reinforcing rods, bars, wires, plates, platelets, hollow bodies, a bed of spheres (solid or hollow bubbles), powders or other particulates, aggregate, refractory fiber cloth, wire cloth, steelwool, fibers, tubes, tubules, pellets, whiskers, or the like, or a combination of the foregoing. The filler material is, in any case, arranged with respect to the parent metal so that a direction of growth of the oxidation reaction product will be towards the filler material, and the oxidation reaction product will permeate or engulf at least a portion of the filler material such that void space between filler particles or components will be filled in by the grown oxidation reaction product which, in combination with any non-oxidized constituents of the parent metal, forms a ceramic matrix.

When one or more dopant materials or dopants are required or desirable to promote or facilitate growth of the oxidation reaction product, the dopant(s) may be used on and/or in the parent metal and, alternatively or in addition, the dopants may be used on, or be provided by, the filler material.

Although the present invention is hereinafter described with a large emphasis on aluminum and specific embodiments of aluminum as the parent metal, this reference is for exemplary purposes only, and it is to be understood that other metals such as silicon, titanium, tin, hafnium, zinc, zirconium, etc., and their alloys, also can be employed which meet, or can be doped to meet, the criteria of the invention.

In the case of employing aluminum or its alloys as the parent metal and an oxygen-containing gas as the oxidant in the process of the present invention, the appropriate amounts of dopants are alloyed into or applied to the parent metal, or filler material, as described below in greater detail. The parent metal is then placed in a crucible or other refractory container with the metal surface exposed to an adjacent or surrounding mass of permeable filler material and in the presence of an oxidizing atmosphere (typically air at ambient atmospheric pressure). The resulting assembly is then heated within a furnace to elevate the temperature thereof into the region typically between about 850° C. to about 1450° C., or more preferably, between about 900° C. to about 1350° C. depending upon the filler material, the composition and/or concentration of the dopant(s), or the combination of any of these, whereupon the parent metal transport begins to occur through the oxide skin normally protecting the aluminum parent metal.

The continued high temperature exposure of the parent metal to the oxidant allows the continued oxidation of parent metal to form a polycrystalline reaction product layer of increasing thickness. This growing oxidation reaction product progressively impregnates the adjacent or surrounding mass of permeable filler material with an interconnected ceramic matrix comprising oxidation reaction product, which also may contain non-oxidized parent metal constituents, thus forming a cohesive ceramic matrix composite. The growing polycrystalline ceramic matrix impregnates or permeates the filler material at a substantially constant rate (that is, a substantially constant rate of thickness increase over time), provided sufficient air (or oxidizing atmosphere) interchange is allowed in the furnace to maintain a relatively constant source of oxidant therein. Interchange of oxidizing atmosphere, in the case of air, can be conveniently provided by vents in the furnace or by replenishment with oxygen.

Growth of the ceramic matrix continues until at least one of the following occurs: (1) substantially all of the parent metal is consumed; (2) the oxidizing atmosphere is replaced by non-oxidizing atmosphere, is depleted of oxidant, or evacuated; or (3) the reaction temperature is altered to be substantially outside the reaction temperature envelope, e.g., below the melting point of the parent metal. Usually, the temperature is reduced by lowering the furnace temperature, and then the material is removed from the furnace.

FIGS. 2a to 5d show the relative unit and ingot weight gains as a function of temperature for the growth of aluminum oxide oxidation reaction product from several aluminum alloys into various fillers. FIG. 5e is a photomicrograph of a ceramic matrix composite structure comprising a ceramic matrix comprising aluminum oxide and a metallic constituent which was grown into a permeable mass of particulate SiC filler material. FIG. 5f is an x-ray diffraction pattern of a powdered sample of the ceramic matrix composite shown in FIG. 5e.

Figure 6:
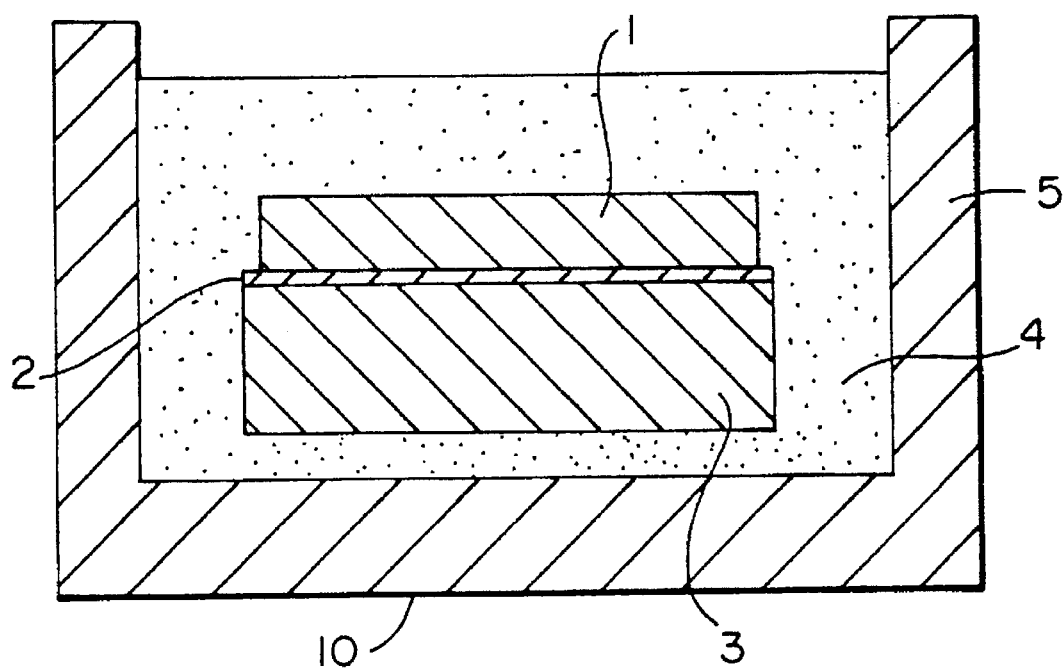
FIG. 6 is a sketch of a typical setup for fabrication of an aluminum nitride matrix composite.

In a preferred embodiment of the instant invention, nitrogen is employed as the oxidant with aluminum as the parent metal to grow an aluminum nitride oxidation reaction product. A typical lay-up 10 for the growth of near net shape aluminum nitride ceramic matrix composites is shown in FIG. 6. FIG. 6 shows a preform 1, an optional metal powder layer 2 used to initiate the oxidation reaction, an aluminum alloy ingot 3 contained within a bedding 4, all in a refractory crucible 5. The preform is enclosed on the five sides not facing the alloy ingot by an optional barrier layer 6. A bedding 4, although generally used, is not strictly required. The crucible is heated to an elevated temperature in a furnace containing a nitrogen containing atmosphere (e.g., pure nitrogen, forming gas, or $NH_3$). The temperature may range from just above the melting point of the aluminum alloy to about 1700° C. One consideration in choosing a particular reaction temperature is the desired microstructure and properties of the resulting ceramic matrix composite body. The alkaline earth metals (e.g., magnesium, calcium, strontium and barium) are particularly effective for achieving growth of an aluminum nitride oxidation reaction product. Other dopants may also be used to control the morphology of the composite, or to improve its microstructure.

In another embodiment of the present invention, the ceramic composites are fabricated from a permeable mass comprising an admixture of a parent metal and a filler, wherein the parent metal is distributed in at least a portion of the filler. In a particularly preferred embodiment, the permeable mass is consolidated into a self-supporting preform. Examples of admixtures of a parent metal distributed in at least a portion of a filler would include, for example, a mixture comprising a parent metal powder and one or more ceramic powders. Other examples include a parent metal open-cell foam whose cells contain one or more ceramic powders, or short fibers of a parent metal mixed with ceramic platelets, or an assemblage of parent metal screen layers at least partially filled with ceramic whiskers, or an admixture of parent metal flake or parent metal shot with ceramic microspheres. The admixture may be fabricated to a desired shape to yield a preform. In addition, a barrier means may be provided to define at least one surface of the admixture. A preform should preferably provided with sufficient green strength to withstand handling, and preferably approximates the net shape of the ceramic article to be produced. The permeable mass may be porous in the sense that it is not fully dense but instead includes interstitial pores among the bodies of filler material and parent metal. In a preferred embodiment, there is sufficient porosity to render the admixture permeable to a gaseous oxidant. In addition, the admixture is permeable with respect to accommodating the development or growth of the oxidation reaction product as a matrix within the admixture without substantially disturbing, upsetting, or otherwise altering the basic configuration or geometry of the admixture. Spatial volume available within the permeable mass for the development of the oxidation reaction product matrix typically will be at least about 5% of the bulk volume of the permeable mass, and more preferably, at least 25% of the volume of the permeable mass.

Examples of fillers useful in the present invention, depending upon parent metal and oxidation systems chosen, include one or more of aluminum oxide, silicon carbide, silicon aluminum oxynitride, zirconium oxide, zirconium boride, titanium nitride, barium titanate, boron nitride, titanium diboride, aluminum nitride, tungsten, molybdenum, tantalum, magnesium oxide, calcium silicate, boron carbide, aluminosilicates, magnesium aluminate, silicon carbide or Si—C—O—N fibers (such as NICALON® silicon carbide fibers), silicon nitride, ferrous alloys, e.g., iron-chromium-aluminum alloy, carbon, aluminum and mixtures thereof. However, any suitable filler may be employed in the invention, and four specific classes of useful fillers may be identified.

The first class of fillers contains those chemical species which, under the temperature and oxidizing conditions of the process, are not volatile, are thermodynamically stable and do not react with or dissolve excessively in the molten parent metal. Numerous materials are known to those skilled in the art as meeting such criteria in the case where aluminum parent metal and air or oxygen as the oxidant are employed. Such materials include the single-metal oxides of: aluminum, $Al_2O_3$; cerium, $CeO_2$; hafnium, $HfO_2$; lanthanum, $La_2O_3$; neodymium, $Nd_2O_3$; praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition a large number of binary, ternary, and higher order metallic compounds such as magnesium aluminate spinel, $MgO-Al_2O_3$, are contained in this class of stable refractory compounds. Examples of filler materials which are stable under the reaction conditions that exist when an oxidant comprising nitrogen is used include AlN and $TiB_2$.

The second class of suitable fillers are those which are not intrinsically stable in the oxidizing and high temperature environment of the process, but which, due to relatively slow kinetics of the degradation reactions, can be incorporated as a filler phase within the growing ceramic matrix composite body. An example in the case of an alumina ceramic matrix is silicon carbide. This material would oxidize completely under the conditions necessary to oxidize aluminum with oxygen or air in accordance with the invention were it not for a protective layer of silicon dioxide forming and covering the silicon carbide particles to limit further oxidation of the silicon carbide. Examples of this second class of fillers which are useful when an oxidant comprising nitrogen is used include $Si_3N_4$, $B_4C$, and BN. These fillers may react slowly so as not to inhibit the oxidation of the aluminum parent metal and, accordingly, the filler may become embedded in the aluminum nitride oxidation reaction product in substantially its original form.

A third class of suitable fillers are those which are not, on thermodynamic or on kinetic grounds, expected to survive the oxidizing environment or exposure to molten metal necessary for the practice of the present invention. Such fillers can be made compatible with the process of the present invention (1) if the oxidizing environment is made less active, or (2) through the application of a coating thereto, which makes the species kinetically non-reactive in the oxidizing environment. An example of such a class of fillers would be carbon fiber employed in conjunction with a molten aluminum parent metal. If the aluminum is to be oxidized with air or oxygen at, for example, 1250° C., to generate a ceramic matrix incorporating the fiber, the carbon fiber will tend to react with both the aluminum (to form aluminum carbide) and the oxidizing environment (to form CO or $CO_2$). These unwanted reactions may be avoided by coating the carbon fiber (for example, with alumina) to prevent reaction with the parent metal and/or oxidant and optionally employing a $CO/CO_2$ atmosphere as an oxidant which tends to be oxidizing to the aluminum but not to the carbon fiber. When an oxidant comprising nitrogen is used for the formation of an aluminum nitride ceramic matrix composite, non-reactive materials such as $TiB_2$ can be used to coat a reactive material such as NICALON® silicon carbon fibers.

Figure 7A:
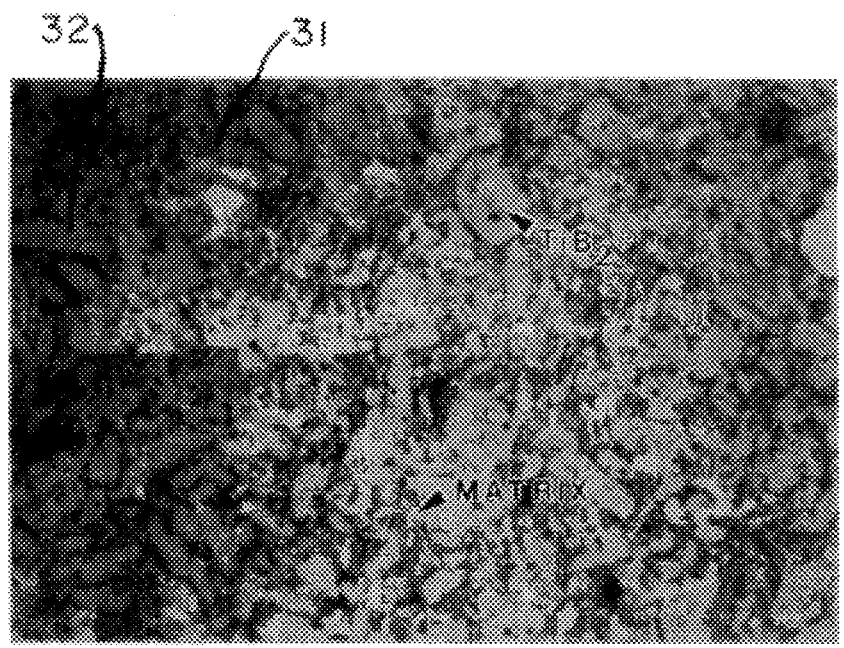
FIGS. 7a and 7b are photomicrographs at 1000× magnification of the structure of aluminum nitride composites.
Figure 7B:
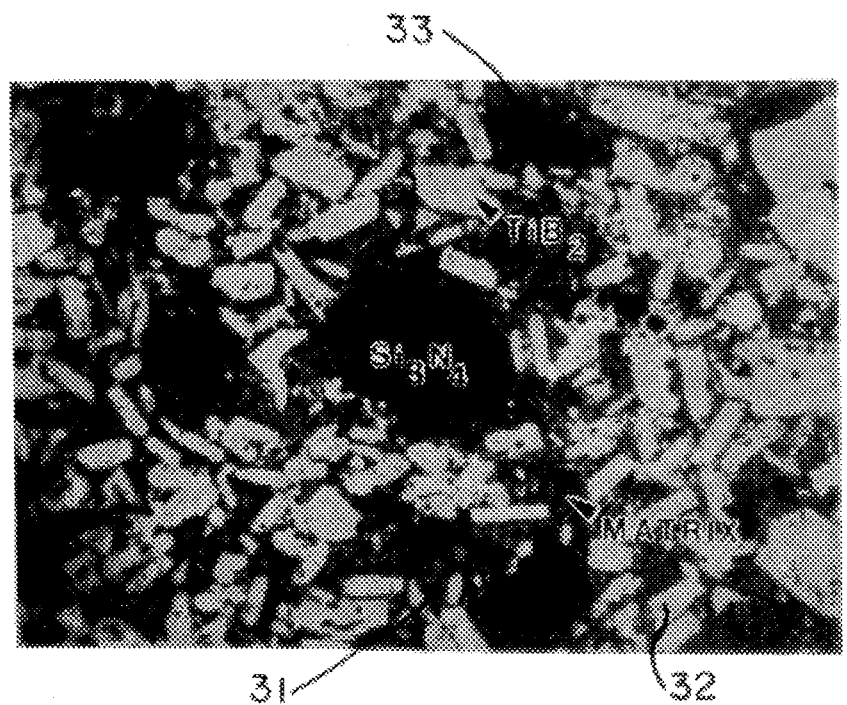

A fourth class of filler materials are those which serve to promote the reaction or to produce a particular type of matrix structure. For example, when an aluminum parent metal is used in combination with an atmosphere comprising nitrogen as an oxidant, such as filler materials, might assist or promote the formation of the aluminum nitride oxidation reaction product (e.g., $Si_3N_4$ filler), or they might provide nucleation sites for the formation of the aluminum nitride oxidation reaction product thereby increasing the ceramic content of the matrix (e.g., AlN filler). For example, FIGS. 7a and 7b illustrate the microstructure of aluminum nitride ceramic matrix composite structures grown without and with $Si_3N_4$ additions to a $TiB_2$/Fe preform, showing the ceramic matrix 31, the $TiB_2$ filler 32, and the $Si_3N_4$ particles 33.

Mixtures of filler materials can produce improved ceramic matrix composites. For example, fine grained AlN powder added to other forms of AlN filler provides additional nucleation sites for aluminum nitride formation, and thus results in a higher ceramic matrix content for the composite structure. Adding AlN powder to filler materials of different compositions, for example, $TiB_2$ filler, also serves to increase the ceramic matrix content of the composite, compared to ceramic matrix composites grown into pure $TiB_2$ filler.

By way of explanation of the oxidation process, but not wishing to be bound thereby, the molten metal is transported along channels at certain high energy grain intersections of the oxidation reaction product phase. It is well understood that any polycrystalline material exhibits a range of grain boundary energies (surface free energies) depending upon the degree of lattice misalignment at the interface between two adjacent crystals or grains of the same material. In general, grain boundaries of low angular misalignment exhibit low surface energies, while high angle boundaries have high surface energies, although the relationship may not be a simple, monotonically increasing function of the angle due to the occasional occurrence of more favorable atomic alignments at intermediate angles. Similarly, the lines along which three grains intersect also typically are high energy features in a polycrystalline microstructure.

As further explained in the aforesaid Commonly Owned Ceramic Matrix Patents and Patent Applications, but not wishing to be bound thereby, the parent metal and the oxidant apparently form a favorable polycrystalline oxidation reaction product having a surface free energy relationship with the molten parent metal such that within some portion of a temperature region in which the parent metal is molten, at least some of the grain intersections (i.e., grain boundaries or three-grain-intersections) of the polycrystalline oxidation reaction product are replaced by planar or linear channels of molten metal. For example, consider a grain boundary having a surface free energy greater than the alternative configuration of two substantially geometrically equivalent crystal/molten metal interface boundaries. In these circumstances, such a high energy grain boundary either will not form or will spontaneously decompose in favor of a planar channel of molten metal bounded by two crystal/metal interfaces. When the molten metal is maintained in the oxidizing environment and within the effective portion of the temperature region, molten metal is drawn or transported along such channels in the direction of the oxidant. More specifically, this phenomenon occurs when (1) the liquid metal wets the crystalline oxidation reaction product phase (i.e., $\gamma_{SL} < c_{SG}$, where $\gamma_{SL}$ denotes the surface free energy of the crystal/molten metal interface and $\gamma_{SG}$ denotes the surface free energy of the crystal/vapor interface), and (2) the energy of some of the grain boundaries, $\gamma_B$, is greater crystal/vapor interface), and (2) the energy of some of the grain boundaries, $\gamma_B$, is greater than twice the crystal/liquid metal interfacial energy, i.e., $\gamma_{BMAX} > 2\gamma_{SL}$ where $\gamma_{BMAX}$ is the maximum grain boundary energy of the polycrystalline material. Molten metal channels of linear character can be formed in a similar way if metal replaces some or all of the three-grain-intersections in the material.

Since the channels are at least partially interconnected, (i.e., the grain boundaries of the polycrystalline material are interconnected), molten metal is transported through the polycrystalline oxidation reaction product to its surface and into contact with the oxidizing atmosphere, where the metal undergoes oxidation resulting in the continual growth of the oxidation reaction product. Furthermore, since the wicking of molten metal along channels is a much faster transport process than the ionic conduction mechanisms of most normal oxidation phenomena, the growth rate observed for the oxidation reaction product with this oxidation process is much faster than that typically observed in other oxidation phenomena.

While the oxidation reaction product of the present invention is interpenetrated by metal along high energy grain intersections, the polycrystalline oxidation reaction product phase is itself interconnected in one or more dimensions, preferably in three dimensions, along relatively low angle grain boundaries which do not meet the criterion $\gamma_B > 2\gamma_{SL}$. Thus, the ceramic matrix of the composites of this invention exhibits many of the desirable properties of the classical ceramic (i.e., hardness, refractoriness, wear resistance, etc.) while deriving additional benefits from the presence of the distributed metal phase (notably higher toughness and resistance to fracture).

In the embodiment of the present invention wherein a ceramic matrix body is formed, the ceramic matrix, which may be obtained by oxidation of a molten parent metal with a vapor-phase oxidant to form a polycrystalline oxidation reaction product, is characterized by an essentially single phase polycrystalline oxidation reaction product and distributed metal or voids or both, and by crystal lattice misalignments at oxidation reaction product crystallite grain boundaries which are less than the lattice misalignments between those neighboring oxidation reaction product crystallites having planar metal channels or planar voids, or both, disposed between said neighboring crystallites. In certain embodiments, substantially all of the grain boundaries in said oxidation reaction product phase have an angular mismatch between adjacent crystal lattices of less than about 5 degrees.

One or more oxidants can be employed in the process of the present invention. Typically a vapor-phase oxidant is employed, the vapor-phase oxidant normally being gaseous, or at least gaseous under the process conditions. The vapor-phase oxidant provides an oxidizing atmosphere, such as atmospheric air. Typical vapor oxidants include, for example, elements, compounds or combinations of the following, including volatile or vaporizable elements, compounds, or constituents of compounds or mixtures: oxygen, nitrogen, a halogen, sulphur, phosphorus, arsenic, carbon, boron, selenium, tellurium, methane, ethane, propane, acetylene, ethylene, propylene (the hydrocarbons as a source of carbon), and mixtures such as air, $H_2/H_2O$ and a $CO/CO_2$, the latter two (i.e., $H_2/H_2O$ and $CO/CO_2$) being useful in reducing the oxygen activity of the environment relative to desirable oxidizable constituents of the preform. Oxygen or gas mixtures containing oxygen (including air) are suitable vapor-phase oxidants, with air usually being preferred for obvious reasons of economy. When a vapor-phase oxidant is identified as containing or comprising a particular gas or vapor, this means a vapor-phase oxidant in which the identified gas or vapor is the sole, predominant or at least a significant oxidizer of the parent metal under the conditions obtained in the oxidizing environment utilized. For example, although the major constituent of air is nitrogen, the oxygen content of air is normally the sole oxidizer of the parent metal under the conditions obtained in the oxidizing environment utilized. Air therefore falls within the definition of an "oxygen-containing gas" oxidant but not within the definition of a "nitrogen-containing gas" oxidant. An example of a "nitrogen-containing gas" oxidant as used herein is "forming gas", which typically contains about 96 volume percent nitrogen and about 4 volume percent hydrogen. Nitrogen is a particularly preferred vapor-phase oxidant for producing the porous aluminum nitride matrix composite in which the parent metal comprises finely divided aluminum and which is admixed with the ceramic filler of the permeable mass. Argon gas has been found to be a useful inert gas for reducing the partial pressure and activity of the nitrogen vapor-phase oxidant.

An oxidant which is liquid or solid at the process conditions may be employed in conjunction with, or independently from, the vapor-phase oxidant. Such additional oxidants may be particularly useful in enhancing oxidation of the parent metal preferentially within the permeable mass, rather than beyond its surfaces. That is, the use of such liquid or solid oxidants may create an environment within the permeable mass more favorable to the oxidation kinetics of the parent metal than the environment outside the permeable mass. This enhanced environment is beneficial in promoting matrix development within the permeable mass to the boundary and minimizing overgrowth. When a solid oxidant is employed, it may be dispersed through the entire permeable mass or through a portion of the permeable mass, such as in particulate form and admixed with the permeable mass, or it may be utilized as coatings on the permeable mass particles. Any suitable solid oxidant may be employed depending upon its compatibility with the vapor-phase oxidant. Such solid oxidants may include suitable elements, such as boron or carbon, or suitable reducible compounds, such as silicon dioxide (as a source of oxygen) or silicon nitride (as a source of nitrogen) or certain borides of lower thermodynamic stability than the oxidation reaction product of the parent metal.

In some instances, the oxidation reaction of the parent metal may proceed so rapidly with a solid oxidant that the oxidation reaction product tends to fuse due to the exothermic nature of the process. This occurrence can degrade the microstructural uniformity of the resulting ceramic matrix or ceramic matrix composite body. This rapid exothermic reaction can be ameliorated by mixing into the composition relatively inert fillers which absorb the excess heat. An example of such a suitable inert filler is one which is identical, or substantially identical, to the intended oxidation reaction product.

If a liquid oxidant is employed, the liquid oxidant may be dispersed throughout the entire permeable mass or a portion thereof adjacent to the molten metal, provided such liquid oxidant does not prevent access of the vapor-phase oxidant to the molten parent metal. Reference to a liquid oxidant means one which is a liquid under the oxidation reaction conditions, and so a liquid oxidant may have a solid precursor, such as a salt, which is molten or liquid at the oxidation reaction conditions. Alternatively, the liquid oxidant may be a liquid precursor, e.g. a solution of a material, which is used to coat part or all of the porous surfaces of the permeable mass and which is melted or decomposed at the process conditions to provide a suitable oxidant moiety. Examples of liquid oxidants as herein defined include low melting glasses.

In the embodiment in which the parent metal is distributed throughout the permeable mass as finely divided bodies, the permeable mass is charged to a furnace, supplied with an oxidant, and elevated to the appropriate temperature interval to effect the conversion from a loose admixture or a weak preform to a structural component. Depending upon the reactivity of the filler relative to the parent metal, the heating cycle may vary. In the preferred embodiment of this invention, the permeable mass is charged to a furnace which has been preheated to the reaction temperature. If dopants are utilized, they may be included in the permeable mass or alloyed into the parent metal, or both. The parent metal is melted, preferably without complete loss of the dimensional integrity of the permeable mass, but the temperature is kept below the melting point of the oxidation reaction product and the filler. The molten parent metal reacts with the oxidant to form oxidation reaction product. The porosity of the permeable mass is sufficient to accommodate the oxidation reaction product without substantially disturbing or displacing the boundaries of the permeable mass. Continued exposure of the molten parent metal to the oxidizing environment induces transport of molten metal through the oxidation reaction product, progressively drawing molten metal into and through the oxidation reaction product towards the oxidant, causing progressive growth of the polycrystalline oxidation reaction product. The oxidation reaction product grows into interstitial spaces of the the permeable mass. Concurrently, voids are created upon migration or transport of the molten metal, these voids tending to substantially inversely replicate the size and shape of the original finely divided parent metal bodies. If the volume percent of parent metal is too low, the resulting structure may be weak relative to a body formed utilizing a greater volume percent of metal. On the other hand, excessive parent metal may be undesirable, in that the final product may contain too much metal for the end-use application. For an aluminum parent metal reacted in air, a desirable range for this metal is about 30 to about 50 volume percent of the total permeable mass. For an aluminum parent metal reacted in a nitrogen-containing atmosphere, a desirable range for this metal is about 20 to about 50 volume percent of the total permeable mass.

The initial growth of oxidation reaction product from the molten metal particulate fills at least a portion of the inter-particle pores of the permeable mass and creates voids, as noted above. Continuing the oxidation reaction process promotes the continual migration of residual molten metal outwardly through the oxidation reaction product. As in the case of bulk metal contacting an exterior surface of a permeable mass, oxidation continues until either the parent metal or oxidant is exhausted, the temperature is altered to be outside of the oxidation processing "window", or the developing reaction product contacts a barrier material.

The resulting ceramic composite product includes a permeable mass infiltrated to its boundaries by a ceramic matrix comprising a polycrystalline material consisting essentially of the oxidation reaction product of the parent metal with an oxidant and, optionally, one or more metallic constituents such as non-oxidized constituents of the parent metal or reduced constituents of any reducible substances, or both. It further should be understood that voids are developed by a partial or essentially complete displacement of the finely divided parent metal, but the volume percent of voids will depend largely on such conditions as temperature, time, type of parent metal, volume fraction of parent metal, and dopant concentrations. Typically, some voids are completely isolated (closed), while others may be part of a network which opens to the exterior of the body. Typically in these polycrystalline ceramic structures, the oxidation reaction product crystallites are interconnected in more than one dimension, preferably in three dimensions, and the metallic constituents resulting from the transport of molten parent metal may be at least partially interconnected. The ceramic composite product of this invention has generally well-defined boundaries and possesses the approximate dimensions and geometric configuration of the original permeable mass. The polycrystalline ceramic composite may comprise metallic constituents such as non-oxidized parent metal, the amount depending largely on such factors as process conditions, alloying constituents in the parent metal, and dopants, although in certain cases it may contain substantially no metal. The volume percent metal may be tailored to meet the desired end-use properties for the product, and for several applications, such as engine components, it may be preferred to have a metal content in the finished component of about 5–10 percent or less. In accordance with this preferred embodiment, it will be observed that the filler is essentially nonreactive with the parent metal under the process conditions. Further, although the invention is described herein with particular emphasis to aluminum and specific embodiments of aluminum parent metal, this reference is for illustration purposes only, and it is to be understood that other metals such as silicon, titanium, tin, zirconium, etc., also can be employed which meet, or can be doped to meet, the criteria of this invention. Thus, in a specific embodiment, an aluminum parent metal in particulate form is admixed with at least a portion of a magnesium oxide particulate filler and consolidated to a permeable preform. One or more dopants may be employed as further described herein, either distributed through or constituted by the filler, or alloyed into the aluminum parent metal, or both. The preform may be created or formed into any predetermined or desired size or shape by any conventional method such as dry pressing, wet pressing, slipcasting, injection molding, transfer molding, sediment casting, vacuum forming, etc., by processing any suitable filler material such as metal oxides, borides, carbides, and the like. The filler may be bonded together to form the preform with any suitable binding agent, e.g. polyvinyl alcohol, polypropylene carbonate perceramic polymers (e.g., ceramers) or the like, which does not interfere with the reactions of the invention, or leave undesirable residual by-products within the ceramic composite product.

Examples of materials useful in fabricating a permeable mass in practicing the present invention, depending upon the parent metal and oxidant chosen, may include one or more of aluminum oxide, silicon carbide, silicon aluminum oxynitride, zirconium oxide, zirconium boride, titanium nitride, barium titanate, boron nitride, silicon nitride, various ferrous alloys, e.g., an iron-chromium-aluminum alloy, carbon, and mixtures thereof. However, any suitable material may be employed in the preform. For example, if aluminum is employed as the parent metal, and aluminum nitride is the intended oxidation reaction product, aluminum nitride, magnesium aluminate, magnesium oxide and aluminum oxide particles would be examples of suitable materials for the preform; if zirconium is employed as a parent metal, and zirconium nitride is the intended oxidation reaction product, zirconium diboride particles would be an example of a suitable composition for a preform; if titanium is employed as a parent metal and titanium nitride is the intended oxidation reaction product, a preform comprised of, for example, alumina and/or titanium diboride particles would be suitable; if tin is employed as a parent metal, and tin oxide is the intended oxidation reaction product, a preform comprised of, for example, alumina particles would be suitable; or if silicon is employed as the parent metal and silicon nitride is the intended oxidation reaction product, a preform comprised of silicon nitride particles would be suitable.

The finely divided parent metal bodies incorporated into at least a portion of the permeable mass should be of a suitable size so as to form voids by inverse replication upon transport of the metal. Ideally, the voids are sufficiently numerous so as to enhance the ceramic properties, but yet not be so large or numerous as to detrimentally impact the structural integrity of the product. Further, metal particulate which is too finely divided poses a high safety risk in that the large surface area to volume ratio of such particulate poses an explosion hazard should they become airborne in sufficient concentrations. Thus, a particle size for the parent metal of about 50 to 500 grit (500 to 171 microns), preferably about 100 to 280 grit (173 to 40 microns), is useful. The terms "particulate" or "particle" with respect to the filler is used broadly to include powders, fibers, whiskers, spheres, platelets, agglomerates, and the like.

Suitable fillers may have a grit size of from about 4 to 1000 (6000 to 5 microns), or even finer, or an admixture of various grit sizes and types may be used. The permeable mass may be charged to a preheated furnace, supplied with an oxidant, such as, for example, air, that is at the process temperature. Where desired, the permeable mass may be heated slowly or relatively rapidly (with due consideration for the creation of thermally induced stress) to or within the process temperature region, which is above the melting point of the parent metal but below the melting point of the oxidation reaction product. For example, in the case of aluminum parent metal and using air as oxidant, this temperature typically occurs over the range of from about 850°–1450° C., and more preferably of between about 900°–1350° C. In the case of using nitrogen as the oxidant, the temperature range may extend to about 800° C. to about 1700° C.

Alternatively, the permeable mass may comprise a reactive admixture of parent metal and oxidant. That is, the permeable mass may contain an element or compound comprising a metallic constituent, e.g. silicon dioxide, silicon nitride or boron, which is reducible by the molten parent metal under the process conditions. The permeable mass may consist entirely of the reducible substance or oxidant, or may additionally include one or more inert filler materials. For example, a composite ceramic article may be made by blending aluminum parent metal particulate with a silicon nitride-containing permeable mass and conducting the process in a nitrogen-containing atmosphere at about 900°–1200° C.

In one particularly preferred embodiment, the permeable mass comprising the reducible substance is heated to initiate the oxidation-reduction reaction prior to any substantial atmospheric oxidation of the aluminum component. Accordingly, slowly heating the permeable mass in an atmosphere containing the oxidant is to be avoided. The permeable mass is charged to a furnace preheated to the process temperature range. Once the oxidation-reduction reaction is initiated, it tends to be self-sustaining as it tends to be exothermic, and therefore the temperature of the permeable mass may rise somewhat. The oxidation-reduction reaction proceeds rapidly and substantially throughout the bulk of the permeable mass, to develop an article at this stage which is composed of the oxidation-reduction product, reduced constituents of the reducible substance, and residual parent metal which is available for the oxidation reaction with the oxidant. At the conclusion of the oxidation-reduction reaction, the procedure may be continued as described above with regard to the growth of oxidation reaction product. The pores of the permeable mass are filled with oxidation reaction product, thereby resulting in the concomitant formation of voids at the locations previously occupied by parent metal particles, and residual parent metal is transported through the reaction product towards the surface to form, upon oxidation reaction, additional oxidation reaction product.

The volume percent of metallic constituents in the ceramic product can vary, and further can be tailored to meet the desired endrose properties. Typically, the final product comprises about 0 to 40 volume percent metallic constituents, and preferably about 1 to 20 percent.

Certain parent metals under specific conditions of temperature and oxidizing atmosphere meet the criteria necessary for the oxidation phenomenon of the present invention with no special additions or modifications. However, as described in the aforesaid Commonly Owned Ceramic Matrix Patents and Patent Applications, dopant materials used in combination with the parent metal can favorably influence or promote the oxidation reaction process. While not wishing to be bound by any particular theory or explanation of the function of the dopants, it appears that some of them are useful in those cases where appropriate surface energy relationships between the parent metal and its oxidation reaction product do not intrinsically exist. Thus, certain dopants or combinations of dopants, which reduce the solid-liquid interfacial energy, will tend to promote or accelerate the development of the polycrystalline structure formed upon oxidation of the metal into one containing channels for molten metal transport, as required for the process of the present invention. Another function of the dopant materials may be to initiate the ceramic growth phenomenon, apparently either by serving as a nucleating agent for the formation of stable oxidation product crystallites, or by disrupting an initially passive oxidation product layer in some fashion, or both. This latter class of dopants may not be necessary to create the ceramic growth phenomenon of the present invention, but such dopants may be important in reducing any incubation period for the initiation of such growth to within commercially practical limits for certain parent metal systems. Still another function of dopants may be to control the rate of formation of oxidation reaction product. For example, in addition to the above-described dopants, certain dopants may be utilized to accelerate or decelerate the rate of the oxidation reaction, thus improving, for example, morphology and/or uniformity of the product. Those dopants may assist in obtaining net or near net shapes.

The function or functions of the dopant material can depend upon a number of factors other than the dopant material itself. These factors include, for example, the particular parent metal utilized, the end product desired, the particular combination of dopants when two or more dopants are used, the use of an externally applied dopant in combination with an alloyed dopant, the concentration of the dopant, the oxidizing environment utilized, and the process conditions.

The dopant or dopants (1) may be provided as alloying constituents of the parent metal, (2) may be applied to at least a portion of the surface of the parent metal, or (3) may be applied to or supplied by the filler or a part of the filler bed, or any combination of two or more of techniques (1), (2) and (3) may be employed. For example, an alloyed dopant may be used in combination with an externally applied dopant. In the case of technique (3), where a dopant or dopants are applied to the filler, the application may be accomplished in any suitable manner, such as by dispersing the dopants throughout part or the entire mass of filler in fine-droplet or particulate form, preferably in a portion of the bed of filler adjacent the parent metal. Application of any of the dopants to the filler may also be accomplished by applying a layer of one or more dopant materials to and within the bed, including any of its internal openings, interstices, passageways, intervening spaces, or the like, that render it permeable. A source of the dopant may also be provided by placing a rigid body containing the dopant in contact with and between at least a portion of the parent metal surface and the filler bed. For example, if a silicon dopant is required, a thin sheet of silicon-containing glass or other material can be placed upon a surface of the parent metal. When the parent metal overlaid with the silicon-containing material is melted in an oxidizing environment (e.g., in the case of aluminum in air, between about 850° C. to about 1450° C., preferably about 900° C. to about 1350° C.), growth of the polycrystalline ceramic material into the permeable filler occurs. In the case where the dopant is externally applied to at least a portion of the surface of the parent metal, the polycrystalline oxide structure generally grows into the permeable filler substantially beyond the dopant layer (i.e., to beyond the depth of the applied dopant layer). In any case, one or more of the dopants may be externally applied to the parent metal surface and/or to the permeable bed of filler. Additionally, dopants alloyed within the parent metal and/or externally applied to the parent metal may be supplemented by dopant(s) applied to the filler bed. Thus, any concentration deficiencies of the dopants alloyed within the parent metal and/or externally applied to the parent metal may be supplemented by additional quantities of the respective dopant(s) applied to the filler bed, and vice versa.

Useful dopants for an aluminum parent metal, particularly with air as the oxidant, include, for example, magnesium metal and zinc metal, in combination with each other or in combination with other dopants described below. These metals, or a suitable source of the metals, may be alloyed into the aluminum-based parent metal at concentrations for each of between about 0.1–10% by weight based on the total weight of the resulting doped metal. The concentration range for any one dopant will depend on such factors as the combination of dopants and the process temperature. Concentrations within the above-mentioned range appear to initiate oxidation reaction product growth, enhance metal transport and favorably influence the growth morphology of the resulting oxidation reaction product.

Other dopants which are effective in promoting polycrystalline oxidation reaction product growth, for aluminum-based parent metal systems are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

One or more dopants may be used depending upon the circumstances, as explained above. For example, in a system wherein the parent metal comprises aluminum and the oxidant comprises air, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium, lithium, calcium, boron, phosphorus, yttrium, barium, strontium, zirconium, gallium, lanthanum, titanium, chromium, cerium and nickel, which may be used individually or in combination with one or more other dopants depending on the oxidant and process conditions. Sodium and lithium may be used in very small amounts in the parts per million range, typically about 100–200 parts per million, and each may be used alone or together, or in combination with other dopant(s). Rare earth elements such as cerium, lanthanum, praseodymium, neodymium and samarium are also useful dopants, and herein again especially when used in combination with other dopants. The precise function of the dopant(s) may vary depending upon which process conditions are used, which parent metal is used, which oxidant is used, other dopants that may be present, etc. For example, it is possible that under one set of conditions a certain dopant may tend to initiate growth, but under a different set of conditions the same dopant may tend to control the rate of formation of oxidation reaction product. Thus, it may be difficult to categorize completely the function of any one particular dopant.

In the aluminum-nitrogen system, particularly successful dopants for achieving growth of aluminum nitride oxidation reaction product include the alkaline earth elements strontium, calcium, magnesium, and barium, as well as lithium, cerium, lanthanum and gallium. Desirable weight percents for these dopants range from about 0.1 percent to about 15 percent by weight based on the total weight of the resulting doped metal. Stated more specifically, particularly successful dopants include strontium and calcium at individual concentrations of from about 1 to about 7 percent by weight; lithium at concentrations of about 0.2–5 percent by weight; barium at concentrations of about 1–2 percent by weight; magnesium at concentrations of about 3–6 percent by weight; cerium and lanthanum at individual concentrations of about 1–5 percent by weight; and gallium at concentrations of about 2–4 percent by weight.

As stated previously, the amount and type of dopants needed to form an aluminum nitride oxidation reaction product varies widely depending upon, for example, the processing conditions, the filler material, and the temperature. However, generally stated, an aluminum nitride oxidation reaction product can be grown at temperatures ranging from about 700° to about 700° C. in an atmosphere containing substantially pure nitrogen, or a nitrogenous atmosphere in which other non-oxidizing gases, such as hydrogen, or argon, for example, are contained.

Moreover, as stated previously, the use of additional dopant materials may be desirable to control the rate of formation of aluminum nitride oxidation reaction product. Specifically, dopants such as silicon, germanium, magnesium and boron are useful when combined with the other dopants recited above for the growth of aluminum nitride oxidation reaction product. For example, it has been found that silicon concentrations ranging generally from about 0.25–5 percent by weight in combination with strontium, calcium or lithium provide desirable aluminum nitride oxidation reaction product growth. However, a higher silicon concentration may be desirable if certain filler materials are utilized. For example, for growth of aluminum nitride into a silicon carbide filler with the use of at least one of strontium, calcium or lithium, it has been discovered that the silicon content of the parent metal is preferably within the range of 10–15 percent by weight. It has also been found that when strontium is used as a dopant, germanium functions to improve the morphology and/or uniformity of the aluminum nitride oxidation reaction product. However, as discussed above, many factors influence the precise amounts and types of dopants which can be successfully combined to grow aluminum nitride oxidation reaction products.

Still further, it has been discovered that additional dopants can be utilized to modify the microstructure of ceramic composite bodies comprising aluminum nitride oxidation reaction product. Specifically, dopants including transition metals such as nickel, iron, cobalt, titanium, copper, zinc, yttrium and zirconium, at concentrations of from about 1–15 percent by weight, based on the total weight of the resulting doped metal, have been used to desirably modify the microstructure of an aluminum nitride oxidation reaction product.

Specifically, nickel at concentrations of from about 1–12 percent by weight; iron at concentrations of from about 1–9 percent by weight; and cobalt at similar concentrations have all produced desirable results. Generally, the addition of transition metals serves to produce an aluminum nitride ceramic matrix composite with a finer microstructure, an increased ceramic content, and greater hardness than ceramic matrix composites grown under similar conditions but without these additions.

Filler materials which have been found to be useful for the production of aluminum nitride ceramic matrix composite materials include AlN, TiN, BN, $Si_3N_4$, $Al_2O_3$, MgO, $MgAl_2O_4$, $ZrO_2$, alumino-silicate, $CaSiO_3$, SiC, $B_4C$, $TiB_2$ and mixtures of these compounds. Some of these filler materials, such as AlN and $TiB_2$ may be thermodynamically stable under the oxidation reaction product formation conditions. However, others such as $Si_3N_4$, $B_4C$, BN, etc. may react, at least partially, with the oxidation reaction product and/or molten parent metal.

Still further, some filler materials may be classified as "active" filler materials. In general, these filler materials may assist or promote the formation of oxidation reaction product and/or may provide nucleation sites for the formation of the oxidation reaction product. Specifically, for example, the addition of fine grained AlN powder to a filler material of a different chemical or physical composition may also serve to increase the resulting ceramic matrix content of the ceramic matrix composite, as compared to a ceramic matrix composite which does not contain any such powdered AlN filler material. Further, such fillers may also promote particular crystalline orientations and morphology that may improve the properties of the ceramic matrix composite body for particular industrial applications. Another specific example of an active filler material for an aluminum nitride oxidation reaction product is $Si_3N_4$.

When a vapor-phase oxidant is used for the growth of aluminum nitride ceramic matrix composites, the reaction atmosphere generally contains nitrogen, either as molecular nitrogen, $N_2$, or in a compound such as $NH_3$. However, in some cases the nitrogen can be provided, in whole or in part, as a solid-phase or liquid-phase oxidant. If only aluminum nitride is desired as the ceramic matrix, the nitrogen, in whatever form, should be the strongest oxidizer which is available to the parent metal. When a vapor-phase oxidant is utilized, the concentration of stronger oxidizers, such as $O_2$, should be minimized as much as is practicable. The reaction rate may be reduced by reducing the partial pressure of the nitrogen-containing gas. Accelerated reaction rates may be obtained by increasing the pressure of the nitrogen-containing gas to above one atmosphere.

In at least the embodiment for producing aluminum nitride matrix composites in which the parent metal is admixed into at least a portion of the filler material to produce a porous structure, the rate of nitridation may be regulated by varying the nitrogen gas activity, such as, for example, by varying the nitrogen gas partial pressure. Increasing gas pressure above ambient atmospheric pressure tends to increase activity; conversely, reducing total pressure below atmospheric pressure or diluting the atmosphere with one or more inert gases tends to reduce nitrogen partial pressure and activity. Typically, in the above-described embodiment, the nitridation of aluminum is quite exothermic, and in a pure nitrogen atmosphere under the other local processing conditions, it has been observed that once the reaction begins, the heat generated by the nitridation reaction raises the temperature of the body, which accelerates the reaction further. The bodies formed by such a rather uncontrolled reaction tend to be denser on the exterior surfaces, leaving a very porous interior due to sealing off of the interior from access by the nitrogen vapor-phase oxidant. While it may be desirable in some applications to have a porous core, dense skin body, in others a body of uniform density or porosity is preferred. Reducing the nitrogen activity by diluting the atmosphere with inert argon gas has been discovered as one such way of slowing down the nitridation of the aluminum parent metal particulate to achieve a more uniform reaction and resulting microstructure.

Separating the formal oxidation reaction product from the remaining carcass of parent metal is also generally desirable. Product releasers are materials provided at at least a portion of the interface of the parent metal and the preform that serve to facilitate the release of the ceramic matrix composite structure from the parent metal carcass after oxidation reaction product growth is completed. The release may occur at an elevated temperature or at room temperature, under externally applied forces or under forces generated by temperature gradients, or may be due to differences in thermal expansion coefficients. The releasers may also create voids or microcracks at the interface between the ceramic matrix composite structure and the parent metal carcass.

Barrier materials can be used to stop the growth of the aluminum nitride oxidation reaction product, and therefore determine or define the shape of the resulting ceramic matrix composite body. To effect this embodiment of the present invention, a shaped, permeable mass comprising filler material is superimposed with a barrier means to inhibit formation of the ceramic body therebeyond. Development or growth of the oxidation reaction product infiltrates the shaped mass and essentially terminates with the barrier means. Graphite foil such as GRAFOIL® (Union Carbide Corporation, Carbon Product Division, Cleveland, Ohio) or PERMA-FOIL® (TT America, Portland, Oreg.), $B_4C$, SiC powder, and $SiB_6$ are materials that may function as physical barriers, apparently preventing the oxidation reaction product from proceeding beyond the boundaries they define. Other materials, such as Wollastonite ($CaSiO_3$), E1 ALUNDUM™ (95% $Al_2O_3$ with $TiO_2$ as the major impurity, from Norton Co., Worcester, Mass.), $TiO_2$, $Al_2O_3$, and powder mixtures of $Al_2O_3$ and $NiAl_2O_4$, also act as barrier materials, apparently by consuming the primary dopant in the parent metal. Combinations and mixtures of these materials can also provide effective barriers. Moreover, the above-described materials are only examples of specific barrier materials, which are useful in controlling the growth of aluminum nitride oxidation reaction product.

The barrier means of this invention may be any suitable means which interferes, inhibits, or terminates growth or development of the oxidation reaction product. Suitable barrier means may be any material, compound, element, composition, or the like, which, under the process conditions of this invention, maintains some integrity, is not volatile and preferably is permeable to the vapor-phase oxidant while being capable of locally inhibiting, poisoning, stopping, interfering with, preventing, or the like, continued growth of the oxidation reaction product.

As noted above, when dopants are utilized, it is not necessary to alloy dopant material into the parent metal. For example, selectively applying one or more dopant materials in a thin layer to a portion of the surface of the parent metal enables local ceramic growth from the portions of the parent metal surface which are in contact with the dopant material and lends itself to growth of the polycrystalline ceramic material into the permeable bed or mass of filler in selected areas. Thus, growth of the polycrystalline ceramic material into the permeable bed of filler can be controlled by the localized placement of at least one dopant material upon the parent metal surface. Moreover, the entire surface of the parent metal which is in contact with the permeable mass of filler material may be coated with at least one dopant material when it is desired to uniformly infiltrate the entire mass of filler material. When at least one dopant material is applied to at least a portion of the surface of the parent metal, the applied coating or layer of dopant is thin relative to the thickness of the parent metal body, and growth or formation of the oxidation reaction product into the permeable bed of filler material extends to substantially beyond the dopant layer, i.e., to beyond the depth of the applied dopant layer. Such a layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents, and/ or thickeners. More preferably, the dopant materials are applied as powders to the surface of the parent metal or dispersed through at least a portion of the filler. One particularly preferred method of applying the dopants to the parent metal surface is to utilize a liquid suspension of the dopants in a water or organic solvent mixture, optionally containing a binder, which is sprayed onto the parent metal surface in order to obtain an adherent coating which facilitates handling of the doped parent metal prior to processing.

The dopant materials, when used externally, are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.0001 gram of silicon per gram of parent metal together with a second dopant providing a source of magnesium and/or zinc produce the polycrystalline ceramic growth phenomenon. It has also been found that a ceramic matrix structure is achievable from an aluminum-based parent metal using air or oxygen as the oxidant by using MgO as the dopant in an amount greater than 0.0005 gram of dopant per gram of parent metal to be oxidized and greater than 0.005 gram of dopant per square centimeter of parent metal surface upon which the MgO is applied. It appears that to some degree an increase in the quantity of dopant materials will decrease the reaction time necessary to produce the ceramic matrix composite, but this will depend upon such factors as the type of dopant, the parent metal and the reaction conditions.

Another important feature of this invention is the ability to influence and control the microstructure and properties of the resultant ceramic matrix by modifying the process conditions. Thus, for example, maintaining process conditions which apparently decrease the solid-liquid interfacial energy relative to the range of grain boundary energies in the oxidation reaction product will produce a structure which contains an increased amount of metal and a reduced degree of interconnectivity of the oxidation reaction product, whereas, a change of relative surface energies in the opposite direction produces a more interconnected oxidation reaction product with less metal phase, i.e., fewer metal transport channels are formed. Such changes may be effected, for example, by changing the nature or concentration of the dopants or by changing the oxidizing environment (temperature and/or atmosphere). As a consequence of this process feature, the properties of the resultant ceramic matrix material can be tailored to a relatively high degree from properties approaching those of a pure ceramic to properties (such as toughness and electrical conductivity) which are highly influenced by the presence of 25 to 30 percent by volume or more of the metal phase.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (i.e., the "initiation surface") in the growing ceramic matrix structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting.

Certain alloy constituents in the parent metal, especially those which exhibit a less negative free energy of formation for their oxides, are often innocuous and tend to become concentrated in the remaining metallic inclusion phases. For example, in the case of an aluminum parent metal, minor amounts of manganese, iron, copper, tungsten and other metals are common alloy impurities in commercial grades of aluminum which do not interfere with the growth mechanism of a ceramic matrix structure by the process of the present invention.

Figure 5E:
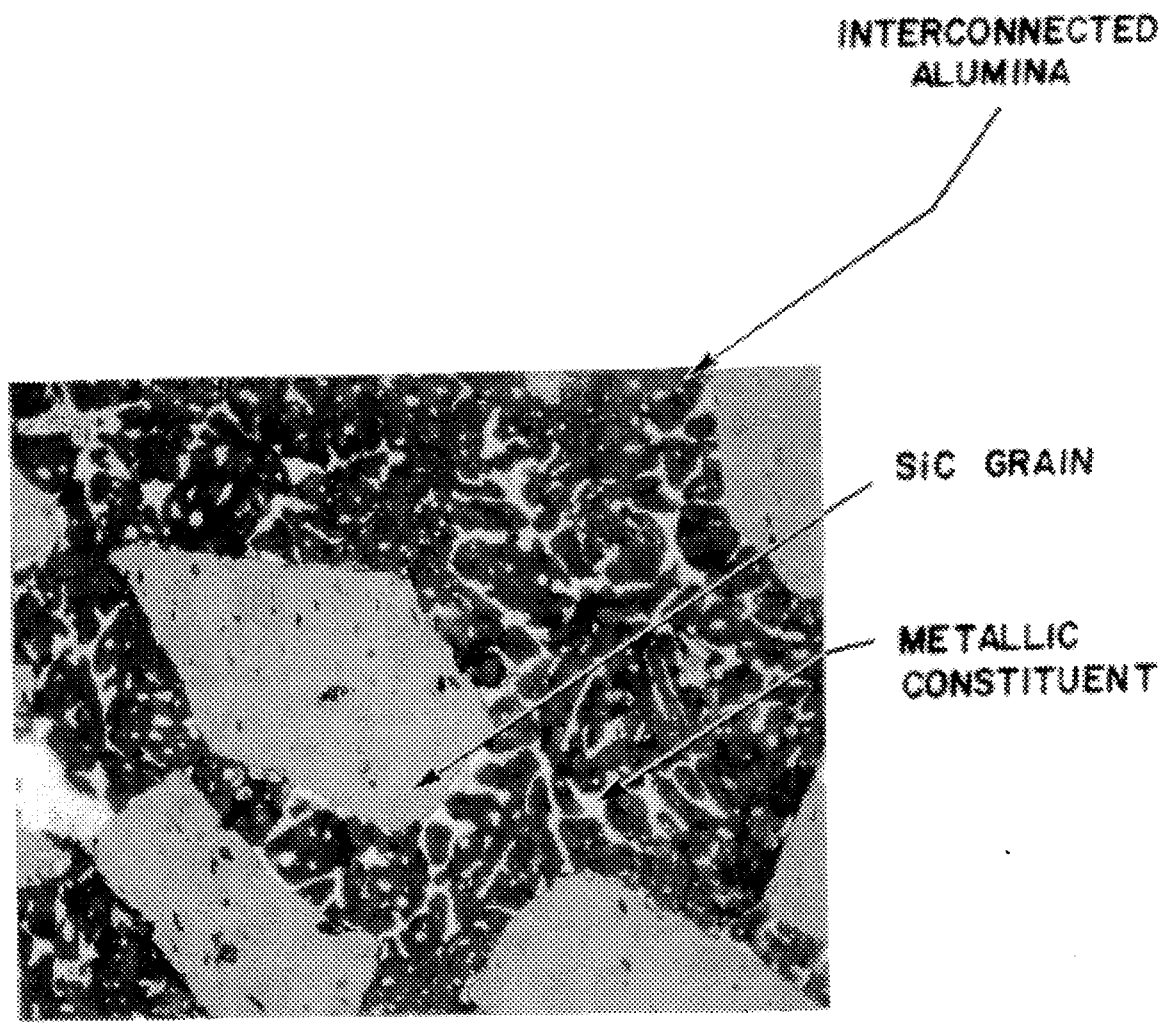
FIG. 5e is a photomicrograph taken at 400× magnification of a ceramic composite structure produced in accordance with Example 5.

From the photomicrograph (at 400× magnification) of a cross-section of an alumina ceramic matrix composite product, FIG. 5e, it can be observed that the interface boundaries between the oxidation reaction product and the metallic phases are substantially arcuate and they weave or form a tortuous microstructure through the matrix. This microstructure also has been observed when voids were formed in place of the metal. In ceramic matrix composite materials of the prior art, when the skeleton of the matrix is a single phase, the interfaces between matrix crystallites and voids are substantially faceted, that is, more angular and ragged. A ceramic matrix composite product having a predominance of arcuate or rounded interface boundaries, as in the product of the present invention, may be particularly advantageous for certain applications because one would expect a lower degree of stress concentration and a lower elastic modulus than from a typical interconnected ceramic matrix composite structure that did not have this type of arcuate structure. In certain embodiments, the ceramic matrix composite products of the present invention have an essentially single phase, interconnected, ceramic matrix skeletal structure wherein the grain boundaries at the interconnection of the crystallites in the skeletal structure have no other phase present. The formation of such ceramic matrix composite products with clean grain boundaries is either difficult or impossible through the use of sintering techniques because impurities tend to be deposited at grain boundaries in a sintering process. Such impurities may be present either unintentionally or as deliberate additions to promote sintering or to restrict grain growth during high temperature processing. Further, clean grain boundaries in the matrix skeletal structure of a product of this character are significant because they afford superior properties such as high temperature strength retention and creep resistance.

In another embodiment of the present invention, the oxidation reaction product is grown into a preform, i.e., a permeable mass of filler material which retains its shape and size during the infiltration of the filler by the oxidation reaction product. The preforms can be formed: (1) by pressing a powdered mixture into the desired shape; (2) by slip casting; (3) by isostatic pressing; (4) by sediment casting; or (5) by any of the other standard techniques for casting ceramic materials prior to firing. In some cases, binders must be used to keep the preform from disintegrating before firing. Binders that have been used successfully with the present invention, either alone or in combination with other listed binders, include inorganic binders such as CERASET SN™ ceramer (Lanxide Corp.) and organic binders such as Acrawax (Acrawax is ethylene-bis steramide), ICI HYPERMER® KD 2, and Dow XUS 40303 and 30303. Plasticizers such as Dow polyglycol E-400 are sometimes added to the organic binders. The mixture of filler material, filler additions, and binders may have to be mixed with a solvent, such as ethanol or isopropanol, and a dispersant, such as fish oil or phosphate ester, before shaping the preform. The organic binders may be burned out in dry air or in other nitrogen/oxygen mixtures before aluminum nitride growth. CERASET SN™ ceramer has been found to be especially useful in producing aluminum nitride matrix composite bodies. This polysilazane "preceramic" polymer is liquid at ambient temperature, may be cured to a solid upon application of heat and/or addition of a curing agent such as the peroxides or azo compounds, and may be converted to silicon nitride and/or silicon carbide, depending upon processing conditions. Thus, not only does this polymer provide high temperature binding characteristics, it also supplies useful ceramic substances to the final composite body.

The aluminum alloy parent metal body and the filler material are often placed within beds in a crucible to facilitate removal of the ceramic matrix composite after growth of the aluminum nitride oxidation reaction product. Beds are prepared from materials which are not wet by the aluminum or the oxidation reaction product under the growth conditions used to produce aluminum nitride ceramic matrix composites. Barrier materials placed between the bed and the parent metal/filer setup may be used to prevent contact between the bed and the aluminum or the aluminum nitride oxidation reaction product. Materials suitable for use as beds during the growth of an aluminum nitride oxidation reaction product include $B_4C$, E1 ALUNDUM® (Norton Co., Worcester, Mass.), E1 ALUNDUM®/AlN mixtures, $Al_2O_3/TiO_2$ mixtures, wollastonite, bauxite and certain forms of SiC.

The properties of the ceramic matrix composite structure may be further improved by processing the material after growth is completed. For example, high temperature annealing, ion implantation, or additional nitriding reactions may be used to further tailor the properties of the material for particular applications. The material may also be ground, lapped, etched and/or polished to achieve a required surface finish. The aluminum nitride ceramic matrix composite structures produced according to the present invention will generally exhibit environmental stability, resistance to corrosion, and enhanced surface hardness, flexural strength, and fracture toughness. In addition, the aluminum nitride ceramic matrix composites produced according to the present invention can have high thermal conductivities, low thermal expansion coefficients, excellent thermal shock resistances, relatively low densities, and high stiffnesses. Moreover, even at high temperatures, these aluminum nitride ceramic matrix composites retain this excellent overall combination of properties.

In general, the ceramic matrix composite of this invention is a coherent body having between about 5% and about 98% by volume, relative to the total volume of the ceramic matrix composite, of one or more filler materials within a ceramic matrix. With specific regard to aluminum oxide and aluminum nitride-based composites, the ceramic matrix, based on its total weight, will be comprised of about 60% to about 99% by weight of interconnected aluminum oxide or aluminum nitride and about 1% to about 40% by weight of an aluminum-containing metallic constituent. Additionally, the aluminum oxide ceramic matrix composite will have less than about 30% by weight, and preferably less than about 10% by weight, of magnesium aluminate spinel as an initiation surface.

In another aspect of the invention there is provided a ceramic matrix composite consisting of: (a) a single phase, three-dimensionally interconnected ceramic matrix comprising a nitride; (b) one or more fillers embedded by the matrix; and (c) one or more metallic constituents and, optionally, voids dispersed and/or extending through the matrix. Examples are given hereafter which demonstrate the formation of aluminum nitride, zirconium nitride, titanium nitride and silicon nitride ceramic matrix composites by the methods of the present invention. Such ceramic matrix composites are unique and advantageous due to their combined mechanical, thermal and electrical properties.

The following examples illustrate the practice of certain aspects of the present invention. In many of the examples involving the formation of aluminum oxide and aluminum nitride ceramic matrices, the oxidation reaction was observed to proceed at a moderate rate, such that there was no noticeable temperature increase arising from the exothermic nature of the reaction. For some of the other matrix systems described, the oxidation reaction tended to be faster, such that transient heating of the experimental assembly above the furnace setpoint temperature was commonly observed. Although each example is presented to demonstrate one particular embodiment of the present invention, each example also demonstrates other significant aspects of the present invention.

EXAMPLE 1

To examine the effect of growth of an oxidation reaction product of the present invention through a volume of filler material comprising alumina particulate matter, selected aluminum alloys containing a range of the internal dopants magnesium and/or silicon were processed at setpoint temperatures ranging from about 1100° to about 1400° C., with air as the oxidant, starting with the aluminum alloys fully buried within a bed of particulate alumina grain filler material.

In each trial, a cylindrical alloy specimen about one inch (25 mm) in diameter and about seven-eighths inch (22 mm) long was cut from an ingot which had been cast from a melt prepared at about 800°–900° C. The ingot was placed vertically onto a layer of 90 grit (average particle diameter of about 216 μm), industrial purity, 38 ALUNDUM® 99.5% pure aluminum oxide abrasive grain (Norton Co., Worcester, Mass.) contained within a suitable refractory crucible, and was subsequently covered with the same material on all sides to a thickness of about one quarter to one-half inch (6.4 to 12.7 mm). FIG. 1a schematically shows the parent metal ingot fully embedded within the particulate filler material which, with the ingot, is contained within a refractory crucible.

For each trial, six of the assemblies using a variety of dopant concentrations were processed together in one furnace. The furnaces allowed the entry of ambient air through natural convection and diffusion through random openings in the furnace walls, as is intrinsic to conventional laboratory furnace design, as well as through an about ¼ inch (6.4 mm) vent hole in the furnace door. The nominal furnace cycle allowed about five hours for the furnace to reach the setpoint temperature, about eighty hours processing at the setpoint temperature, and about five hours for the furnace to cool below about 600° C., after which the samples were removed from the processing environment. A ceramic matrix was found to have permeated at least a portion of the bed of alumina filler particles to produce a cohesive ceramic matrix composite.

FIG. 1b shows in cross-section a schematic view of what is believed to be the status of the oxidation reaction product growth region of FIG. 1a after some elapsed time under processing conditions (for example, half of the time required for completion), showing formation of the oxidation reaction product to provide the resultant polycrystalline ceramic matrix growth permeating and embedding the neighboring bed of particulate filler as the oxidation reaction consumes molten parent metal from the available supply.

A group of four weight measurements was taken for each test, as follows: (1) the initial weight of the aluminum parent metal ingot ("Wi"); (2) the weight of the crucible and its entire load (particulate bed plus parent metal ingot) prior to processing ("Wc"); (3) the weight of the crucible and its entire load after processing ("Wc/a"); and (4) the weight of the remaining parent metal ingot and firm ceramic matrix composite structure, including any non-oxidized constituents thereof, after processing ("Wi/a"). Using these data a unit weight gain ("UWG") is calculated as the ratio of the change in weight of the crucible plus its entire load due to the furnace cycle processing, to the original weight of the parent metal ingot. Stated otherwise, the unit weight gain ("UWG") is equal to (the final weight of the assembly minus the initial weight of the assembly) divided by (the initial weight of the parent metal ingot). The foregoing relationship may also be expressed as the formula:

$$UWG = \frac{Wc/a - Wc}{Wi}$$

The unit weight gain for an $Al_2O_3$ oxidation reaction product can theoretically be as high as about 0.89, which is equivalent to complete conversion of the aluminum to $Al_2O_3$. Shortfalls below about 0.89 are attributable essentially to non-oxidized aluminum alloy parent metal or non-oxidized constituents thereof.

A second quantity derived from these data for the various samples was ingot weight gain ("IWG"), which refers to the ratio of (a) the weight of the remaining parent metal ingot and firm ceramic matrix composite structure, including any non-oxidized constituents thereof, after processing and removal from the crucible ("Wi/a"), minus the initial weight of the parent metal ingot ("Wi"), to (b) the initial weight of the aluminum parent metal ingot ("Wi"). Stated otherwise, the ingot weight gain (IWG) equals (the final weight of the ceramic matrix composite structure and any non-oxidized parent metal constituents, minus the initial weight of the parent metal ingot) divided by (the initial weight of parent metal ingot). The foregoing relationship may also be expressed as the formula:

$$IWG = \frac{Wi/a - Wi}{Wi}$$

When the ingot weight gain ("IWG") is significantly larger than the unit weight gain ("UWG"), e.g., in the range from about 1 to about 2.5 or greater, significant weight increase due to embedment of filler material into the predominantly ceramic polycrystalline material is demonstrated.

In the reported data, corrections were not made for items such as removal of volatiles from the refractory materials, reaction of the filler material with the oxidizing atmosphere, or other such factors. Some materials obtained in the tests were evaluated by procedures including visual inspection and cross-sectioning and mechanical measurements on selected samples to verify the nature of the ceramic matrix composite body.

The unit weight gain and ingot weight gain at selected furnace setpoint temperatures for a series of aluminum alloys oxidized for an about 80-hour heating period to grow the polycrystalline material into a bed of alumina filler material as described above with respect to FIGS. 1a and 1b are shown graphically in FIGS. 2a–2d. In these and all similar Figures, the x/y notation in the Figure key gives the nominal dopant concentration, where x is the silicon concentration and y is the magnesium concentration, both in weight percent of the total weight of parent metal. The results indicate that rapid formation of ceramic matrix composite structures occurs primarily within the temperature range of about 1100°–1400° C. for aluminum parent metal using these particular dopants and air as the oxidant. In addition, comparisons among the curves of FIGS. 2a–2d illustrate the beneficial effect of a binary doping system for aluminum-based parent metals using an oxygen-based gaseous oxidant, and demonstrate that the effective temperature range can be extended by appropriate selection of dopant material concentrations.

As further tests below will show, the ceramic matrix composite structures resulting from the practice of the present invention show novel combinations of mechanical, electrical, thermal and other properties such as strength, hardness, toughness, and conductivity, combining the properties of the filler material and the polycrystalline matrix material. The measured properties of the ceramic matrix composite structures were determined by the following tests. The modulus of rupture ("MOR") was determined by testing a sample rectangular strip of material measuring about 0.375 inch (9.5 mm) in width ("w") and about 0.125 inch (3.2 mm) in depth ("d") and over about one inch (25 mm) in length. The test strip is positioned in a test machine with its about 0.375 inch (9.5 mm) wide surfaces disposed horizontally and its about 0.125 inch (3.2 mm) deep surfaces disposed vertically. The test machine imposes, by means of an about ¼ inch (6.4 mm) diameter cylindrical anvil rod, an upwardly directed force in the bottom about 0.375 inch (9.5 mm) wide surface of the test strip and provides a pair of resistance points to the upwardly moving force on the top about 0.375 inch (9.5 mm) wide surface of the test strip. The resistance points are about one inch (25 mm) apart along the length of the test strip and centered on the location of the anvil rod providing the upwardly directed force. If F is the magnitude of the upwardly acting force in pounds of force, the modulus of rupture ("MOR") in pounds per square inch is calculated by the formula:

$$MOR = \frac{3Fl}{2wd^2}$$

where "w" and "d" are as above and "l" is the length in inches along the test strip between the points of resistance to the upwardly acting force. The sample test strip is ground prior to testing with a Blanchard-type grinder using a 50 grit diamond wheel and the anvil rod is applied to the test strip at a crosshead speed of about 0.002 inches per minute (0.051 mm per minute).

The erosion rate of the ceramic matrix composite structures produced in accordance with the present invention was determined by a test using an Airbrasive jet machining unit, Model-H, made by S. S. White Industrial Products. A jet of about 50-micron size alumina particles (S. S. Whim #3) propelled by air was impinged on a flat surface of a sample plate of the ceramic matrix composite structure at two different test angles, one of about 90° (i.e., perpendicularly to the test surface) and one of about 30°, for periods of, respectively, about 2 minutes at the about 90° impingement angle and about 4 minutes at the about 30° impingement angle. The about 90° and about 30° tests were carried out at different locations on the sample and the depths of the two craters resulting from the tests were measured with a dial indicator depth gauge. In all tests, the following parameters were used: the distance between the sample surface (original) and the jet nozzle was about 0.625 inch (15.9 mm); the air pressure of the jet was about 80 psig (5.6 kg per square centimeter gauge) and the air flow rate was about 0.4 standard cubic feet per minute (11.3 standard liters per minute); the nozzle bore diameter was about 0.026 inch (0.66 mm). The powder flow rate was that which, in a calibration test using the above-stated parameters, gives a crater depth of about 0.056+0.004 inch (1.42±0.102 mm) on a Coors AD 998 alumina test sample at the about 90° impingement angle (for 2 minutes) and a crater depth of about 0.029 inch (0.737 mm) at the about 30° impingement angle (for about 4 minutes). Coors AD 998 alumina is an about 99.8% pure aluminum oxide material.

Measurements of the corrosion rates of the ceramic matrix composite structures of the invention were carried out by separate tests comprising immersing sample plates of the material in about 10% reagent grade hydrochloric acid solution or in about 10% reagant grade sulfuric acid solution at room temperature. In each case, the test samples were periodically removed from the acid solution, rinsed, dried, weighed and returned to the acid bath. The weight loss in grams per square centimeter of total exposed surface of the samples for varying times of immersion was compared to corresponding weight losses of a Coors AD 998 alumina sample.

For ceramic matrix composite structures produced at about 1250° C. from an aluminum alloy containing 10% silicon and 3% magnesium where the filler material is alumina particles as described in this Example 1, modulus of rupture values in excess of about 25,000 pounds per square inch (172 mega Pascal (MPa)) have been measured by the above-described modulus of rupture test, a macrohardness of about 83 has been measured on the Rockwell A scale, erosion rates of about two to three times lower than that of standard 99.8% pure, dense alumina plates (Coors AD 998) have been measured by the above-described grit-blasting erosion test, and corrosion rates in about 10% HCl and about 10% H$_2$SO$_4$ which were roughly identical to that of standard (Coors AD 998) alumina plates were measured by the corrosion test described above.

EXAMPLE 2

To examine the effect of growth of the ceramic matrix material of the present invention into a volume containing alumina particulate matter of small particle size, a sample plate of aluminum/magnesium/silicon alloy about one-half inch (13 mm) thick by about nine inches (229 mm) long by about two inches (51 mm) wide and containing about 10% by weight of silicon and about 3% by weight of magnesium as dopants was cast from an about 850° C. melt. This aluminum alloy parent metal bar was placed horizontally upon a layer of commercially pure E-67 1000 grit alumina having an about six micron particle diameter (Norton Co., Worcester, Mass.) and was subsequently covered with the same material to a depth of approximately one-half inch (13 mm). The alumina-covered bar was placed into an air atmosphere furnace identical to that used in Example 1 and was processed for about 72 hours at a setpoint temperature of about 1250° C. after allowing an initial about five hour period for the furnace to reach the setpoint temperature. After the about 72 hour heating period, about five additional hours were allowed for the sample to cool below about 600° C., after which the sample was removed from the furnace. The unit weight gain was about 0.72 and the ingot weight gain was about 1.24. A sample bar about ⅛ inch (3.2 mm) by about ⅜ inch (9.5 mm) by about 1¼ inch (31.8 mm) was cut from the resulting ceramic matrix composite structure and measured to have a breaking strength of about 30,000 pounds per square inch (207 MPa) as measured by the modulus of rupture test described in Example 1 and a hardness of about 85.7 using the Rockwell A scale. These data indicate a strong, hard material of utility as a structural ceramic matrix composite, with properties in this respect superior to those of ceramic matrix composites formed from the larger particulate filler material of Example 1.

EXAMPLE 3

To examine the effect of growth of a predominantly ceramic polycrystalline material of the present invention into a volume of filler material comprising alumina particulate material of lower purity than that of Example 1, a series of aluminum alloy parent metal ingots containing various amounts of silicon and/or magnesium dopants were embedded in an E1 ALUNDUM® 90 grit (average particle diameter of about 216 μm) industrial abrasive grain material (Norton Co., Worcester, Mass.) of about 95% alumina, about 3% titania, about 1% silica, and about 1% of other impurities and processed at various setpoint temperatures in the range of from about 1100° to about 1325° C. in a manner otherwise identical to that of Example 1. Unit weight gains and ingot weight gains for these tests are shown in FIGS. 3a–3d. At a processing temperature of about 1250° C., for those parent metals containing both dopants, unit weight gains were on the order of about 0.5 to about 0.75, with ingot weight gains as high as about 2.4 to about 2.6, indicating a tolerance of the process for the various contaminants present in the filler material. The weight gain for the product obtained at or above an about 1300° C. setpoint temperature was significantly lower than that obtained for a setpoint in the range of about 1200°–1250° C. Where ingot weight gains were large (e.g., greater than unity), the result was a ceramic matrix composite comprised of an alpha-alumina based matrix containing particles of the abrasive grade alumina filler.

EXAMPLE 4

These tests were carried out to examine the effect of growth of the predominantly ceramic polycrystalline material of the present invention into a volume of filler material comprising a particulate binary metal oxide thought to be thermodynamically stable or nearly stable under the process conditions. Samples of parent metal aluminum alloys containing silicon and/or magnesium dopants alloyed therein were embedded in −325 mesh (particle diameter smaller than about 45 µm) magnesium aluminate spinel and processed in a manner identical to that of Example 1, but utilizing an about 94 hour heating period at various setpoints ranging from about 1025° C. to about 1500° C. Resulting weight gain data, indicating a range of growth temperatures at least to about 1500° C., are shown in FIGS. 4a–4d. In this case the alloy containing no intentionally alloyed magnesium dopant produced significant formation of the predominantly ceramic polycrystalline matrix material of the present invention, hence indicating the efficacy of external doping with an oxide of magnesium (in this case $MgAl_2O_4$) in lieu of internal alloying of this dopant. In other words, the filler also served as a dopant. The resulting cohesive ceramic matrix composite showed a matrix of the alpha-alumina growth together with non-oxidized constituents of the parent metal, incorporating grains of the spinel filler.

EXAMPLE 5

Additional tests were conducted to examine the effect of growth of the predominantly ceramic polycrystalline material of the present invention into a volume of filler material comprising silicon carbide which is a hard, refractory, electrically and thermally conductive material not thermodynamically stable under the aluminum parent metal oxidation conditions of this invention. Selected aluminum alloys with a range of the internal dopants magnesium and/or silicon alloyed therein were embedded in particles of 37 CRYSTOLON® 90 grit (average particle diameter of about 216 µm), industrial purity, 98% pure SiC abrasive grain (Norton Co., Worcester, Mass.) and processed in a manner identical with that of Example 1, with the exception that an about 48 hour heating period at the furnace setpoint temperature was used. The resulting unit and ingot weight gain data are shown graphically in FIGS. 5a–5d. At the highest temperatures employed, a fraction of the weight gain was due to oxidation of the SiC phase as indicated by "region 2" in the Figures. In addition to demonstrating the preferred range of growth temperatures, the experiments also demonstrate the utility of dispersing a dopant throughout the filler material. In this case silicon dopant was obtained by chemical reduction of the silicon dioxide layer by aluminum, which layer coats the silicon carbide grains under the process conditions.

Figure 5F:
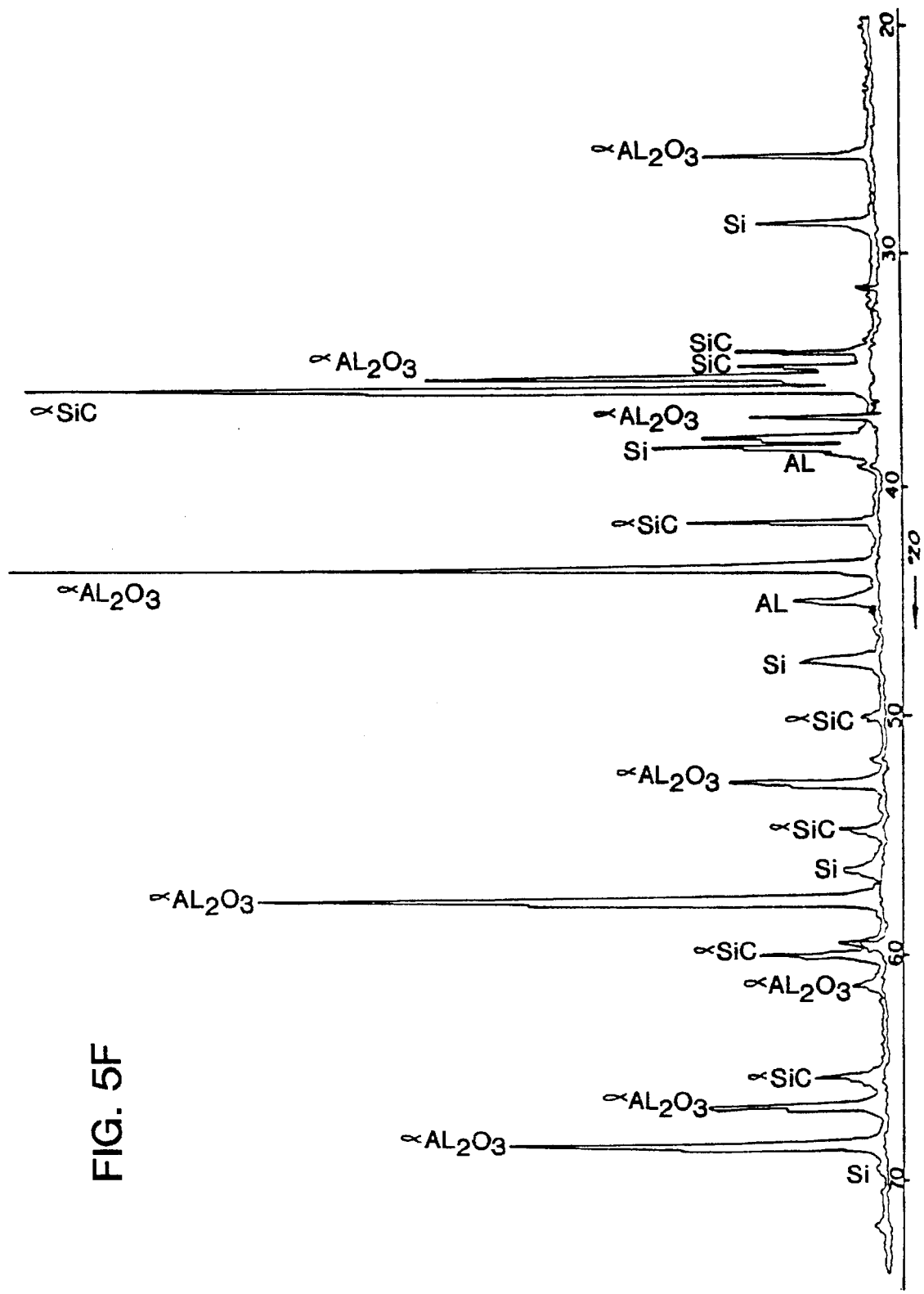
FIG. 5f is an x-ray diffraction pattern of a powdered sample of a ceramic composite structure produced in accordance with Example 5.

To determine the properties of a large body prepared by growing through the 98% pure SiC filler material of this example, a sample of an aluminum alloy about two inches (51 mm) by about nine inches (229 mm) by about one-half inch (13 mm) in size containing about 10% of silicon and about 3% of magnesium dopants was prepared in the manner described in Example 2 and was embedded on five sides in E1 ALUNDUM® 90 grit (average particle diameter of about 216 µm), 95% pure aluminum oxide refractory grain (Norton Co., Worcester, Mass.) within a suitable refractory vessel, with an aluminum foil partition used to prevent coverage of the exposed about two inch (51 mm) by about nine inch (229 mm) surface. Onto this exposed surface was applied a one inch (25 mm) layer of 37 CRYSTOLON® 90 grit (average particle diameter of about 216 µm), 98% pure SiC abrasive grain (Norton Co., Worcester, Mass.). The sample was processed for about 60 hours at a furnace setpoint temperature of about 1300° C., after allowing an about 5 hour period for the furnace to reach setpoint temperature. Following the heating period, an additional about 5 hours was allowed for the sample to cool below about 600° C. prior to removal from the furnace. The resulting unit weight gain was about 0.61 and the ingot weight gain was about 1.14. Growth was observed to occur preferentially into the silicon carbide filler material rather than into the aluminum oxide supporting bed. A photomicrograph (at 400× magnification) of the resulting ceramic matrix composite structure is shown in FIG. 5e, where the silicon carbide particles, the alumina matrix network, and the metallic constituents are indicated. X-ray diffraction data taken on a powdered portion of this sample displayed alpha-alumina, silicon carbide, aluminum and silicon phases, as indicated in FIG. 5f. This ceramic matrix composite structure was electrically conductive, that is, it had minimal resistance as measured by a Simpson ohm meter with point probes, and demonstrated a breaking strength of about 16,000 pounds per square inch (110 MPa) using the above-described modulus of rupture test.

Additional experiments similar to those described above were performed using as the filler material 98% pure SiC grain with a smaller, about 220 grit (average particle diameter of about 66 µm), particle size. The material demonstrated higher strength (about 23,000 psi (158 MPa)) than the material utilizing about 90 grit silicon carbide filler. Ceramic matrix composites formed from either about 90 or about 220 grit particle sizes displayed erosion resistances significantly higher than that of 99.8% pure alumina plates (Coors AD 998) as measured by the grit blasting erosion test described above. Specifically, the ceramic matrix composite structure of this invention made with, respectively, the about 90 and about 220 grit silicon carbide particles showed the following results in comparison to a standard alumina:

| Material Tested | 90° Test | 30° Test |
|---|---|---|
| | Crater Depth In Inches | |
| 90 grit SiC | 0.044 | 0.024 |
| 220 grit SiC | 0.037 | 0.016 |
| Standard (Coors AD 998) | 0.056 | 0.029 |

EXAMPLE 6

To determine the effect of growth of the material of the present invention into a volume containing silicon carbide abrasive grain of a somewhat higher purity grade, experiments were performed in a manner identical to those described in Example 1, utilizing as the filler material 39 CRYSTOLON® 90 grit (average particle diameter of about 216 µm), 99+% pure SiC (Norton Co., Worcester, Mass.). The ingot and unit weight gains resulting from this series of experiments are shown in FIGS. 8a–8d. This system exhibits a growth of polycrystalline ceramic matrix material at temperatures ranging as low as about 825 ° C., which is of significant value in limiting the tendency of the silicon carbide to oxidize to silica and carbon dioxide prior to formation of the silicon carbide-filled ceramic matrix composite material of the present invention.

Tests were conducted using about 220 grit (average particle diameter of about 66 µm) and about 500 grit (average particle diameter of about 17 µm) filler material comprising 39 CRYSTOLON® 99+% pure SiC abrasive grain (Norton Co., Worcester, Mass.) into which the polycrystalline ceramic matrix material was grown as described above in this Example. For these tests a significant increase in modulus of rupture was measured, ranging from about 12,000 pounds per square inch (82 MPa) for the about 90 grit (average particle diameter of about 216 μm) filler material, to about 37,000 pounds per square inch (255 MPa) for the about 220 grit (average particle diameter of about 66 μm) filler material, to about 59,000 pounds per square inch (407 MPa) for the about 500 grit (average particle diameter of about 17 μm) filler material.

Growth has also been demonstrated into filler material consisting of various mixtures of about 90, about 220, and about 500 grit particles of this 39 CRYSTOLON® 99+% pure SiC material, which results in a higher packing density of the filler phase than that available from a single particle size.

Growth of the ceramic matrix composite material of the present invention has also been demonstrated from a commercial 5052 aluminum alloy containing about 2.5% of magnesium dopant along with roughly 1% (combined) of other species including Fe, Cr, Si and Cu, into these silicon carbide filler materials. A ceramic matrix composite structure was formed by oxidizing this commercial alloy in a furnace cycle of about 72 hours into a filler material of about 500 grit 99+% pure SiC. The resultant material demonstrated a modulus of rupture of about 372 to 427 MPa (54,000 to 62,000 pounds per square inch), a hardness of about 84 on the Rockwell A scale, and a fracture toughness of about 7.5 Mega-Pascals-meter$^{1/2}$ (6,800 pounds per square inch-inch$^{1/2}$) as measured by the single-edge notched beam fracture toughness test described below. Impurities in the aluminum parent metal alloy thus did not preclude or substantially interfere with the creation of an acceptable ceramic matrix composite structure. The fracture toughness value obtained is unusually high as compared with traditional silicon carbide ceramic matrix composite materials such as silicon/silicon carbide composites which usually exhibit a fracture toughness of about 3–5 Mega-Pascals-meter$^{1/2}$ (2,720–4,533 pounds per square inch-inch$^{1/2}$).

The fracture toughness test employed a rectangular test strip of the ceramic matrix composite material of the invention measuring about 0.118 inch (3.0 mm) in width ("w") and about 0.379 inch (9.6 mm) in depth ("d") and having an isosceles triangular-shaped notch of height "a" of about 0.036 inch (0.91 mm) cut in its lower surface and extending across the entire width of the test strip. The test strip was positioned with the notched, about 0.118 (3.0 mm) inch-wide surface at the bottom and horizontally disposed, and with the about 0.379 (9.6 mm) inch-deep surfaces being vertically disposed. A pair of about ¼ inch (6.4 mm) diameter anvil rods imposed upwardly directed forces on the bottom surface of the test strip at opposite sides of the notch and equally spaced therefrom. The upwardly directed forces are imposed at locations spaced apart a distance $S_1$ along the length of the test strip. A pair of resistance points resisting the upwardly directed forces are imposed on the top surface of the test strip at opposite sides of the location of the notch and equally spaced therefrom. The resistance points are spaced apart along the length of the test strip a distance $S_2$, which is less than the distance $S_1$ between the points of upwardly applied force. Fracture toughness ("FT") is calculated by the formula:

$$FT = \frac{3 F(S_1 - S_2) a^{1/2} y}{2 w d^2}$$

where F is the upwardly acting force in pounds applied at each of the two points on the bottom surface of the test strip, a, w, d, $S_1$ and $S_2$ are as defined above, and y is a constant whose value is:

$$y = 1.99 - 2.47 a_0 + 12.97 a_0^2 - 23.7 a_0^3 + 24.8 a_0^4$$

wherein $$a_0 = \frac{a}{d}.$$

For the tests conducted, $S_1$ was set at about 1.5 inches (38 mm), $S_2$ at about 0.5 inches (13 mm) and the upwardly acting forces F were applied at a crosshead speed of about 0.002 inches per minute (0.051 mm per minute). An Instron Model 1123 machine was used for both the modulus of rupture and fracture toughness tests.

An additional sample of aluminum alloy containing about 10% by weight of silicon and about 3% by weight of magnesium dopants alloyed into about 99.7% pure aluminum was similarly processed for about 95 hours at about 1150° C. into filler material of about 90 grit (average particle diameter of about 216 μm), 99+% pure SiC. The resulting alumina-based ceramic matrix composite with silicon carbide filler was cut into a bar about 4.3 inches (110 mm) long by about 0.53 inches (13.4 mm) wide by about 0.18 inch (4.5 mm) thick and was self-heated by passing a current of approximately 25 Amperes at 25 Volts through the bar. The sample heated up to about 1350° C. in about one minute as measured by an optical pyrometer, and was held for about 3 hours at about 1350° C.±20° C. at the midpoint of the test bar with a temperature variation of about ±20° C. from the midpoint of the bar along its entire 11 centimeter length. The resistance heating effect demonstrates electrical conductivity of the sample bar. The uniformity of temperature across the test bar showed good uniformity of composition, and thermal stability was demonstrated by the ability to maintain a constant temperature (1350° C.±20° C.) during an about three hour period. Fast heat up (ambient to about 1350° C. in about one minute) and fast cool down times without failure of the sample indicated good thermal shock resistance.

EXAMPLE 7

A sample of commercially pure 1100 aluminum alloy plate (comprising by weight about 0.05–0.20% Cu, ≦0.05% Mn, ≦0.10% Zn, ≦0.95% Si plus Fe and the balance aluminum) measuring about two inches (51 mm) by about nine inches (229 mm) by about one-half inch (13 mm) was coated with an about 4 gram casein slip containing magnesium oxide to provide the magnesium dopant for the aluminum parent metal. The plate was embedded in 39 CRYSTOLON® 90 grit (average particle diameter of about 216 μm) silicon carbide of 98% purity (Norton Co., Worcester, Mass.) from which silicon dopant could be obtained by chemical reduction of the silicon dioxide layer covering the silicon carbide particles. The sample was processed with a furnace cycle of about 72 hours at a setpoint temperature of about 1200° C., plus an initial about 5 hours for the furnace to reach setpoint temperature and about 5 hours after the heating period for the sample to cool to about 600° C. for removal from the furnace. The sample showed an about 0.88 unit weight gain (uncorrected for oxidation of the silicon carbide material) and an about 1.48 ingot weight gain, thus demonstrating the formation of an alumina-based ceramic matrix composite structure of the present invention from a commercially pure 1100 aluminum alloy through the use of external doping of the parent metal.

EXAMPLE 8

Figure 9A:
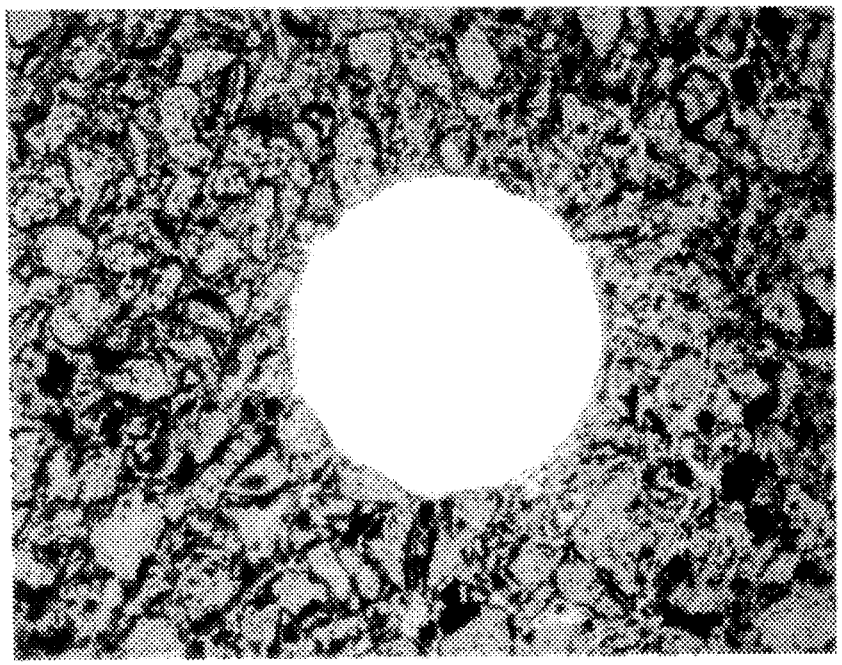
FIGS. 9a–9b are photomicrographs at 50× and 200× magnifications, respectively, of a ceramic composite structure containing wire and alumina particles embedded as filler materials in an alumina ceramic matrix prepared in accordance with Example 8.
Figure 9B:
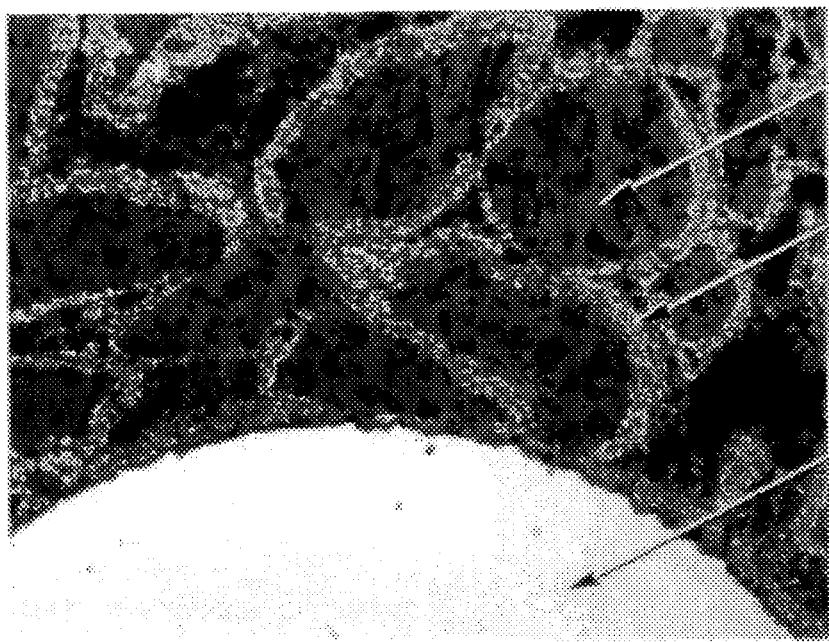

To determine the effect of growth of an alumina-based ceramic matrix material of the present invention into a volume containing a metallic filler material, a coil about one inch (25 mm) tall, one and one quarter inch (32 mm) in diameter, and containing roughly five turns of a commercial wire alloy containing about 75% iron, about 20% chromium, and about 5% aluminum (Kanthal Co., A-1 alloy wire) was prepared. This wire coil was oxidized for about 24 hours at about 1200° C. in an oxygen atmosphere to form thereon a protective surface layer of aluminum oxide. In the manner described in Example 1, an aluminum alloy ingot about one inch (25 mm) in diameter and about seven-eighths (⅞) of an inch (22 mm) long and containing about 7% of silicon and about 3% of magnesium dopants was prepared and embedded in 38 ALUNDUM® 90 grit (average particle diameter of about 216 μm), 99+% pure alumina grain (Norton Company, Worcester, Mass.), with the oxidized wire coil placed concentric with the parent metal ingot and separated roughly one-eighth of an inch (3.2 mm) therefrom. This assembly was processed for about 96 hours at a setpoint temperature of about 1200° C., after an initial about six hours for the furnace to reach setpoint temperature. After allowing about ten hours for the sample to cool, it was removed from the furnace. Unit weight gain was about 0.74 and ingot weight gain was about 2.56. Examination of a cross-section of the sample revealed a cohesive ceramic matrix composite having a ductile wire phase together with the 99+% pure alumina particulate material captured within an alpha-alumina based ceramic matrix of the present invention. FIGS. 9a and 9b show photomicrographs at about 50× and at about 200× magnification, respectively, of the microstructure of the sample showing entrapped wire and alumina particles embedded within the polycrystalline matrix of the present invention. This demonstrates the compatibility of the process and of the material of this invention with reactive filler materials in solid form when such filler material are provided with an inert protective layer to separate an otherwise unstable material or phase from the process environment.

EXAMPLE 9

Figure 10:
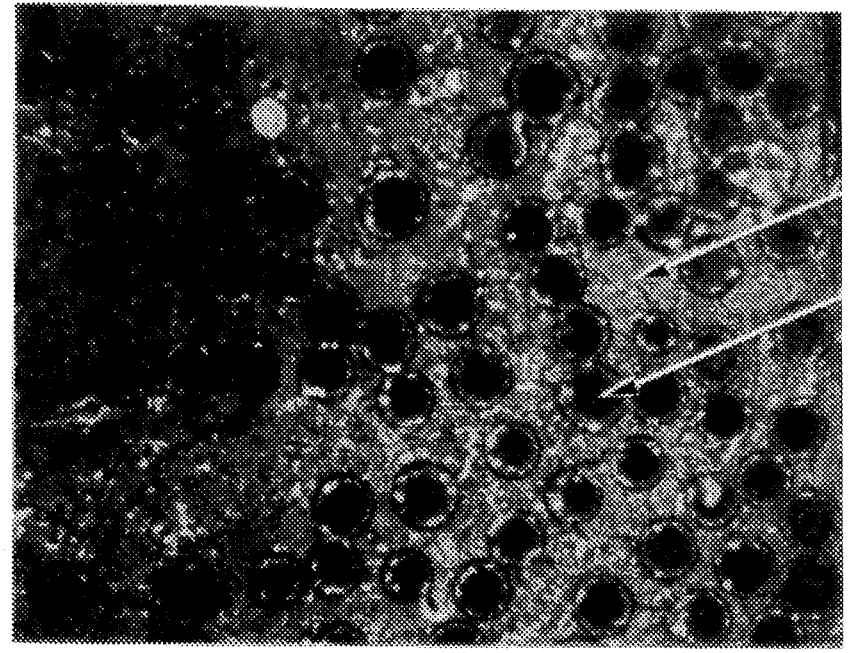
FIG. 10 is a photomicrograph at 400× magnification of a cross-section of a ceramic composite structure produced in accordance with Example 9 and containing layers of an alumina cloth filler material.

To determine the effect of growth of a material of the present invention into a two-dimensional woven cloth of a suitable filler material to yield a ceramic matrix composite of the present invention, experiments were conducted with woven cloth made from FIBER FP® alumina ceramic fiber (E. I. du Pont de Nemours & Co., Inc., Wilmington, Del.). The parent metal employed for this Example consisted of a commercial aluminum alloy number 5052) containing about 2.5% of magnesium along with roughly 1% (combined total) of other species such as Fe, Cr, Si, and Cu. Two samples each measuring about two inches (51 mm) by about nine inches (229 mm) by about one-half inch (13 mm), were prepared and were placed on top of one another to form an about two inch (51 mm) by about nine inch (229 mm) by about one inch (25 mm) parent metal bar. The top surface of the bar was covered with a layer containing about 2–5 grams of silicon dioxide dopant mixed with a binder of polyvinyl alcohol and water. The bar was placed horizontally upon a layer of E1 ALUNDUM® 90 grit (average particle diameter of about 216 μm), 95% pure alumina refractory grain (Norton Co., Worcester, Mass.) and was covered on four sides leaving the top (coated) surface exposed. Upon this surface were placed six layers of the alumina cloth, each measuring roughly about three inches (76 mm) by about ten inches (254 mm), and these layers were held loosely in place by refractory brick fragments located around the edges of the uppermost cloth layer. The assembly was placed into a furnace identical to that described in Example 1 and was heated in air to about 1125° C. for a period of about 180 hours. FIG. 10 is a photomicrograph (at 400× magnification) of a cross-section of the resulting ceramic matrix fiber-containing composite, showing the cloth filler material entrapped within a ceramic matrix consisting in part of an interconnected alpha-alumina matrix and non-oxidized metal. Similar cloth-containing composites have been produced with other materials, including zirconia cloth and a silicon carbide-based cloth. If the ceramic fiber-to-matrix interface bond is not too strong and the parent metal and oxidant do not attack the fibers, such ceramic matrix composites can potentially have the utility of very high strength in two dimensions imparted by the cloth and/or an increase in toughness of the ceramic matrix composite material imparted by crack deflection and fiber pull-out fracture mechanisms.

EXAMPLE 10

In order to demonstrate growth of a ceramic matrix composite of the present invention in an atmosphere less oxidizing than air, experiments were conducted in an inert gas which had been passed through a bath of heated water. In one example, an aluminum parent metal containing about 10% by weight silicon and about 3% by weight magnesium was prepared as a bar about three inches (76 mm) long by about one-quarter (¼) inch (6.4 mm) thick by about three-eighths (⅜) inch (9.5 mm) wide and was surrounded by 39 CRYSTOLON® 500 grit (average particle diameter of about 17 μm), SiC of 99% purity (Norton Co., Worcester, Mass.) in a refractory boat. The boat and its contents were placed in a furnace preheated to about 1200° C., allowing about fifteen minutes for insertion into the heated zone. Over this sample was passed argon of about 99.998% purity which had been passed through a bath of distilled water heated to about 50° C. In this case, moisture served as the oxidant. The sample was removed from the furnace after approximately 20 hours and a unit weight gain of about 19% was measured, producing an alpha-alumina based ceramic matrix composite containing silicon carbide particles. This indicates that the formation of the ceramic matrix composite material of the present invention can be performed in oxidizing environments having lower oxidizing activity than air.

EXAMPLE 11

To demonstrate the growth of a ceramic matrix composite material with an aluminum nitride-based matrix, an ingot was prepared of 380.1 aluminum (alloy from Belmont Metals, Inc.) measuring about 2 inches (51 mm) by about 1 inch (25 mm) by about ½ inch (13 mm). This ingot was coated with a layer (approximately ⅛ inch (3.2 mm) thick) of AlN particles mixed with an organic binder on all surfaces of the ingot except for one of the surfaces measuring about 1 inch (25 mm) by about 2 inch (51 mm). This alloy had a nominally identified composition by weight of about 8–8.5 percent Si, about 2–3 percent Zn and about 0.1 percent Mg as active dopants, and about 3.5 percent copper as well as iron, manganese and nickel, but the magnesium content was sometimes higher as in the range of about 0.17–0.18 percent. The coated ingot was then placed in a bed of 24 grit (average particle diameter of about 1035 μm) alpha-alumina, which was contained in a refractory crucible, such that the uncoated face of the ingot was substantially flush with the bedding. The above system was heated in a resistance heated furnace at a setpoint temperature of about 1250° C. in an atmosphere of forming gas (by volume 96% nitrogen and 4% hydrogen) for about 24 hours.

An aluminum nitride-based matrix grew through the thin layer of AlN particles into the volume containing the alumina bedding and produced a cohesive aluminum nitride/alumina ceramic matrix composite material. The presence of both the aluminum nitride matrix and the alumina filler in the resulting ceramic matrix composite was confirmed by X-ray powder diffraction.

The unit weight gain for the above sample was about 0.41. The theoretical unit weight gain for complete conversion of aluminum to aluminum nitride is about 0.52. Thus, good conversion of aluminum to aluminum nitride and good ceramic matrix composite growth were obtained in this experiment.

EXAMPLE 12

Two separate filler materials were prepared, each containing an admixture of aluminum nitride and alumina powders in ratios of about 20:80 and about 50:50 weight percents. The size of the two powders was about −325 mesh (particle diameter less than about 45 μm) and about 220 grit (average particle diameter of about 66 μm) for the aluminum nitride and alumina, respectively. An ingot of commercially available 380.1 aluminum alloy measuring about ¾ inch (19 mm) by about ½ inch (13 mm) by about ½ inch (13 mm) was embedded in each of the filler materials. This alloy had a nominally identified composition by weight of about 8–8.5 percent Si, 2–3 percent Zn and about 0.1 percent Mg as active dopants, and about 3.5 percent copper as well as iron, manganese and nickel, but the magnesium content was sometimes higher as in the range of about 0.17–0.18 percent. Each lay-up was heated separately in an induction furnace at an about 1300° C. setpoint temperature for about 36 hours in an atmosphere of forming gas (about 96% by volume nitrogen and about 4% hydrogen) flowing through the furnace at a rate of about 100 cc/minute.

Each of the above described systems exhibited growth of aluminum nitride into the bedding material, forming a cohesive ceramic matrix composite of aluminum nitride and aluminum oxide particles in a matrix of aluminum nitride plus some unreacted constituents of the parent metal. The presence of aluminum nitride and alumina in the resulting ceramic matrix composite material was confirmed by X-ray powder diffraction. The unit weight gains for the above samples are listed in Table 12 below.

TABLE 12

| Weight Gains for AlN Matrix Composites | |
|---|---|
| Filler Material | Unit Weight Gain |
| 20/80 (AlN/Al₂O₃) | .385 |
| 50/50 (AlN/Al₂O₃) | .437 |

This example further demonstrates the growth of a ceramic matrix composite with an AlN-based matrix, and also shows that a ceramic matrix composite having a heterogeneous filler can be formed by the process of the present invention.

EXAMPLE 13

To show the growth of zirconium nitride into a volume containing a filler material thereby yielding a ceramic matrix composite comprising the filler embedded by a zirconium nitride matrix, a cylindrical rod of zirconium, about ¾ inch (19 mm) in height and about ½ inch (13 mm) in diameter, was embedded within a bed of −100, +325 mesh size (particle diameter from about 45 μm to about 150 μm) zirconium diboride powder. The system was heated in an induction furnace by direct inductive coupling to the zirconium for about 15 minutes at a setpoint temperature slightly in excess of about 2000° C. in forming gas (same composition as in Example 11) flowing at a rate of about 400 cc/minute.

The result was growth of a zirconium nitride matrix into the volume containing the zirconium diboride filler material thereby producing a cohesive zirconium nitride/zirconium diboride ceramic matrix composite material. X-ray powder diffraction confirmed the presence of zirconium nitride and zirconium diboride in the resulting ceramic matrix composite material.

The foregoing procedure was repeated except that the zirconium nitride was grown into a volume containing zirconium nitride powder (1–5 μm particle diameter), and the forming gas oxidizing atmosphere flow rate was about 200 cc/minute. Growth of a zirconium nitride matrix into the zirconium nitride filler material resulted, thereby producing a cohesive zirconium nitride/zirconium nitride ceramic matrix composite material. X-ray powder diffraction confirmed the zirconium nitride composition of the end product.

EXAMPLE 14

To show the growth of titanium nitride into a volume containing a filler material yielding a ceramic matrix composite of the filler with a titanium nitride matrix, a cylindrical ingot of titanium about ¾ inch (19 mm) in height and about ½ inch (13 mm) in diameter was placed in a bed of 38 ALUNDUM® 90 grit (average particle diameter of about 216 μm) alumina (Norton Co., Worcester, Mass.). The above system was heated in an induction heated furnace by direct coupling to the titanium for about 2.5 hours at a setpoint temperature of approximately 2000° C. in forming gas (same composition as in Example 11) flowing at a rate of about 400 cc/minute.

The above system exhibited growth of titanium nitride into the alumina-containing volume producing a cohesive titanium nitride/alumina ceramic matrix composite material. Analysis of the above-formed ceramic matrix composite material by X-ray powder diffraction confirmed the presence of titanium nitride, alumina and trace amounts of titanium metal.

The foregoing procedure was repeated except that titanium nitride powder was employed as the filler material. The reaction was carried out for about 20 minutes at a setpoint temperature slightly in excess of about 2000° C.

The above-described procedure produced a cohesive titanium nitride/titanium nitride ceramic matrix composite material. X-ray powder diffraction analysis confirmed the titanium nitride composition of the ceramic matrix composite.

The foregoing procedure was repeated again except that titanium diboride powder was instead employed as the filler material and pure nitrogen was employed as the oxidizing atmosphere. The reaction was carried out for about 10 minutes and the nitrogen flow rate was about 600 cc/minute.

X-ray powder diffraction analysis confirmed that the cohesive ceramic matrix composite which resulted was comprised of titanium nitride and titanium diboride.

EXAMPLE 15

To demonstrate the growth of an alpha-alumina ceramic matrix into a fine silicon carbide filler using a parent aluminum alloy different from the Al/Mg/Si alloys of Example 6, an about nine inch (229 mm) by about two inch (51 mm) by about one-half inch (13 mm) sheet of commercially available 380.1 aluminum alloy was embedded within a bed of 39 CRYSTOLON® 500 grit (average particle diameter of about 17 µm) silicon carbide (Norton Co., Worcester, Mass.). The system was heated in a resistance heated furnace to an about 1000° C. setpoint temperature for about 75 hours in air.

In this system, growth of alpha-alumina into the silicon carbide resulted in the formation of a cohesive ceramic matrix composite material comprising silicon carbide particles in a matrix containing aluminum oxide plus minor amounts of unreacted constituents of the parent metal alloy.

X-ray powder diffraction analysis of the resulting ceramic matrix composite confirmed the presence of alpha-alumina and silicon carbide. The unit weight gain for the above-described system was about 0.478 indicating substantial oxidation of the aluminum parent metal into the silicon carbide filler.

EXAMPLE 16

To demonstrate the use of composite filler materials containing zirconium oxide, alpha-alumina was grown by the method of this invention into a volume of commercially available ZF ALUNDUM® abrasive grain material (Norton Co., Worcester, Mass.) containing alumina and zirconia. In this demonstration, an about 1 inch (25 mm) long by about ⅞ inch (22 mm) diameter cylindrical ingot of commercially available 380.1 aluminum was embedded within a bed of the above-described alumina-zirconia material. The system was heated in a resistance heated furnace to an about 1000° C. reaction setpoint temperature for about 95 hours in air.

Growth of the alpha-alumina oxidation reaction product into the alumina-zirconia volume resulted in the formation of a cohesive alpha-alumina/zirconia ceramic matrix composite material where the ZF ALUNDUM® abrasive grain material was captured in an alpha-alumina matrix grown by the process of the present invention.

X-ray powder diffraction analysis of the resulting ceramic matrix composite material confirmed the presence of alpha-alumina and zirconia. The unit weight gain for the above-described system was about 0.32 indicating substantial oxidation of the aluminum parent metal into the zirconia/alumina filler.

The foregoing procedure was repeated except that the above filler material was replaced by about -30 mesh (particle diameter less than about 590 µm) zirconia powder (Muscle Shoals, stabilized by calcium oxide). Substantial oxidation of the aluminum ingot into the zirconia-containing volume occurred, yielding a cohesive alpha-alumina/zirconia ceramic matrix composite material, as confirmed by X-ray powder diffraction.

EXAMPLE 17

To show the growth of a tin dioxide matrix into a volume containing about -75, +100 mesh (particle diameter from about 180 µm to about 200 µm) alumina particles, thereby resulting in a tin dioxide/alumina ceramic matrix composite material, a cylindrical ingot of tin about 0.79 inch (20 mm) tall and about 1.2 inches (30 mm) in diameter was embedded within a bed of the alumina. The system was heated to a setpoint temperature of about 1100° C. in air for about 48 hours.

The tin oxidized and grew a ceramic matrix into the alumina filler resulting in a cohesive tin dioxide/alumina ceramic matrix composite material. X-ray powder diffraction analysis confirmed the presence of tin dioxide and alpha-alumina in the resulting material.

The unit weight gain for the above system was about 0.28, as compared to the theoretical weight gain for tin dioxide of about 0.27. Thus, oxidation of the tin parent metal into the alpha-alumina bed was substantially complete.

EXAMPLE 18

To demonstrate the growth of an alpha-alumina matrix into filler material of E163 BUBBLE ALUNDUM® about 4 to 28 grit (particle diameter ranging from about 1035 µm to about 4750 µm) alumina, i.e., hollow alumina bodies, (Norton Co., Worcester, Mass.) at various process temperatures, cylindrical ingots about one inch (25 mm) long by about ⅞ inch (22 mm) in diameter of several aluminum alloys, in some cases externally doped, were embedded separately in beds of the above-described filler material. The alloys were processed in air at setpoint temperatures ranging from about 950° C. to about 1250° C. and for two separate process times, about 48 and about 80 hours. The unit weight gains for the above-described systems, at each process time, are listed in Tables 18(a) and 18(b) below.

TABLE 18

| Al Alloy | External Dopant | Process Temperature (°C.) | | | |
|---|---|---|---|---|---|
| | | 950 | 1050 | 1150 | 1250 |
| Unit Weight Gains 48 Hours | | | | | |
| 2.5% Mg | 140 grit SiO₂ | .01 | — | .58 | .28 |
| 6% Zn + 10% Si | none | .63 | .67 | .70 | .65 |
| 3% Zn + 7% Mg | none | .04 | .12 | .72 | .74 |
| 6% Zn | MgO powder | .73 | .70 | .71 | .71 |
| Unit Weight Gains 80 Hours | | | | | |
| 2.5% Mg | 140 grit SiO₂ | -.02 | .52 | .66 | .58 |
| 6% Zn + 10% Si | none | .63 | .67 | .68 | .63 |
| 3% Zn + 7% Mg | none | .04 | .26 | .74 | .72 |
| 6% Zn | MgO powder | .60 | .72 | .68 | .71 |
| 10% Si + 3% Mg | none | .07 | .71 | .71 | .75 |
| 380.1 | none | .65 | .69 | .69 | .13 |

The data in Tables 18(a) and 18(b) and examination of the samples confirm the formation of ceramic matrix composites by the process of this invention, each ceramic matrix composite having an alpha-alumina matrix embedding E163 BUBBLE ALUNDUM® alumina filler material.

EXAMPLE 19

To demonstrate the formation of a ceramic matrix composite material having a silicon nitride matrix, about 10.7 g of about 98.4% pure silicon chips were submerged in a bed containing about 90 weight percent -325 mesh (particle diameter less than about 45 µm) titanium nitride powder and about 10 weight percent titanium metal (titanium metal added to enhance wetting by molten silicon), and the system was heated to a reaction temperature of about 1500° C. for about 30 minutes in an atmosphere of forming gas flowing at 600 cc/minute.

X-ray powder diffraction analysis and examination of the sample produced by the above-described procedure confirmed the presence of the titanium nitride filler, the formation of silicon nitride and also the conversion of the titanium metal in the bed to titanium nitride. Ceramographic and energy dispersion X-ray analysis of the sample indicated the formation of a cohesive ceramic matrix composite material having a silicon nitride matrix.

EXAMPLE 20

To demonstrate the growth of a ceramic matrix composite material having an alpha-alumina matrix incorporating silicon carbide ceramic fibers, two bars of commercially available 380.1 aluminum, about 9 inches (229 mm) by about 2 inches (51 mm) by about ½ inch (13 mm) each, were stacked one on top of the other and placed in a refractory bedding of E1 ALUNDUM® 90 grit (average particle diameter of about 216 μm) alumina particles (Norton Co., Worcester, Mass.) such that the about 9 inch (229 mm) by about 2 inch (51 mm) face of the top bar was exposed and substantially flush with the alumina bedding. A thin layer of 39 CRYSTOLON® 220 grit (average particle diameter of about 66 μm) silicon carbide particles (Norton Co., Worcester, Mass.) was applied to the exposed aluminum surface and on top of that layer was placed 5 layers of ceramic cloth, made from NICALON® silicon carbide fiber (Nippon Carbon Co.) each layer separated by a thin layer of the above-described silicon carbide particles. The described lay-up was heated to a setpoint temperature of about 1000° C. for about 75 hours in air.

Figure 11:
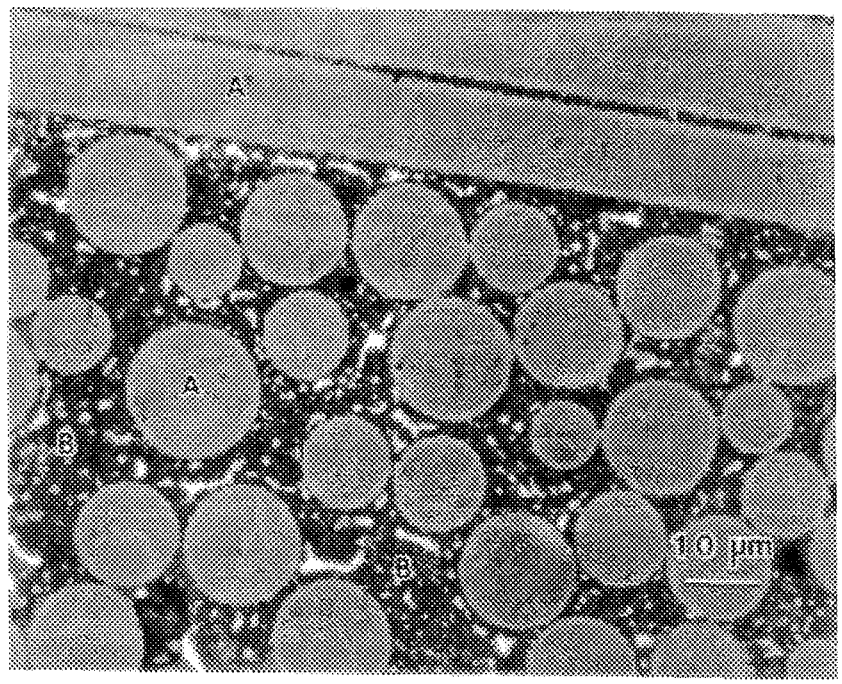
FIG. 11 is a photomicrograph at 1000× magnification of a ceramic composite structure having an alpha-alumina matrix embedding silicon carbide particles and silicon carbide ceramic fibers prepared in accordance with Example 20.

The above procedure produced a cohesive ceramic matrix composite material having an alpha-alumina matrix embedding alternately the layers of silicon carbide particles or the layers of silicon carbide cloth without disturbing the cloth weave and the lay-up configuration. FIG. 11 is a photomicrograph (at 1000× magnification) of the ceramic matrix composite material produced in the above example.

EXAMPLE 21

To demonstrate the growth of a ceramic matrix composite material having an alpha-alumina matrix embedding a filler material composed of barium titanate particles, a cylindrical ingot of commercially available 712 aluminum alloy, alloyed with about an additional 10% silicon such that the ingot comprised by weight about 10% Si, 5.0–6.5% Zn, 0.50–0.65% Mg, 0.40–0.60% Cr, 0.15–0.25% Ti, ≤0.50% Fe, ≤0.25% Cu, ≤0.10% Mn and the balance aluminum, about 1 inch (25 mm) tall by about ⅞ inch (22 mm) in diameter was submerged in a bed of $BaTiO_3$ particles in a refractory crucible. The ingot, bed and crucible were placed in a resistance heated furnace and heated to an about 1100° C. setpoint temperature for about 95 hours in air.

The unit weight gain for the above-described system was about 0.71, evidencing substantial conversion of the aluminum ingot to the alpha-alumina ceramic matrix. X-ray powder diffraction analysis of the resulting ceramic matrix composite material demonstrated the presence of the alpha-alumina matrix, $BaTiO_3$, silicon, and various oxidized and non-oxidized constituents deriving from the 712 alloy.

The above procedure produced a cohesive ceramic matrix composite having an alpha-alumina matrix embedding example demonstrate a barium titanate filler material.

EXAMPLE 22

This Example shows the use of strontium as a dopant to promote aluminum nitride growth into $TiB_2$ and alumina filler materials. However, this Example is not limited to showing the use of strontium as a dopant. It also illustrates other significant aspects of the present invention.

A series of experiments, as set forth in Table 22, were run in a continuous recording microbalance (Netzsch STA-429, Netzsch, Inc., Extort, Pa.) connected to a computer data acquisition system. The continuous recording microbalance system included a controlled atmosphere resistance heated furnace. In each experiment, a parent metal ingot having an outer diameter of about 0.23 inch (5.9 mm) and a thickness of about 0.20 inch (5 mm) was placed into the bottom of an alumina crucible having an inner diameter of about 0.24 inch (6.1 mm), a depth of about 0.5 inch (12.7 mm) and a wall thickness of about 0.04 inch (1.0 mm). A layer of –325 mesh (particle diameter less than about 45 μm) nickel powder (Cerac, Inc., Milwaukee, Wis.) was placed on the upper surface of the parent metal ingot at a concentration of about 0.02 grams per centimeter squared or about 1.4 to 1.5 percent by weight of the parent metal ingot.

In each experiment, a filler material was placed on top of the nickel coated surface of the parent metal ingot. The quantity of filler material added was sufficient to completely fill the crucible.

The setup, comprising the alumina crucible and its contents, was then placed into the controlled atmosphere furnace which communicated with the microbalance. The microbalance system was then sealed and evacuated to about $10^{-2}$ torr. After the furnace was evacuated, prepurified nitrogen gas was introduced into the controlled atmosphere furnace and maintained at a flow rate of about 0.1 standard liters per minute while the furnace was heated at a rate of about 100° C. per minute to the processing temperatures set forth in Table 22. The experiments were run in a slight nitrogen overpressure ranging from about 30.3–30.7 inches (770–780 mm) mercury (Hg).

The microbalance continuously recorded the weight gain as a function of temperature during the heating of the setup to the final reaction temperature and as a function of time after the furnace had reached its soak temperature (i.e., the temperatures indicated in Table 22).

Table 22 contains the results for ceramic matrix growth into 38 ALUNDUM® 220 grit (average particle diameter of about 66 μm) alumina filler (Norton Co., Worcester, Mass.), from: (1) a parent metal comprising about 3% Sr and the balance aluminum, at processing temperatures of about 900° C. and about 1000° C.; and (2) a parent metal comprising about 3% Sr, 1% Si and the balance aluminum, at processing temperatures of about 900° C., 950° C., 1000° C., 1100° C. and 1200° C. In addition, Table 22 contains the results for ceramic matrix growth into about –500 mesh (particle diameter less than about 25 μm) $TiB_2$ filler material from a parent metal comprising about 3% Sr and the balance aluminum, at temperatures of about 900° C., 975° C., 1000° C., and 1100° C.

The products of the above-described experiments were aluminum nitride ceramic matrix composites with fine aluminum nitride grain sizes of about 1 micron, uniform distribution of metallic and ceramic phases, and low porosity.

TABLE 22

| SAMPLE ID | PARENT METAL | FILLER MATERIAL | TEMPERATURE (°C.) | PERCENT WEIGHT GAIN |
|---|---|---|---|---|
| A | Al-3% Sr | 220 grit $Al_2O_3$[1] | 900 | 35.7 |
| B | Al-3% Sr | 220 grit $Al_2O_3$[1] | 1000 | 42.6 |
| C | Al-3% Sr-1% Si | 220 grit $Al_2O_3$[1] | 900 | 19.5 |
| D | Al-3% Sr-1% Si | 220 grit $Al_2O_3$[1] | 950 | 37.4 |
| E | Al-3% Sr-1% Si | 220 grit $Al_2O_3$[1] | 1000 | 11.0 |
| F | Al-3% Sr-1% Si | 220 grit $Al_2O_3$[1] | 1100 | 37.0 |

TABLE 22-continued

| SAMPLE ID | PARENT METAL | FILLER MATERIAL | TEMPERATURE (°C.) | PERCENT WEIGHT GAIN |
|---|---|---|---|---|
| G | Al-3% Sr-1% Si | 220 grit $Al_2O_3$[1] | 1200 | 39.0 |
| H | Al-3% Sr | -500 mesh $TiB_2$ | 900 | 42.6 |
| I | Al-3% Sr | -500 mesh $TiB_2$ | 975 | 43.2 |
| J | Al-3% Sr | -500 mesh $TiB_2$ | 1000 | 23.4 |
| K | Al-3% Sr | -500 mesh $TiB_2$ | 1100 | 44.2 |

[1]38 ALUNDUM ® Alumina, Norton Co., Worcester, MA

EXAMPLE 23

This example shows that the addition of Si to an alloy containing a first growth-promoting dopant (Sr or Ca) results in an aluminum nitride composite material with improved morphology, compared to materials grown without Si. The reaction rate of the Si-containing alloys was significantly reduced compared to the reaction rate of Al—Sr alloys. However, this example is not limited to the use of Si as a dopant. It also illustrates other significant aspects of aluminum nitride growth.

Aluminum alloy ingots with compositions of about 3% Sr, and about 0%, about 1%, about 3%, and about 5% Si, respectively, and measuring about 2 inches (51 mm) by about 1 inch (25 mm) by about ½ inch (13 mm), were disposed within a bed of about 320 grit (average particle diameter of about 32 μm) $B_4C$, contained within an alumina crucible, so that one about 2 inch (51 mm) by about 1 inch (25 mm) surface of each ingot was exposed to the surrounding atmosphere. Each of these exposed surfaces was then covered with a thin layer of about -325 mesh (particle diameter less than about 45 μm) Ni powder. No filler was used for these particular experiments. The alumina crucibles and their contents were then placed in evacuable resistance heated furnaces. The furnaces were evacuated and then back-filled with 100% $N_2$. The temperatures of the furnaces were increased at about 300° C./hour until the various temperatures indicated in Table 23 were obtained. The furnaces were then held at these temperatures for about two hours before the temperatures were decreased at about 300° C./hour to about ambient room temperature. At all times during the heating cycle, the flow rate of $N_2$ was maintained at about 0.5 liters per/minute.

Table 23 contains specific data and results for each experiment. As noted in Table 23, the about 0%-Si alloy had the greatest percentage weight gain (about 47.1%), indicating rapid growth, but exhibited nodular growth of aluminum nitride ceramic matrix material. Smooth growth of aluminum nitride ceramic matrix material with an about 39.5% weight gain was obtained for the about 1%-Si parent metal. The about 3%-Si parent metal also exhibited smooth growth, but its weight gain was only about 10.8%. The about 5% -Si parent metal had a weight gain of only about 5.6%.

Specific data and results for Si additions to Al-3%Ca parent metals are also shown in Table 23. The other growth conditions for the Al—Ca—Si parent metal experiments were identical to those used for the above-described Al—Sr—Si experiments. The Al-3%Ca-0%Si parent metal grew an aluminum nitride ceramic matrix material very rapidly, but the resulting material exhibited very poor morphology (e.g., nodular growth). The Al-3%Ca-1%Si parent metal did not grow an aluminum nitride ceramic matrix material as rapidly as the 0% Si alloy, but the resulting material exhibited excellent morphology (e.g., smooth, planar growth). At the higher processing temperatures (e.g., 1050° C. and 1100° C.) shown in Table 23, the Al-3%Ca-3%Si parent metal also produced an aluminum nitride ceramic matrix material which exhibited an excellent morphology, but the ceramic matrix material grew more slowly than the material produced from the 1% Si parent metal.

Thus, this Example demonstrates the effect of silicon on the rate and morphology of aluminum nitride ceramic matrix growth. Specifically, this example demonstrates that Si additions to the aluminum alloy parent metal reduce the rate of aluminum nitride matrix growth and even out or smooth out the macroscopic surface features of the growth front.

TABLE 23

| Dopants in Aluminum Parent Metal | Parent Metal Weight (gms) | Temperature (°C.) | Ni Interfacial Dopant Weight (gms) | Weight Gain | Morphology |
|---|---|---|---|---|---|
| 3% Sr-0% Si | 43.75 | 1000 | 0.33 | 47.1% | nodular |
| 3% Sr-1% Si | 44.43 | 1000 | 0.18 | 39.5% | smooth |
| 3% Sr-3% Si | 45.07 | 1000 | 0.14 | 10.8% | smooth |
| 3% Sr-5% Si | 43.91 | 1000 | | | initiation |
| 3% Sr-1% Si | 44.89 | 1050 | 0.26 | 41.4% | smooth |
| 3% Sr-3% Si | 43.84 | 1050 | 0.23 | 28.3% | smooth |
| 3% Sr-5% Si | 44.40 | 1050 | 0.24 | 10.7% | smooth |
| 3% Sr-1% Si | 44.27 | 1100 | 0.23 | 41.6% | smooth |
| 3% Sr-3% Si | 44.85 | 1100 | 0.20 | 23.5% | smooth |
| 3% Sr-5% Si | 46.02 | 1100 | 0.23 | 7.8% | uniform initiation |
| 3% Ca-0% Si | 44.63 | 1000 | 0.22 | 42.3% | nodular |
| 3% Ca-1% Si | 42.82 | 1000 | 0.26 | 31.1% | smooth |
| 3% Ca-3% Si | 42.46 | 1000 | 0.16 | 2.3% | nodular |
| 3% Ca-1% Si | 44.3 | 1050 | 0.25 | 34.5% | smooth |
| 3% Ca-3% Si | 43.95 | 1050 | 0.24 | 19.4% | smooth |
| 3% Ca-1% Si | 44.13 | 1100 | 0.28 | 34.7% | smooth |
| 3% Ca-3% Si | 43.25 | 1100 | 0.20 | 20.7% | smooth |

EXAMPLE 24

This example shows the use of Ba and Ca as dopants for promoting aluminum nitride ceramic matrix growth into AlN and $Al_2O_3$ filler. However, this example is not limited to demonstrating the use of Ba and Ca as dopants. It also illustrates other significant aspects of the present invention.

Aluminum alloy ingots were prepared by adding high purity Ca or Ba to high purity aluminum. The aluminum alloy ingots were placed in the bottom of $Al_2O_3$ crucibles. Grade A, 2.5–5.0 μm particle diameter AlN (Hermann C. Starck, Inc., New York, N.Y.) or 38 ALUNDUM® $Al_2O_3$ (Norton Co., Worcester, Mass.) filler was placed on top of the aluminum alloy ingots. The setups, comprising the crucibles and their contents, were then placed in a resistance heated furnace. The furnace temperature was ramped to about 1100° C. over about two hours, held at about 1100° C. for about 16 hours, and then ramped to ambient room temperature, all under flowing $N_2$. After the above-described heating step, the weight gains for each setup were determined. In addition, the resulting aluminum nitride ceramic matrix composites were sectioned and the density and apparent porosity of each composite were measured.

The results of these experiments are summarized in Table 24. This table shows that the best results were obtained for the combination of an aluminum parent metal containing about 1.7% by weight Ba and an $Al_2O_3$ filler (note that this particular run was only held at about 1100° C. for about 14 hours). This combination of parent metal and filler had a weight gain of about 28% due to nitridation of the aluminum alloy. The resulting ceramic matrix composite had a density of about 3.31 grams per cubic centimeter, and an apparent porosity by volume of about 0.1%. The ceramic matrix composite grown from an aluminum parent metal containing about 0.98% Ba, and using the same alumina filler material, had a weight gain of about 19.6%, and an apparent porosity by volume of about 0.6%. These ceramic matrix composites all had a relatively high metal content ceramic matrix.

TABLE 24

BARIUM AND CALCIUM AS DOPANTS IN AN ALUMINUM PARENT METAL AT 1100° C.

| FILLER | DOPANT CONCENTRATION IN ALUMINUM PARENT METAL (%) | TIME (h) | WT. GAIN (%) | APPARENT DENSITY (g/cm³) | POROSITY (%) |
| --- | --- | --- | --- | --- | --- |
| Al₂O₃ | 2.86 Ba | 16 | 7.8 | 3.32 | 1.0 |
|  | 1.70 Ba | 14 | 28.2 | 3.31 | 0.1 |
|  | 0.98 Ba | 16 | 19.6 | 3.31 | 0.6 |
|  | 0.50 Ba | 18 | 10.7 | 3.27 | 1.0 |
|  | 0.50 Ba | 16 | 8.4 | 3.34 | 1.8 |
|  | 0.24 Ba | 16 | 7.9 | 3.47 | 3.13 |
| AlN | 2.86 Ba | 16 | 26.7 | 2.96 | 1.7 |
|  | 0.98 Ba | 16 | 48.2 | 2.18 | 27.8 |
|  | 0.50 Ba | 16 | 31.1 | 2.59 | 9.1 |
|  | 0.24 Ba | 16 | 26.3 | 2.43 | 17.3 |
| Al₂O₃ | 2.06 Ca | 16 |  | 2.94 | 10.0 |
|  | 2.06 Ca | 16 | 7.4 | 3.13 | 5.2 |
|  | 0.96 Ca | 16 |  | 2.54 | 18.4 |
|  | 0.96 Ca | 16 |  | 2.61 | 11.1 |
|  | 0.49 Ca | 16 | 5.2 | 3.09 | 4.7 |
|  | 0.40 Ca | 48 |  | 2.91 | 13.1 |
|  | 0.25 Ca | 16 | 5.6 |  |  |
| AlN | 2.06 Ca | 16 | 52.5 | 2.37 | 20.8 |
|  | 0.96 Ca | 16 | 50.8 | 2.40 | 18.5 |
|  | 0.49 Ca | 16 | 49.3 | 2.23 | 28.1 |
|  | 0.25 Ca | 16 | 45.9 | 2.15 | 26.8 |

EXAMPLE 25

This example demonstrates the use of transition metals as dopants in a parent metal aluminum alloy to improve the hardness and microstructure of a matrix-only growth of aluminum nitride. However, this example is not limited to demonstrating the effect of the use of dopants to improve the microstructure of ceramic matrix structures. It also illustrates other aspects of the present invention.

Three hundred and twenty grit (average particle diameter 32 μm) B₄C powder was poured into the bottom of an Al₂O₃ tray to substantially cover the bottom of the Al₂O₃ tray. A parent metal ingot, measuring about 2 inches (51 mm) long, 1 inch (25 mm) wide and 0.5 inch (13 mm) deep was placed in the center of the Al₂O₃ tray and onto the B₄C substantially covering the bottom of the Al₂O₃ tray. The parent metal ingot was composed by weight of about 3% strontium, about 1% silicon and the balance aluminum and weighed about 48 grams. Additional 320 grit B₄C powder was poured into the space between the Al₂O₃ tray and the parent metal ingot until the B₄C was substantially level with the uppermost surface of the parent metal ingot. The total weight of the B₄C underneath and surrounding the parent metal ingot was about 42 grams. To complete the formation of the lay-up, a thin layer of nickel powder was placed evenly on the exposed surface of the parent metal ingot.

The lay-up was placed into an evacuable resistance heated furnace. At about ambient temperature, the furnace was evacuated and then filled with commercially pure nitrogen gas. The furnace and its contents were then heated to about 1050° C. at a rate of about 300° C. per hour, held at about 1050° C. for about 0.2 hours, and then cooled to about ambient temperature at about 300° C./hour. During the heating cycle, commercially pure nitrogen flowed through the furnace at about 0.5 liters per minute. At about ambient temperature, the lay-up was removed from the furnace, and it was observed that an aluminum nitride ceramic matrix had grown into the atmosphere from the exposed surface of the parent metal ingot.

The above procedure was substantially repeated with parent metal ingots composed by weight of: (1) about 3% strontium, about 1% silicon, about 4% nickel and the balance aluminum; (2)about 3% strontium, about 1% silicon, about 8% nickel and the balance aluminum; and (3) about 3% strontium, about 1% silicon, about 12% nickel and the balance aluminum, except that the holding time at the 1050° C. growth temperature was increased with increasing nickel content. Specifically, the lay-ups were held at the growth temperatures for 0.5 and 4 hours, respectively.

Figure 12:
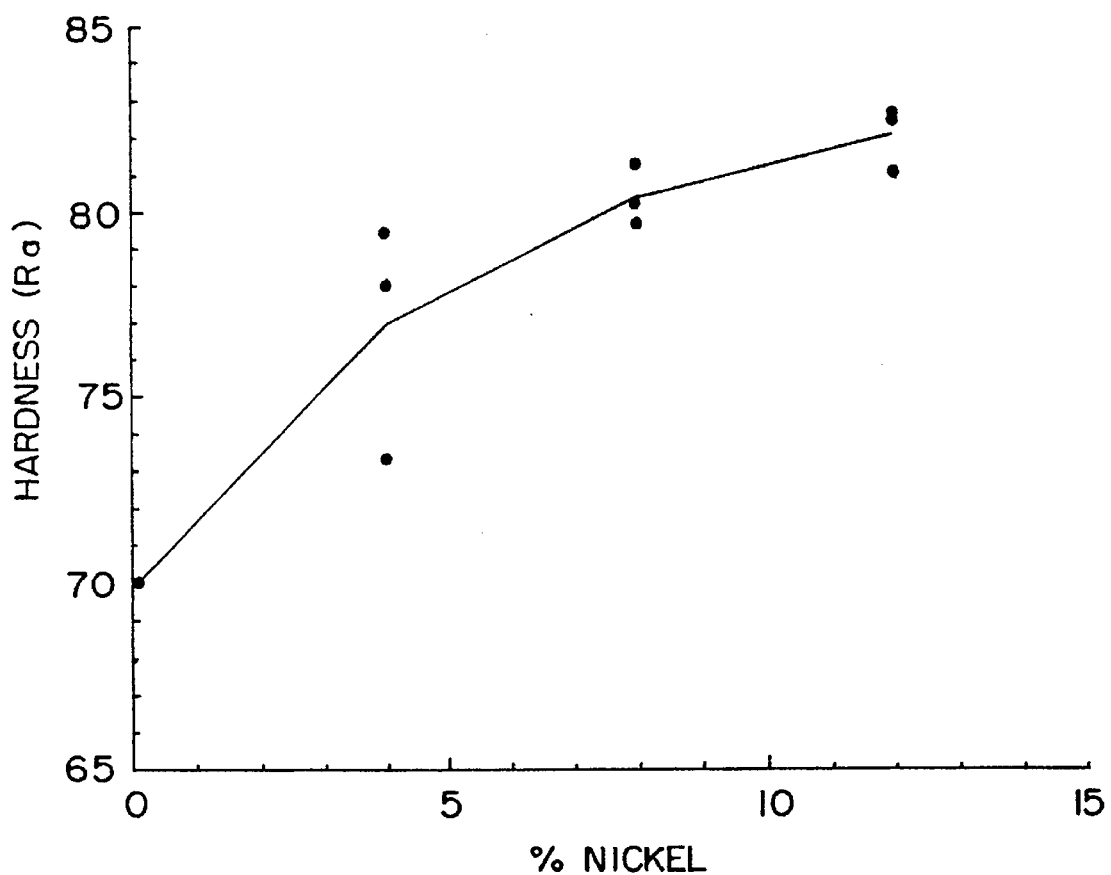
FIG. 12 is a graph which shows the effect of increasing the transition metal content of the alloy on the hardness of the resulting composite, using the growth method described in Example 25.
Figure 13A:
FIGS. 13a and 13b are photomicrographs at 1000× magnification which show the effect of increasing the transition metal content of the alloy on the microstructure of the resulting composite, using the growth method described in Example 25.
Figure 13B:
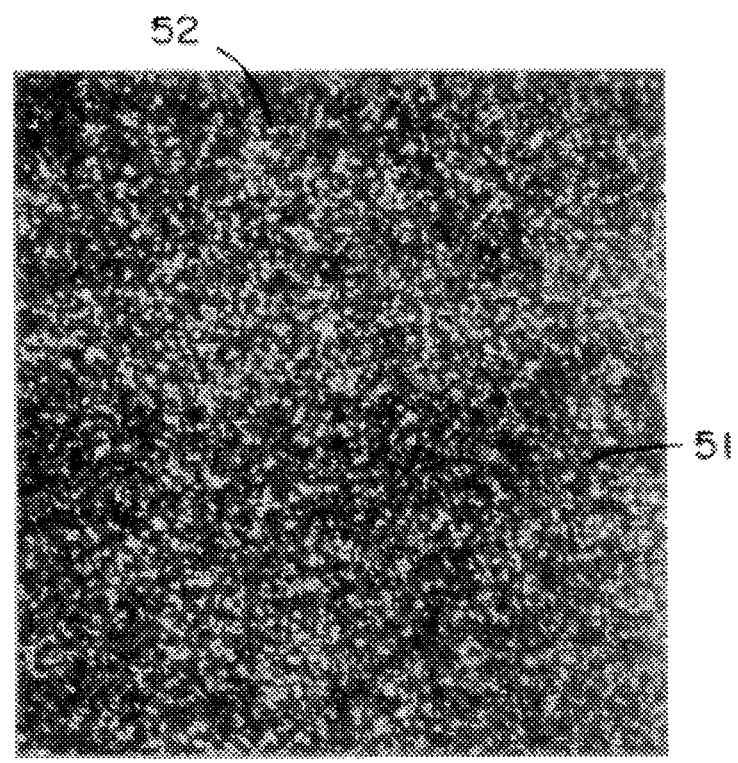

The effect of Ni additions to the hardness of aluminum nitride matrix-only growth is shown in FIG. 12. FIG. 12 shows the Rockwell A hardness of aluminum nitride growth from an aluminum parent metal comprising by weight about 3% Sr, about 1% Si and varying amounts of nickel, as a function of the nickel content of the alloy. FIGS. 13a and 13b are photomicrographs (at 1000× magnification) which illustrate the difference between the microstructure of matrix-only AlN grown without FIG. 13a; the use of a transition metal dopant (parent metal Al-3%Sr-1%Si), to the microstructure of matrix only AlN grown with about 8% by weight Ni included in the parent metal alloy as a dopant, FIG. 13b. FIGS. 13a and 13b show the AlN ceramic 51 and the aluminum alloy 52.

EXAMPLE 26

This example demonstrates that increasing the silicon content of a parent metal alloy, and increasing the Si₃N₄ content of an AlN preform, both increase the hardness of the resulting aluminum nitride ceramic matrix composite structure. However, this example is not limited to demonstrating the effects of Si and Si₃N₄ on the hardness of the resulting ceramic matrix composite. It also demonstrates other aspects of the present invention.

Preforms measuring about one inch (25 mm) in diameter and about 0.5 inch (13 mm) thick were prepared by pressing dry-blended powder mixtures of ALNEL™ Grade A200, 3.0–4.0 μm average particle diameter AlN (Advanced Refractory Technologies, Inc., Buffalo, N.Y.) and 0%, 1%, and 3% by weight Grade LC12, particle diameter less than about 0.6 μm, Si₃N₄ (Hermann C. Starck, Inc., New York, N.Y.) at about 5,000 psi (352 kg/cm²). Parent metal ingots having substantially the same dimensions as the preforms and having the following compositions by weight: about 2% Sr; about x% Si; about 8% Ni; and the balance aluminum, where x=0.0%, 0.5%, 1.0%, 1.5%, 2.0%, 2.5%, and 3.0%, were prepared. The ingots were coupled to the preforms with a thin layer of Type 123, average particle diameter of about 3–7 μm, Ni powder (INCO SPP, Saddle Brook, N.J.), as a dopant material, disposed between the ingots and the preforms. The preform/alloy combinations were completely buried in beds of TETRABOR® 320 grit (average particle diameter of about 32 μm) B₄C powder (ESK Engineered Ceramics, New Canaan, Conn.) contained within alumina crucibles. The setups, consisting of the alumina crucibles and their contents, were placed within an evacuable resistance heated furnace. The furnace was then heated to about 1000° C. at about 200° C./hour, maintained at about 1000° C. for about 30 hours, and then cooled to about room temperature (e.g., about 20° C.) at about 200° C./hour. A nitrogen gas flow rate of about 1200 cc/min was continuously provided to the furnace throughout the heating cycle.

Figure 14:
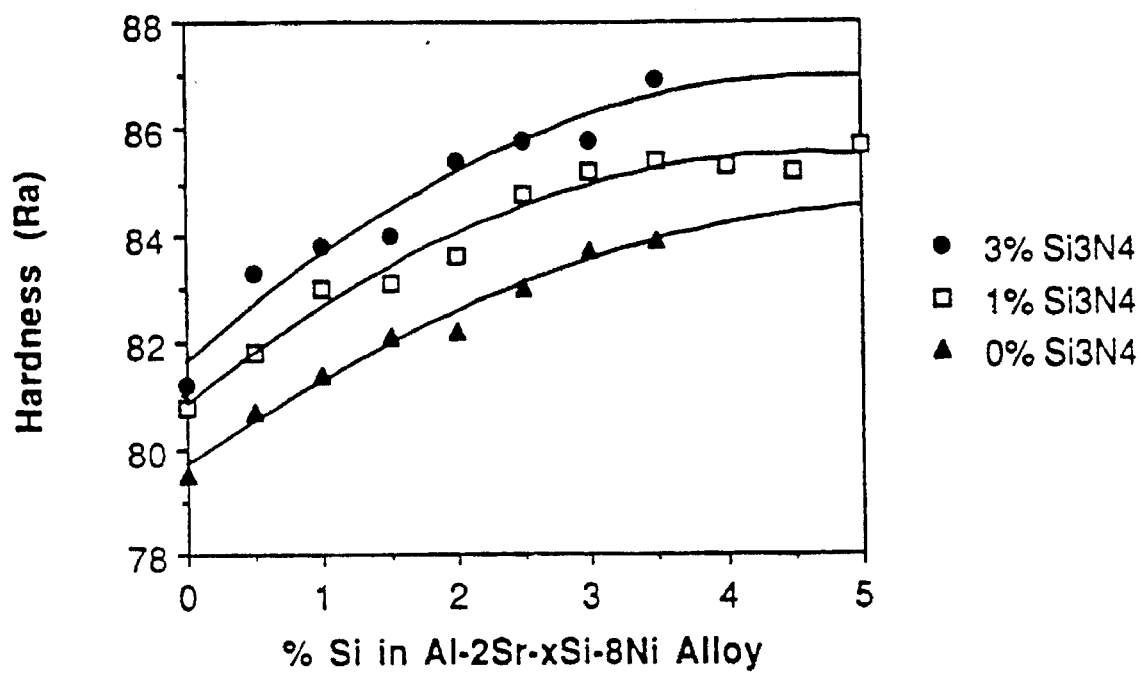
FIG. 14 shows the effect of increasing the Si content of the alloy and the $Si_3N_4$ content of the filler on the hardness of the composite grown according to the method described in Example 26.

After cooling to room temperature, the setups were removed from the furnace and disassembled to reveal the formed aluminum nitride ceramic matrix composites. The Rockwell hardness $R_A$ of these ceramic matrix composites was then measured and the results are shown in FIG. 14. This figure shows that increases in (1) the Si content of the alloy, and (2) the $Si_3N_4$ content of the preform, results in ceramic matrix composites with a greater Rockwell A hardness. Table 26 shows the percentage weight gain of each parent metal ingot as a result of the heating cycle. The increase in weight gain with increasing silicon content in the parent metal indicates that a greater fraction of the aluminum alloy parent metal is converted to aluminum nitride oxidation reaction product. Thus, the aluminum nitride content of the formed ceramic composite bodies increases with increasing silicon content in the parent metal. Further, hardness of the formed bodies increases with increasing Si content in the parent metal and $Si_3N_4$ content in the permeable mass.

TABLE 26

| % Si in alloy | 0.0 | 0.5 | 1.0 | 1.5 | 2.0 | 2.5 | 3.0 |
| --- | --- | --- | --- | --- | --- | --- | --- |
| % weight gain | 9.8 | 10.4 | 12.9 | 13.5 | 16.1 | 17.5 | 21.4 |

EXAMPLE 27

This example shows the structure of an aluminum nitride ceramic matrix composite grown into a filler material mixture having a composition by weight of about 95%AlN and about 5%$Si_3N_4$. However, this example is not limited to the analysis of the structure of this ceramic matrix composite. It also illustrates other aspects of the present invention.

Figure 16:
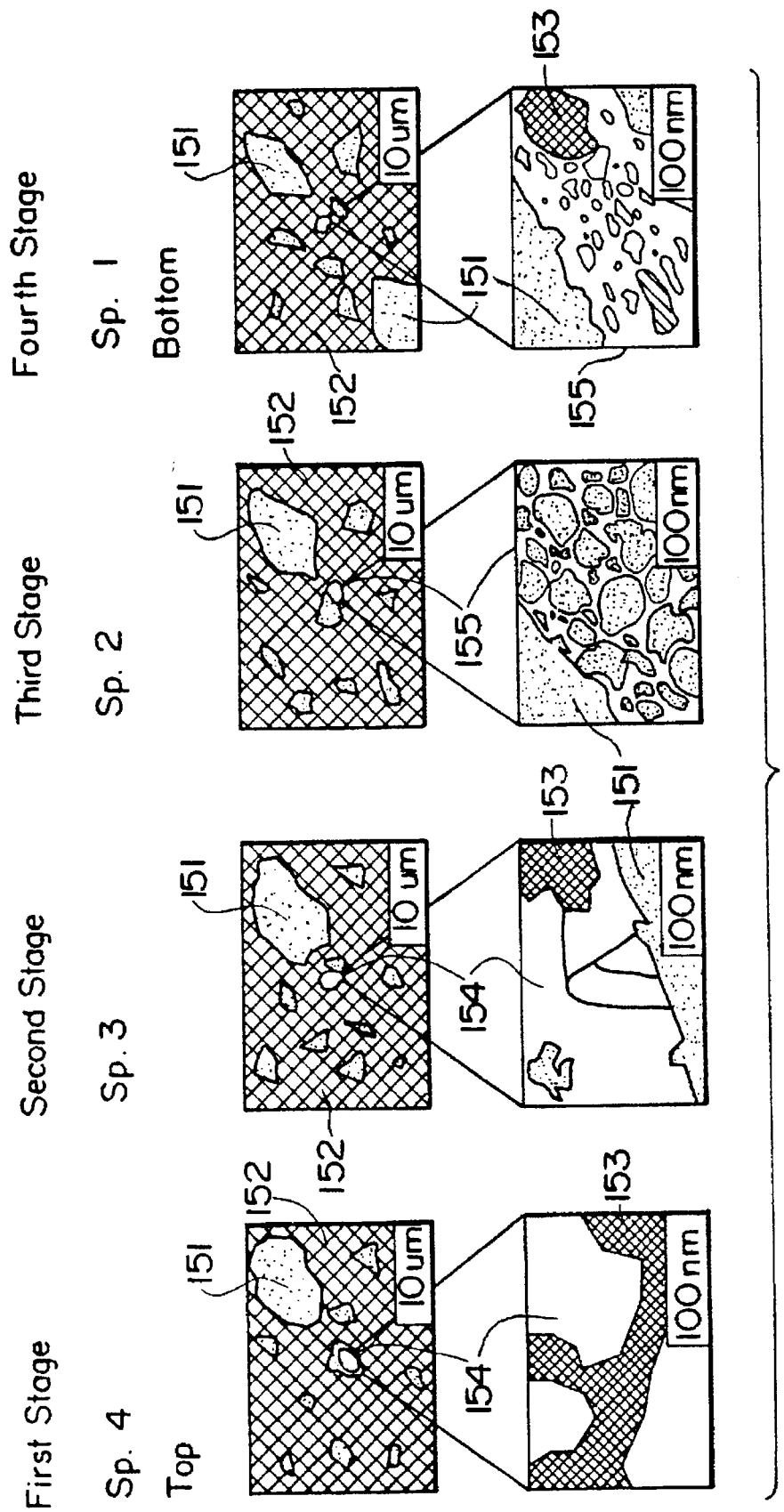
FIG. 16 shows the structure of specimens obtained from different parts of a composite, as described in Example 27.

Aluminum nitride was grown from an aluminum alloy ingot with a composition by weight of about 3% Sr, 1.25% Si, 8% Ni, and the balance aluminum, into the above-described AlN/$Si_3N_4$ filler mixture at a temperature of about 1000° C. for about 50 hours in a commercially pure nitrogen atmosphere. Specimens cut from four positions in the ceramic matrix composite (ranging from the top, where the growth was initiated, to the bottom of the composite) were analyzed by optical microscopy, transmission electron microscopy, and x-ray diffraction. FIG. 15 is a comparison of the position and intensity of lines in the x-ray diffraction spectrum for the above-described ceramic matrix composite to standard spectra for AlN, Al, $Si_3N_4$, $Si_3N_4$ (beta), Si, AlNi$_3$, and Al$_2$Si$_2$Sr. With the exception of a possible slight preferred crystallographic orientation, FIG. 15 shows, among other things, that the constituents of the aluminum nitride matrix composite bodies produced by directed metal oxidation are quite similar to the standard x-ray diffraction reference materials. FIG. 16 is a sketch summarizing the results of the analyses, showing a complex microstructure with about 10 micron to about 100 nm feature sizes. FIG. 16 shows the configuration of a typical aluminum nitride ceramic matrix composite, including the AlN filler 151, regions of AlN/AlN fine grained ceramic matrix composite 152, aluminum nitride ceramic matrix 153, $Si_3N_4$ particles 154, and aluminum alloy 155.

EXAMPLE 28

This example demonstrates, among other things, the growth of an aluminum nitride ceramic matrix into a $B_4C$ filler, and the use of post-growth processing to modify the properties of the resulting aluminum nitride ceramic matrix composite material.

Two bars of parent metal having dimensions of about 4.5 inch (114 mm) by 2 inch (51 mm) by 0.5 inch (13 mm), and a composition by weight of about 5% Mg, 3% Si, and the balance aluminum, were placed one on top of the other in a bed of about 100 grit (average particle diameter of about 150 μm) $B_4C$ powder contained within an alumina boat so that one approximately 4.5 inch (114 mm) by 2 inch (51 mm) surface of one ingot was exposed to the atmosphere. The ingots were in contact with one another and the bottom surface of the lower ingot was coated with an about 0.125 inch (3.2 mm) thick layer of about 90 grit (average particle diameter of about 216 μm) 38 ALUNDUM® alumina (Norton Co., Worcester, Mass.). The setup, consisting of the alumina boat and its contents, was placed within a retort contained within a resistance heated furnace, with air circulation around the retort. The furnace was heated to about 1030° C. over about 10 hours, maintained at about 1030° C. for about 36 hours, and then cooled over about 5 hours to about room temperature. Forming gas (96% by volume $N_2$, 4% $H_2$), was continuously supplied to the retort throughout the heating cycle at a flow rate of about 200 cc/min. The temperature inside the retort was estimated to be about 1000° C. during the about 36 hour period at which the furnace temperature was about 1030° C. Examination of the resulting body showed that an aluminum nitride ceramic matrix had grown into the $B_4C$ filler to form an aluminum nitride ceramic matrix composite body.

The aluminum nitride ceramic matrix phase of the ceramic matrix composite body was found to be metal-rich. The average Rockwell hardness ($R_A$) of the formed composite body was about 66. An about 1 inch (25 mm) by 0.19 inch (5 mm) by 0.16 inch (4 mm) sample was cut from the aluminum nitride ceramic matrix composite and buried in a bed of about 90 grit (average particle diameter of about 216 μm) 38 ALUNDUM® alumina (Norton Co., Worcester, Mass.) contained within an alumina boat. The alumina boat and its contents were heated in argon at about 1500° C. for about 24 hours. An oxygen getter was utilized within the gas supply line during this heat-treating step.

The average Rockwell hardness $R_A$ of the heat-treated sample was about 71.25. The heat-treated sample was crushed and ground into powder in a Spex Mill. X-ray diffraction analysis of the resulting powder showed that its major constituents include AlN, Al, $B_4C$, AlB$_{10}$, and AlB$_{12}$C$_2$.

EXAMPLE 29

Figure 17:
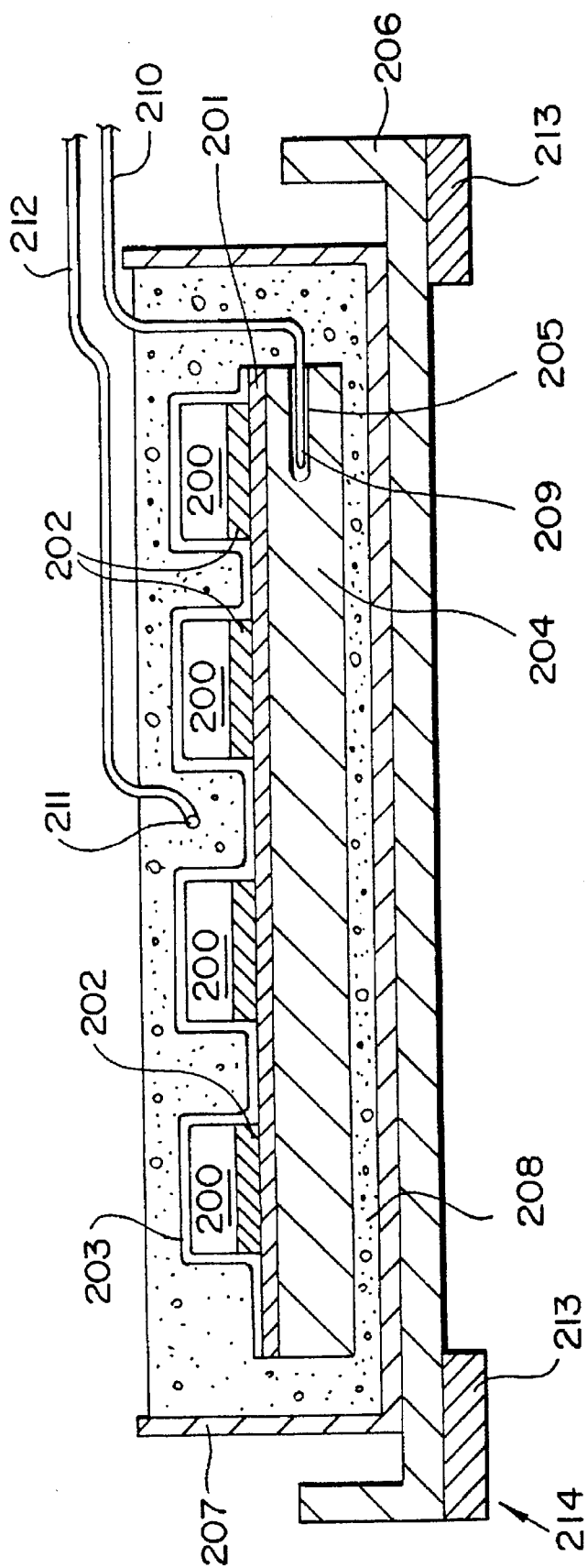
FIG. 17 is a cross-sectional schematic view of the lay-up used to produce the AlN reinforced AlN ceramic matrix composite bodies in accordance with Example 29.

The following Example demonstrates a method for forming a plurality of aluminum nitride reinforced aluminum nitride ceramic composite bodies by the directed oxidation of an aluminum parent metal into a preform comprising aluminum nitride powder. Specifically, this Example describes a method for simultaneously forming ninety-six (96) aluminum nitride reinforced aluminum nitride ceramic matrix composite bodies. FIG. 17 depicts a cross-sectional schematic viewe of the growth lay-up 214 used to grow of the aluminum nitride reinforced aluminum nitride composite bodies. Steps performed to form the growth lay-up 214 included, among others, mixture preparation, pressing, preform formation, and parent metal preparation.

Preforms 200 were formed from a pressing mixture comprising milled ALNEL™ Grade A-200, 3-4 micron average particle diameter aluminum nitride powder (Advanced Refractories Technology, Inc., Buffalo, N.Y.) and QPAC 40M polypropylene carbonate binder (Air Products and Chemicals, Inc., Emmaus, Pa.). To effect the formation of the pressing mixture, a binder-plasticizer solution was prepared by combining in a 0.79 gallon (4 liter) NAL-GENE® plastic jug (Nalge Company, Rochester, N.Y.) about 8,640 grams of histological grade acetone (VWR Scientific, Bridgeport, N.J.), about 720 grams of Q-PAC 40M polypropylene carbonate binder (Air Products and Chemicals, Inc., Corporation, Emmaus, Pa.) and about 360 grams of polypropylene carbonate plasticizer (J. T. Baker, Inc.). After the 0.79 gallon (4 liter) jug was sealed, the jug and its contents were then placed onto a rolling mill for about 4 hours to substantially completely dissolve the QPAC 40M polypropylene carbonate binder within the acetone. About 2.7 pounds (6 kilograms) of the aluminum nitride powder were then combined with about 2.7 pounds (6 kilograms) of alumina grinding rods in a NALGENE® plastic jug (Nagle Company, Rochester, N.Y.) having a volume of about 4 gallons (15 liters). The alumina grinding rods (U.S. Stoneware, Mahwah, N.J.) had a diameter of about 3/16 inch (4.8 mm) and a length of about 3/16 inch (4.8 mm). After the 4 gallon (15 liter) plastic jug was sealed, the jug and its contents were placed onto a rolling mill to mill the aluminum nitride powder. After about an hour on the rolling mill, the 4 gallon (15 liters) plastic jug was removed from the rolling mill, opened, and about 810 grams of the binder-plasticizer solution were added to the aluminum nitride powder and alumina grinding rods within the 4 gallon (15 liter) plastic jug. After about 15 minutes on the rolling mill, the 4 gallon (15 liter) plastic jug and its contents were again removed from the rolling mill and the sidewalls of the 4 gallon (15 liter) plastic jug were tapped with a hammer to dislodge any powder-binder-plasticizer mixture that had adhered. The replacement of the 4 gallon (15 liter) plastic jug on the rolling mill followed by the tapping of the sidewall was repeated about 3 times, after which the aluminum nitride powder had substantially completely mixed with the binder-plasticizer solution. The 4 gallon (15 liter) plastic jug and its contents were then removed from the rolling mill and the powder-binder-plasticizer mixture was passed through a commercially available colander to separate the alumina grinding rods from the powder-binder-plasticizer mixture. The powder-binder-plasticizer mixture was then placed onto an aluminum drying rack measuring about 20 inches long (508 mm) by about 16 inches (406 mm) wide by about 1.5 inches (38 mm) deep. The powder-binder-plasticizer mixture was leveled within the drying rack by using a straight edge. The drying rack and its contents were placed into a drying cabinet at about room temperature and having a nitrogen atmosphere flowing at about 50 cubic feet per hour (cfh) (24 liters per minute). After about 12 hours, an about 10 gram sample of the powder-binder-plasticizer mixture was removed from the contents of the aluminum drying rack in the drying cabinet. The moisture content of the 10 gram sample was determined with an moisture balance (Model MB-301, VWR Scientific, Bridgeport, N.J.) set at the third heating level. When the moisture content of the powder-binder-plasticizer mixture was about 0.2 percent, the dry powder-binder-plasticizer mixture was passed through a 30 mesh screen (screen opening of about 600 microns) of a sifter (Sweco, Inc., Toronto, Canada) to remove any large agglomerates. A second powder-binder-plasticizer mixture was formed substantially according to the above-described methods. The two powder-binder-plasticizer mixtures were then combined in a 6 gallon (22.7 liter) plastic drum and the drum was sealed. The drum and its contents were placed on a rolling mill for about 15 minutes to combine the two powder-binder-plasticizer mixtures and form a homogeneous pressing mixture.

Aluminum nitride preforms 200 were fabricated from the pressing mixture. About 230 grams of the pressing mixture was placed into the cavity of a die of a 200 ton press. The pressing mixture was evenly distributed within the die cavity using a hairpick and then leveled using a metal straight edge. The leveled pressing mixture within the die cavity was then pressed to about 10,000 pounds per square inch (70 MPa) to form preforms 200 measuring about 4 inches (102 mm) square by about 0.45 inches (11.4 mm) thick. The pressed preform was removed from the die. The pressing step was substantially repeated to form the additional aluminum nitride preforms 200.

Nine support plates 201 selectively coated with nickel paste 202 were prepared from aluminum sheet. Each support plate 201 measured about 19 inches (483 mm) long by about 9 inches (229 mm) wide by about 0.05 inches (1.3 mm) thick. Additionally, each support plate 201 was comprised of a commercially available aluminum alloy (Aluminum Association Alloy No. 6061) having a composition by weight of about 0.4 to 0.8 percent silicon, ≦0.7 percent iron, about 0.15 to 0.4 percent copper, ≦0.15 percent manganese, 0.8 to 1.2 percent magnesium, about 0.04 to 0.35 percent chromium, ≦0.25 percent zinc, ≦0.15 percent titanium and the balance aluminum. The surfaces of each support plate 201 were thoroughly cleaned with ethanol (Pharmco Products, Inc., Norwalk, Conn.). Each support plate 201 was then individually positioned onto and secured to a flat surface with double-sided tape. An about 0.05 inch (1.3 mm) shim was placed at each corner of the support plate 201. The frame of a printing screen (325 mesh screen at 45°, Microcircuit Engineering, Inc., Mount Holly, N.J.) measuring about 24 inches (610 mm) square was contacted with the shims and centered over each support plate 201. The printing screen was masked to print eight 4 inch (102 mm) nickel plate squares on each support plate 201 in a 2 square by 4 square array. The spaces between the eight nickel paste squares in the 2 square by 4 square array was about 0.63 inch (16 mm). AKX007 nickel paste (CSN E70422-7-2, E. I. DuPont de Nemours & Co., Wilmington, Del.) was placed along the width and at one end of the printing screen using a plastic spatula. The nickel paste was then drawn with a squeegee across and forced through the printing screen using smooth strokes to form the 2 square by 4 square array on each support plate 201. To ensure an even pattern on each support plate 201, several strokes back and forth across the printing screen were used. The printing screen was then carefully lifted from each support plate 201. After a support plate 201 with nickel paste squares 202 was removed from the flat surface, the support plate 201 was placed into a drying oven maintained under an exhaust hood. The drying oven and its contents were then heated at about 150° C. for about 20 minutes to substantially completely cure the nickel paste. After the nickel paste had substantially completely cured, the eight aluminum nitride preforms 200 were arranged on each support plate 201 such that the edges of the aluminum nitride preforms 200 were substantially aligned with the edges of the cured nickel paste 202.

A barrier material was formed by combining by weight about 1 part A-1000 alumina (Alcoa Company, Pittsburgh, Pa.), about 2 parts ethanol (Pharmco Products Inc., Norwalk, Conn.) and about 0.01 part HYPERMER® KD2 polymeric dispersant (ICI Americas, Specialty Chemicals, Wilmington, Del.) in a high-shear mixer (IKA Works, Inc., Cincinnati, Ohio) for about 1 minute. About 700 grams of the barrier material was placed into the reservoir of a spray gun and 2 support plates 201 each supporting eight aluminum nitride preforms 200 were sprayed with the barrier material to form a thin even coating 203 on the exposed surfaces of the aluminum nitride preforms 200 and the areas of the support plates 201 not covered by the aluminum nitride preforms 200 to form a barrier-coated setup. The barrier-coated setup was then placed into a drying cabinet having a nitrogen atmosphere flowing at about 50 cubic feet per hour (24 liters per minute) to dry the barrier coating.

Three parent metal ingots 204 comprised by weight of about 2% strontium, about 4% silicon, about 8% nickel and the balance aluminum and measuring about 38 inches (965 mm) by about 19 inches (482 mm) and about 1 inch (25 mm) thick were cast. Two holes 205 were then drilled to a depth of about 3 inches (76 mm) into opposite ends of each parent metal ingot. These holes 205 were for receiving thermocouple sheaths. Three steel boats 207 measuring about 40 inches (1020 mm) long by about 20.5 inches (521 mm) wide and about 4 inches (102 mm) deep and made from 16 gauge steel were each placed into a separate catcher plate 206 machined from Grade ATJ graphite (Union Carbide Corporation, Carbon Products Division, Cleveland, Ohio). Each catcher plate 206 measured about 42.5 inches (1080 mm) long by about 22.25 inches (565 mm) wide and was about 2.0 inches (51 mm) deep. About 2.1 gallons (8 liters) of a bedding material 208 comprised of 37 CRYSTOLON® 4F (average particle size of about 14 μm) silicon carbide (Norton Co., Worcester, Mass.) were poured into the bottom of each steel boat 207 and leveled using a straight edge to form a uniform layer having a thickness of about 0.5 inch (13 mm). The parent metal ingots 204 were then placed into the steel boats 207 and onto the bedding material 208, such that an about 1 inch (25 mm) gap was formed between the edge of the parent metal ingot 204 and the inside walls of the steel boats 207. Four barrier-coated setups comprised of a support plate 201 and eight aluminum nitride preforms 200 were then placed onto each parent metal ingot 204 contained within each steel boat 207. Two thermocouples 210 in alumina protection sheaths were then engaged in each predrilled hole 205 of each parent metal ingot 204. Additional bedding material 208 was then poured into each boat to substantially completely cover the barrier-coated setup. Three additional thermocouples 212 were then placed into the bedding material 208 along the longitudinal centerline 211 of each steel boat 207 and between the rows of aluminum nitride preforms 200 to monitor the temperature of the bedding material 208. This completed each lay-up 214.

Each lay-up 214 comprising the catch tray 206 and its content was then lifted using a forklift into one of three vertically arranged muffles, each having a volume of about 8 cubic foot (230 liters), made from INCONEL® metal contained in a resistance heated electrical furnace (Harrop Industries, Columbus, Ohio). Each lay-up 214 was supported on two support bars 213 within each muffle. The support bars measured about 42.5 inches (1080 mm) long, about 6 inches (152 mm) wide and about 1.5 inches (38 mm) thick and were machined from Grade ATJ graphite (Union Carbide Corporation, Carbon Products Division, Cleveland, Ohio). A clean unused red silicone gasket was then placed on each muffled door. Prior to closing the doors of the bottom and middle muffles, an about 1 inch (25 mm) thick piece of CERABLANKET® insulation (Manville Refractory Products, Denver, Colo.) was placed into the space between the muffle furnace door and the end of the lay-up 214. The muffle furnace doors were then closed and bolted shut using a torque wrench. After all the muffle doors had been closed, the muffle furnace chambers were evacuated to a pressure of about 30 inches (762 mm) of mercury (Hg) vacuum for about 15 minutes. The vacuum pump was then turned off and the pressure within the muffles was monitored for about 10 minutes to assure that no leaks existed in the red silicone gasket around each muffle door. Each muffle was then backfilled with nitrogen gas, having less that 5 parts per million combined water vapor and oxygen, at a flow rate of about 70 cubic feet per hour (34 liters per minute). The muffles and their contents were then heated from about room temperature (20° C.) to about 250° C. at about 250° C. per hour, from about 250° C. to about 450° C. at about 25° C. per hour, held at about 450° C. for about 4 hours, then heated from about 450° C. to about 550° C. at about 50° C. per hour, held at about 550° C. for about 4 hours, heated from about 550° C. to about 1020° C. at about 100° C. per hour, held at about 1020° C. for about 20 hours while maintaining a nitrogen flow rate of about 70 cubic feet per hour (34 liters per minute). The furnace and its contents were then cooled from about 1020° C. to about 800° C. at about 150° C. per hour. A debedding process was then commenced. Specifically, at about 800° C. the nitrogen flow into each muffle and the power to the furnace was interrupted and each muffle was opened. Each catch tray 206 containing a steel boat 207 and its contents was removed from each muffle and placed onto refractory bricks supported by a CARBORUNDUM® FIBERFRAX® ceramic blanket (Carborundum Co., Niagara Falls, N.Y.). The aluminum nitride preforms 200 were then separated from the molten parent metal 204 using long handled steel tongs with insulated tips. Each preform was shaken several times and the surface that had contacted the parent metal was scraped over the edge of the steel boat 207 to remove any remnant of drippings from the parent metal. The preforms 200 were then placed on a layer of FIBERFRAX® ceramic paper and immediately covered to prevent thermal shock. After about 15 hours, during which time the preforms had substantially cooled to about room temperature (i.e., about 20° C.), it was noted that the parent metal had grown into and embedded the preforms to form aluminum nitride reinforced aluminum nitride ceramic composite bodies. These composite bodies were subjected to sandblasting to remove any residual parent metal that may have remained adhered to the composite bodies after the debedding process.

After the alumina nitride reinforced aluminum nitride composite bodies were subjected to sandblasting, it was noted that the parent metal had grown into and embedded ninety-six of the ninety-six preforms thereby yielding ninety-six ceramic composite bodies. Thus, this example demonstrates a method for reliably forming a plurality of aluminum nitride reinforced aluminum nitride ceramic composite bodies in a single heating cycle.

EXAMPLE 30

This Example shows, among other things, some of the characteristic microstructural features of aluminum nitride matrix composites made according to the method described herein.

An aluminum nitride preform measuring about 4 inches (102 mm) square by about ⅞ inch (23 mm) thick was fabricated by casting a slip comprising ALNEL™ grade A-200, AIN powder (Advanced Refractory Technologies, Inc., Buffalo, N.Y., 3.0–4.0 micron average particle diameter), hexane and OLOA 1200 dispersant (Chevron Chemical Co., Oronite Additives Div., San Francisco, Calif.) into a plaster mold. The slipcast preform was allowed to dry overnight at about room temperature. The slipcast preform was then quartered to provide 2 inch (51 mm) square pieces.

A setup looking similar to that depicted in FIG. 6 was then assembled as follows. An aluminum alloy ingot comprising by weight about 3% strontium, about 1.5% silicon, about 8% nickel and the balance aluminum and measuring about 2 inches (51 mm) square by about ½ inch (13 mm) thick was placed onto an approximately ½ inch (13 mm) thick loose bed of −325 mesh (substantially all particle diameters less than about 45 microns) boron carbide (ESK Engineered Ceramics, New Canaan, Conn.). A thin layer of −325 mesh dry nickel powder (Inco SPP, Saddle Brook, N.J.) was sprinkled on the upper surface of the ingot as an initiator. The slipcast preform was then placed on top of the nickel powder layer disposed on the upper surface of the ingot and into substantial conforming engagement with the ingot. The ingot/preform combination was then embedded in additional boron carbide particulate. The setup comprising the refractory boat and its contents was placed into an evacuable resistance heated furnace. The furnace was evacuated and backfilled with nitrogen at about 20° C. A commercially pure nitrogen gas flow rate of about 2000 cc per minute was established and thereafter maintained throughout the heating cycle. The furnace temperature was then increased from about ambient temperature (20° C.) to a temperature of about 1050° C. at a rate of about 150° C. per hour. After maintaining a temperature of about 1050° C. for about 15 hours, the temperature was then lowered to about 20° C. at a rate of about 150° C. per hour. This procedure produced a well-defined composite body comprising aluminum nitride particles embedded in a matrix comprising aluminum nitride.

A sample was then prepared for transmission electron microscopy. In particular, a plate on the order of about 1 centimeter square and several millimeters thick was diamond machined such that the growth direction of the aluminum nitride matrix composite material lay within the plane of the face of the plate. An approximately 3 mm diameter disk was machined out of a portion of the face of the sample plate and the faces of the disk were then diamond polished and the overall thickness of the disk was reduced to about 10–20 microns. The thinned disk was then ion beam milled using 4 keV argon ions until the disk was perforated in its center. The ion beam thinned sample was then examined using 120 keV electrons in a Philips EM-420 (Philips Electronic Instruments, Mahwah, N.J.) transmission electron microscope fitted with a Model 860 energy dispersive spectrometer (Link Analytical, Inc., Palo Alto, Calif.).

Figure 18:
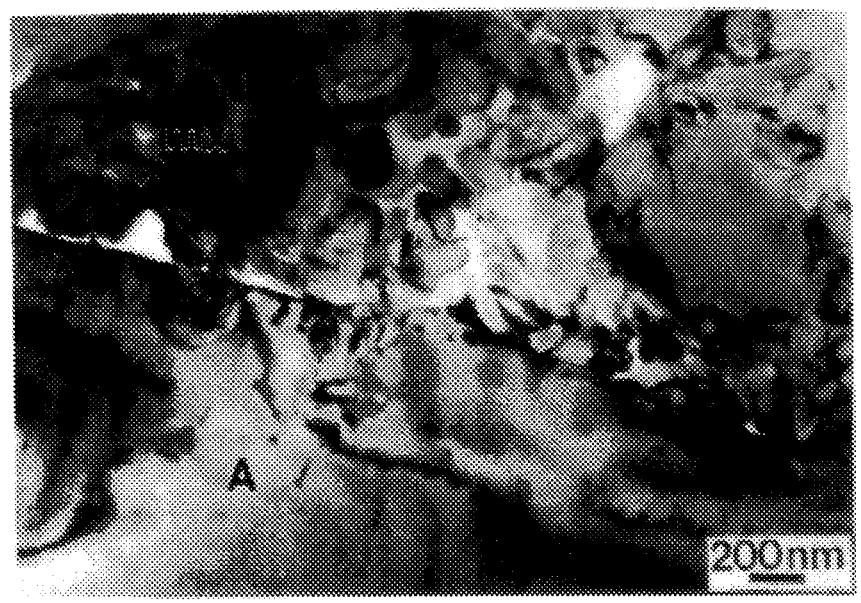
FIG. 18 is a bright field transmission electron micrograph showing part of the matrix phases and an AlN filler particle in the AlN composite body produced in accordance with Example 30.
Figure 19:
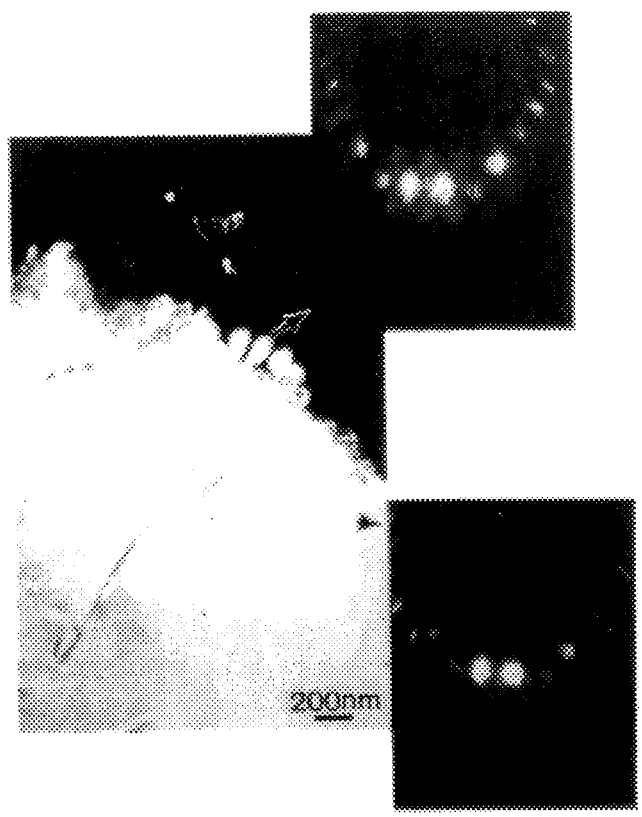
FIG. 19 is a dark field transmission electron micrograph which shows AlN oxidation reaction product "growing" from the surface of an AlN filler particle.
Figure 20:
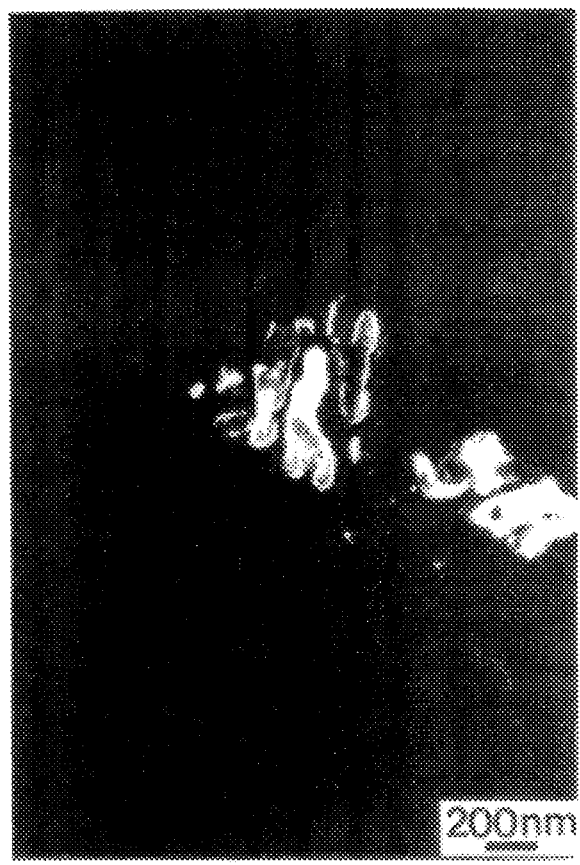
FIG. 20 is a dark field transmission electron micrograph of the same region as shown in FIG. 19 except that a different set of AlN grains are contrasted.
Figure 21:
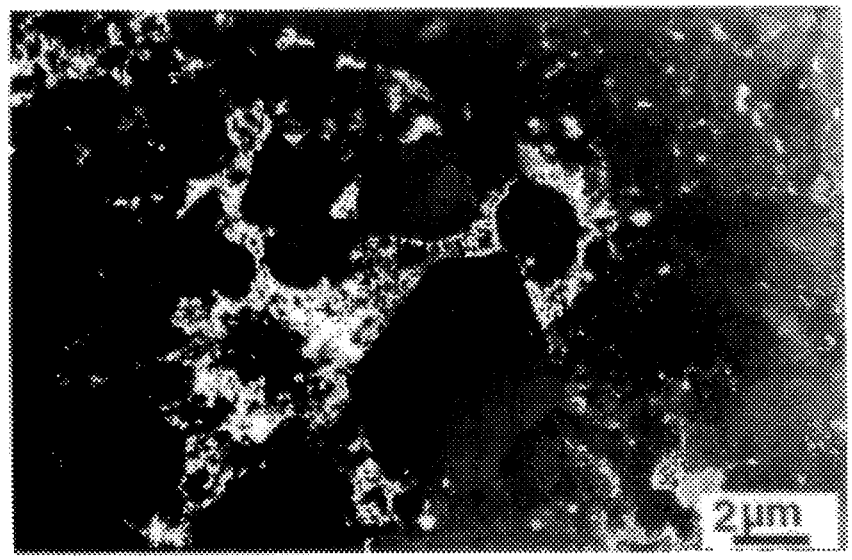
FIG. 21 is a dark field transmission electron micrograph showing a relatively large region of an $Al_3Ni$ intermetallic phase having a common crystallographic orientation.
Figure 22:
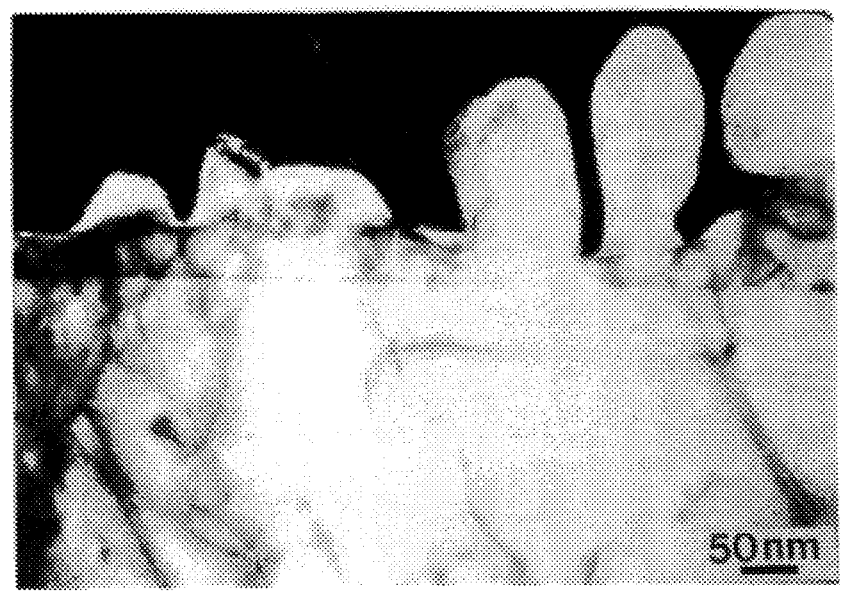
FIG. 22 is a higher magnification view of the region shown in FIG. 19.

FIG. 18 shows the boundary region between an aluminum nitride filler grain labeled "A" and the ceramic matrix comprising the aluminum nitride oxidation reaction product labeled "MX". The photomicrograph shows that many of the aluminum nitride gains comprising the matrix are rounded, elongated and on the order of 100 to 200 nm in size. FIG. 19 is a dark field image of an edge of an approximately 5 micron diameter aluminum nitride filler particle with one of the aluminum nitride reflections contrasted. This particular photomicrograph shows matrix phase aluminum nitride forming on the surface of the aluminum nitride filler grain and growing into the space between filler particles. The approximate equal image intensity between the matrix AlN and the filler AlN indicates coherency between the two. The convergent beam electron diffraction (CBED) patterns are those of the surface AlN and the bulk AlN of the filler grain. The two CBED patterns show that the surface or matrix AlN and the filler AlN particle have the same crystallographic orientation. FIG. 20 is another dark field image of the same region as FIG. 19. In this image, however, a different AlN reflection is contrasted, namely, a reflection corresponding to several AlN grains within the matrix phase and not residing on the surface of the above-mentioned AlN filler grain. This particular photomicrograph not only shows that these matrix AlN grains have a different crystallographic orientation than those appearing to grow from the surface of the filler AlN grain, but also that the group has a common crystallographic orientation. FIG. 21 is another dark field image, but of a much larger region than the other photomicrographs presented in this Example. Here the metallic component or constituent of the matrix phase is contrasted. This photomicrograph shows that the metallic constituent of the matrix phase possesses the same crystallographic orientation over a large area in relation to the size of both the matrix AlN grains and the filler AlN gains as evidenced by the fact that the metallic constituent imaged in this photomicrograph extends over several AlN filler grains. This contrasted metallic phase was $Al_3Ni$ as determined by energy dispersive spectroscopy and electron diffraction. FIG. 22 is another dark field image of the region shown in FIG. 19, but at higher magnification. This photomicrograph which contrasts an AlN reflection seems to show a 30–75 nm thick layer of aluminum nitride on the surface of the AlN filler grain with a boundary line showing the edge of the original filler grain clearly indicated. Furthermore, dislocations which can be seen in the filler grain appear to extend over this boundary line into the region of AlN which is growing from the surface of the filler grain. The axis of elongation of these grains growing into the matrix between the filler particles corresponds to the growth direction and furthermore, corresponds to a <100> crystallographic direction. The crystallographic plane of the filler AlN grain on which this epitaphial growth of matrix AlN occurs is the {100} plane.

EXAMPLE 31

This Example demonstrates the fabrication of an aluminum nitride matrix composite, wherein the parent metal is in particulate form and admixed with the filler material. Specifically, this Example demonstrates the fabrication of a plurality of magnesium aluminate reinforced aluminum nitride composite bodies. However, this Example is not limited to the above-described embodiment, but also describes other significant aspects of the invention.

The composite raw materials or their precursors were first mixed by ball milling. Specifically, a steel can measuring about 6 inches (152 mm) in diameter by about 6 inches (152 mm) high was charged with about 500 grams of BURUNDUM® ceramic spheres and cylinders (U.S. Stoneware Corp, Mahwah, N.J.) each measuring about 0.75 inch (19 mm) in diameter and about 0.75 inch (19 mm) high. Added next to the steel can was about 50 grams of silicon nitride particulate (−200 mesh, Elkera Metals, Inc., Pittsburgh, Pa.) having substantially all particles smaller than about 75 microns in diameter, about 150 grams of a parent metal particulate comprising by weight about 3% strontium, 1% silicon, 4% nickel and the balance aluminum (−200 mesh, atomized by Alcan International, Ltd., Montreal, Quebec, Canada) having substantially all particles smaller that about 75 microns in diameter and about 300 grams of magnesium aluminate spinel (−48 mesh, North American Refractories Co., Cleveland, Ohio) having substantially all particles smaller than about 300 microns in diameter. A gasket to hermetically seal the contents of the can from the ambient atmosphere was fabricated from flexible plastic and placed over the lip of the can. The original metal cover for the can was then pressed onto the lid of the can and additionally secured with electrical tape. The can and its contents were then placed on a rotating ball mill rack for about ½ hour to mix the contents. After about ½ hour of mixing, the steel can and its contents were removed from the mill rack, opened and about 25 grams of a solution comprising by weight about 20% Q-PAC® 40 polypropylene carbonate binder (Air Products, Emmaus, Pa.) and the balance acetone was added to the contents of the steel can. Next, about 2.5 grams of propylene carbonate plasticizer (Fisher Scientific, Columbia, Md.) was added to the can, followed by about 5 grams of additional acetone. The can was resealed, and mixing was resumed for about 1 hour. After this additional 1 hour of mixing, the can and its contents were removed again from the rotating mill rack, opened and the contents poured out onto a 20 mesh sieve screen (screen openings of about 850 μm). After screening the particulates, binder and plasticizer through this 20 mesh screen, the screened materials were permitted to dry in air at about 25° C. for about ½ hour.

Next, a number of preforms were fabricated. Specifically, for each preform, about 100 grams of the screened and dried material was charged into a hardened steel pressing die having an interior cavity of about 2 inches (51 mm) square and pressed uniaxially to a maximum pressure reported in Table 31. In each instance, however, an initial load of about 1500 pounds (680 kgf) was applied to the press punches at the beginning of the compaction cycle to consolidate the powder within the pressing die and facilitate the removal of entrapped air. A total of five preforms were pressed at final pressures of 8, 10 and 15 ksi (55, 69 and 104 MPa), respectively.

Figure 23:
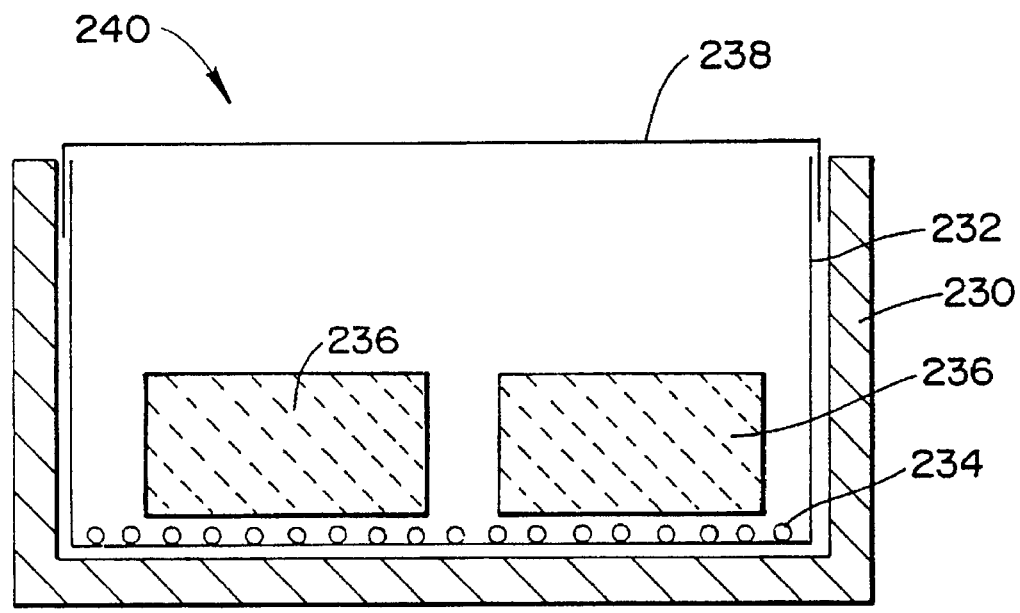
FIG. 23 is a cross-sectional schematic view of the lay-up used to produce the $MgAl_2O_4$ reinforced AlN ceramic matrix composite body in accordance with Example 31.

The dry pressed preforms were then thermally processed as follows. Referring to FIG. 23, a graphite boat 230 measuring about 10 inches (254 mm) square by about 3.875 inches (98 mm) in height was lined on its five interior surfaces with GRAFOIL® graphite foil 232 (Union Carbide Co., Danbury, Conn.). Hollow alumina spheres 234 (AEROSPHERES®, Ceramic Fillers Inc., Atlanta, Ga.) each measuring about 0.2 to 0.3 mm in diameter were poured into the graphite foil lined boat, substantially covering the bottom with a monolayer of such hollow spheres. The five preform tiles 236 were then placed on top of the layer of hollow alumina spheres 234 in an "x" arrangement as viewed from above. A second sheet of GRAFOIL® graphite foil 238 (Union Carbide Co.) was then placed on top of the graphite foil lining 232 to complete the set-up 240.

TABLE 31

| Preform # | Applied Pressure (ksi) | Perform Condition | Perform Wt. (g) | Perform Thk (cm) | Bulk Density (gm/cc) |
|---|---|---|---|---|---|
| 1 | 8 | P | 101.1 | 1.877 | 2.08 |
|   |   | T | 112.3 | 1.968 | 2.10 |
| 2 | 8 | P | 100.9 | 1.868 | 2.08 |
|   |   | T | 112.1 | 1.962 | 2.10 |
| 3 | 10 | P | 98.7 | 1.799 | 2.11 |
|   |   | T | 109.7 | 1.887 | 2.14 |
| 4 | 15 | P | 100.9 | 1.784 | 2.18 |
|   |   | T | 112.4 | 1.866 | 2.21 |
| 5 | 15 | P | 100.0 | 1.746 | 2.20 |
|   |   | T | 111.3 | 1.834 | 2.23 |

P: as pressed
T: as thermally-processed

The set-up 240 comprising the graphite boat and its contents was then placed into the retort chamber of a resistance-heated controlled atmosphere furnace at about room temperature (25° C.). The door to the retort chamber of the controlled atmosphere furnace was then closed and the retort chamber was evacuated to a vacuum of about 29 inches (737 mm) of mercury and backfilled with nitrogen gas of commercial purity. A nitrogen gas flow rate of about 20 standard liters per minute (slpm) was then established and maintained for the duration of the heating cycle. The furnace and its contents were then heated from about 25° C. to a temperature of about 550° C. at a rate of about 50° C. per hour. After maintaining a temperature of about 550° C. for about 5 hours, the temperature of the furnace and its contents was then increased to a temperature of about 1000° C. at a rate of about 150° C. per hour. After maintaining a temperature of about 1000° C. for about 10 hours, the furnace and its contents were then cooled at a rate of about 200° C. per hour. At a temperature of about 150° C., the door to the retort chamber was opened and the set-up 240 was removed. Disassembly of the set-up 240 revealed that, in each of the five preforms, composite formation had occurred. Specifically, each of the bodies thus thermally processed comprised a ceramic composite body comprising magnesium aluminate spinel embedded in a ceramic matrix comprising aluminum nitride.

Table 31 records the thickness, weight and bulk density for each of the five samples in both the "as pressed" and the "as thermally processed" condition. The table furthermore reports these results as a function of the pressure applied during dry pressing. The data of Table 31 shows that bulk density increases and preform thickness decreases as the peak pressing pressure increases. The data also show that bulk density, preform thickness and preform weight each increase upon thermal processing. The dimensional change in the length and width dimensions was only about half of that in the thickness dimension, i.e., about 2.4 percent expansion upon firing.

Thus, this Example demonstrates that ceramic composite bodies comprising a reinforcement filler comprising magnesium aluminate spinel and a matrix comprising aluminum nitride can be fabricated by firing a preform comprising the spinel filler and an aluminum parent metal particulate in an oxidizing atmosphere comprising a nitrogen-containing gas.

EXAMPLE 32

This Example demonstrates, among other things, the production of a ceramic composite body by heating a preform comprising a parent metal particulate in an oxidizing atmosphere, in particular, a nitriding atmosphere. Specifically, this Example demonstrates the fabrication of a ceramic composite body comprising a zirconium dioxide filler material embedded by a matrix phase comprising aluminum nitride.

A total of about 10 kg of raw material particulates was prepared for this composite fabrication procedure. The batch of the present Example was prepared in units of 700 and 1400 grams until a total of 10 kg was realized using ball mills measuring about 6 inches (152 mm) in diameter by about 6 inches (152 mm) in height or about 8 inches (203 mm) in diameter by about 8 inches (203 mm) in height, respectively. Because the procedure for batching 1400 grams of raw materials using the larger ball mill was substantially the same as the procedure for batching 700 grams of raw materials in the smaller ball mill, the quantities scaling accordingly, only the latter will be described. For a 700 gram batch, about 700 grams of BURUNDUM® ceramic ball milling spheres and cylinders each measuring about 0.75 inch (19 mm) in diameter by about 0.75 inch (19 mm) in height (U.S. Stoneware Corp., Mahwah, N.J.) were added to an approximately 6 inch (152 mm) diameter by about 6 inch (152 mm) tall steel can. Next, about 560 grams of Z-80 zirconium dioxide particulate (24 grit, TYK Co., Tokyo, Japan) and about 140 grams of a parent metal particulate comprising by weight about 3% strontium, 1% silicon, 4% nickel and the balance aluminum (−250 mesh, atomized by Valimet Corp., Stockton, Calif.) having substantially all particles smaller than about 56 microns in diameter were added to the steel can. The zirconium dioxide particulate had earlier been heated in air at a temperature of about 500° C. for about 10 hours to drive off moisture. The contents of the can were mixed for about ½ hour in substantially the same manner as for Example 31. Next, the Q-PAC® 40 polypropylene carbonate binder solution (Air Products, Emmaus, Pa.) and the propylene carbonate plasticizer (Fisher Scientific, Columbia, Md.) were added to the contents of the steel can in substantially the same proportions for Example 31 with the exception that these additions were divided into two roughly equal parts. Specifically, after the first half of the binder and plasticizer were added, the steel can was resealed and placed back on the rotating mill rack. After mixing for about 1 hour, the steel can and its contents were removed from the rack, opened and the contents screened through a 16 mesh sieve (screen openings of about 1180 microns) and dried for about ½ hour in air at about 25° C. The screened material was placed back into the steel can along with the ceramic ball milling media and the remainder of the binder and plasticizer was added to the contents of the steel can. The steel can was again resealed and placed back on the rotating mill rack. After mixing for about an additional 1 hour, the steel can and its contents were removed from the mill rack, the can was opened and the contents were again screened through the 16 mesh sieve and dried for about ½ hour in air at about 25° C.

A preform was then prepared by dry pressing. Specifically, about 1006 grams of the mixed, screened and dried powder was placed into the cavity of a hardened steel pressing die and uniaxially dry pressed to a final pressure of about 15 ksi (104 MPa) with an approximately 15-second dwell at the peak pressure. The dry pressed preform thus produced had dimensions of about 4.01 inches (10.18 cm) square by about 0.98 inch (2.485 cm) thick.

Figure 24:
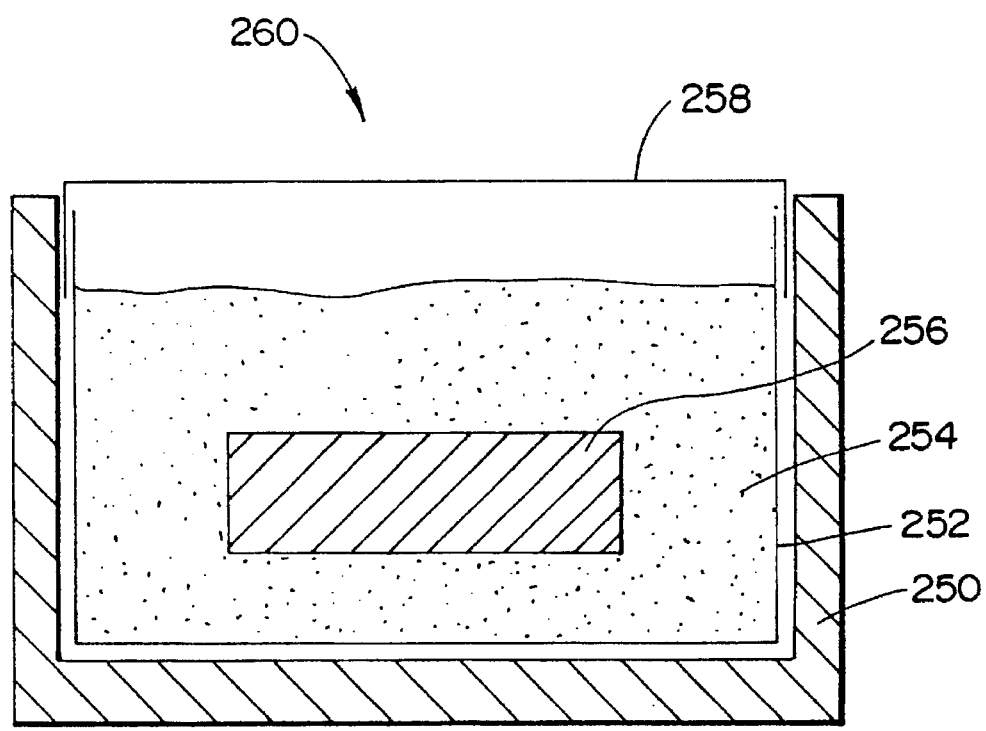
FIG. 24 is a cross-sectional schematic view of the lay-up used to produce the $ZrO_2$ reinforced AlN ceramic matrix composite body in accordance with Example 32.

Next, the preform was thermally processed to form a ceramic composite body. Referring to FIG. 24, a graphite boat 250 measuring about 7.5 inches (190 mm) square by about 3.5 inches (89 mm) in height was lined on its interior with GRAFOIL® graphite foil 252 (Union Carbide Co., Danbury, Conn.) in substantially the same manner as the graphite boat described in Example 31. Next, 220 grit 38 ALUNDUM® aluminum oxide particulate 254 (66 microns average particle diameter, Norton Co., Worcester, Mass.) was poured into the bottom of the graphite foil 252 lined graphite boat 250 to a depth of about ½ inch (13 mm) and leveled. The dry pressed preform 256 was then placed flat on top of this bedding of aluminum oxide particulate 254. Additional 220 grit 38 ALUNDUM® particulate 254 was then poured into the graphite foil 252 lined graphite boat 250 on top of and around the preform 256 and leveled, thereby burying the preform to a depth of about 1 inch (25 mm). A GRAFOIL® graphite foil cover 258 was then placed over the top of the graphite foil lining 252 substantially as described in Example 31 to complete the set-up 260.

The set-up 260 and its contents were then thermally processed in substantially the same manner as the set-up described in Example 31 with the exception that the furnace temperature was maintained at a temperature of about 1000° C. for about 15 hours.

Disassembly of the set-up following the thermal processing revealed that a ceramic composite body had formed. Specifically, the body comprised a ceramic matrix comprising aluminum nitride which embedded a reinforcement phase comprising zirconium dioxide filler material.

Thus, this Example demonstrates that ceramic composite bodies comprising a reinforcement filler comprising zirconium dioxide and a matrix comprising aluminum nitride can be fabricated by firing a preform comprising the zirconium dioxide filler and an aluminum parent metal particulate in an oxidizing atmosphere comprising a nitrogen-containing gas.

EXAMPLE 33

This Example demonstrates, among other things, the fabrication of a ceramic composite body comprising a magnesium oxide filler embedded by a matrix comprising aluminum nitride. This Example further demonstrates the fabrication of a ceramic matrix composite by the heating of a preform comprising a parent metal particulate in an oxidizing atmosphere, specifically, a nitriding atmosphere.

The raw materials components of the composite or their precursors were hatched and blended together as follows. Specifically, about 10 kg of BURUNDUM® ceramic ball milling spheres and cylinders each measuring about 0.75 inch (19 mm) in diameter by about 0.75 inch (19 mm) in height (U.S. Stoneware Corp., Mahwah, N.J.) was charged into an aluminum ball mill. To this ball mill was then added about 500 grams of silicon nitride particulate (−200 mesh, Elkera Metals, Inc., Pittsburgh, Pa.) having substantially all particles smaller than about 75 microns in diameter, about 3000 grams of fused magnesium oxide particulate (−25+60 mesh, Muscle Shoals, Inc., Muscle Shoals, Ala.) having substantially all particles between about 250 and 710 microns in diameter and about 4500 grams of pulverized, calcined magnesium oxide particulate having substantially all particles smaller than about 45 microns in diameter (−325 mesh, Martin Marietta Magnesia Specialties, Inc., Hunt Valley, Md.), which magnesium oxides had been previously heated in air at a temperature of about 500° C. for about 10 hours to remove any absorbed moisture or water of hydration. The ball mill was then sealed, placed on a rotating ball mill rack and milled for about ½ hour. While the silicon nitride and magnesium particulates were milling, the parent metal particulate was mixed with the binder and plasticizer. Specifically, about 2000 grams of a parent metal particulate comprising by weight about 3% strontium, 1% silicon, 4% nickel and the balance aluminum (−325 mesh, atomized by Valimet Corp., Stockton, Calif.) having substantially all particles smaller than about 45 microns in diameter was stirred into a solution comprising by weight about 100 grams of Q-PAC® 40 propylene carbonate binder (Air Products, Emmaus, Pa.), 50 grams of propylene carbonate (Fisher Scientific, Columbia, Md.) and about 400 grams of acetone. After mixing, the aluminum ball mill and its contents were removed from the rotating mill rack and the ball mill was opened. The slurry comprising the aluminum parent metal particulate, binder and plasticizer was then poured into the ball mill and "premixed" with the contents of the mill through hand blending. The ball mill was then reseated and placed back on the mill rack. After additional mixing for about 1 hour, the mill and its contents was removed from the rotating mill rack, opened and the contents removed. The BURUNDUM® ceramic milling media was then physically separated from the mixed raw materials and these mixed materials were then passed through a 16 mesh sieve (screen openings of about 1180 microns) and dried for between ½ and ¾ hour in air at about 25° C.

A quantity of the screened and dried material was then charged into the cavity of a hardened steel dry pressing die, leveled and uniaxially dry pressed with an applied pressure of about 6250 psi (43 MPa). During pressing, the maximum pressure was maintained for about 15 seconds before being released. The pressed preform nominally measured about 8 inches (20 cm) square by about 1.6 inches (4.1 cm) thick.

The pressed preform was then thermally processed as follows to produce a ceramic composite body.

Figure 25:
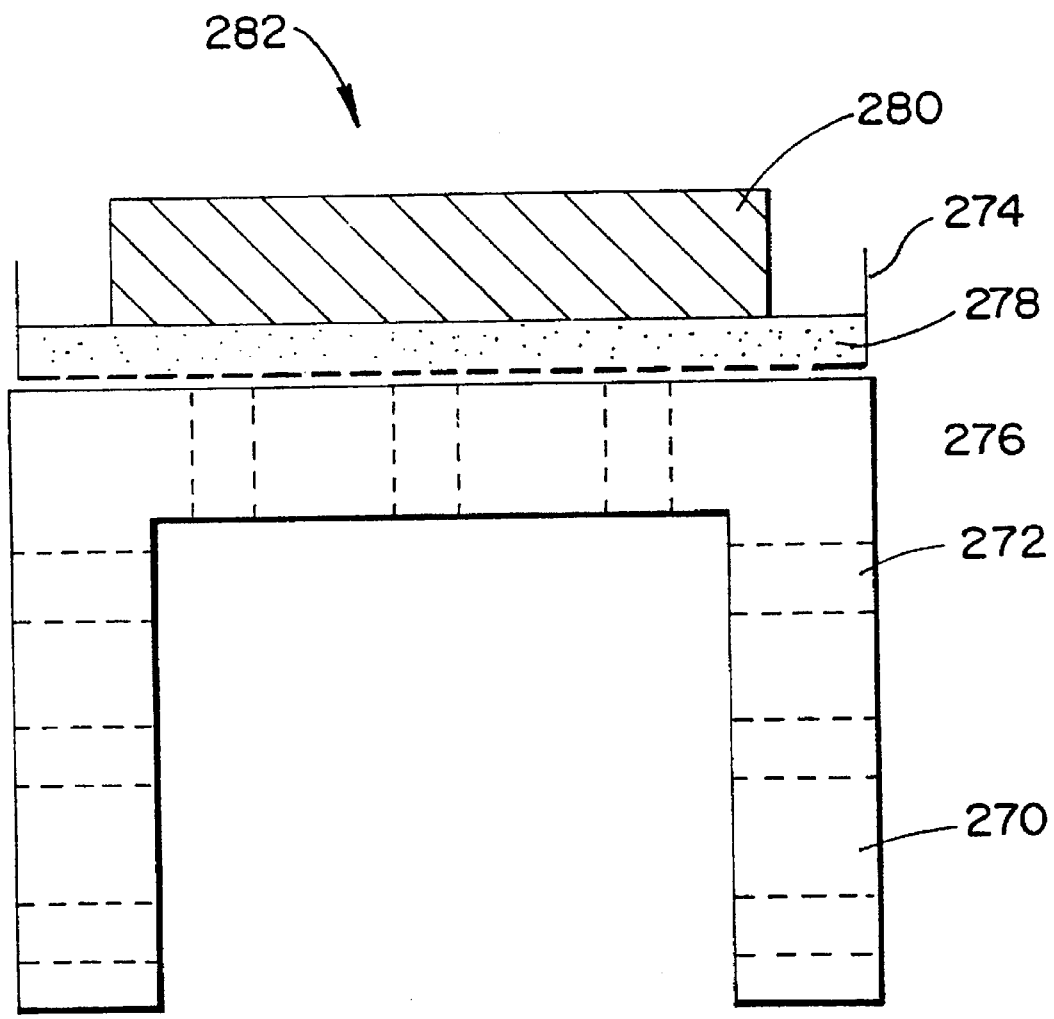
FIG. 25 is a cross-sectional schematic view of the lay-up used to produce the MgO reinforced AlN ceramic matrix composite body in accordance with Example 33.

Referring to FIG. 25, a set-up was fabricated as follows. A graphite boat 270 measuring about 10 inches (254 mm) square by about 4 inches (102 mm) in height was provided with a plurality of holes 272 throughout the boat 270, each measuring about 0.25 inch (6 mm) in diameter, spaced about 1 inch (25 mm) apart, and extending substantially completely through the walls of the boat. As shown by the figure, this graphite boat 270 was used to support a shallower boat fabricated from GRAFOIL® graphite foil 274 (Union Carbide Co., Danbury, Conn.) measuring about 10 inches (254 mm) square by about 1 inch (25 mm) in height. The graphite foil boat contained an array of perforations 276 in its bottom, each perforation measuring about 0.04 inch (1 mm) in diameter and substantially colinear with the holes 272 in the graphite boat 270. Into the graphite foil boat 274 was poured coarse magnesium oxide particulate 278 (about −4+10 mesh) (Aluchem, Inc., Reading, Ohio) to a depth of about 0.3 inch (7.6 mm) and leveled. The pressed preform 280 was then placed flat on top of the layer of coarse magnesium oxide particulate 278 to complete the setup 282.

The setup 282 was then placed into the retort chamber of a resistance heated controlled atmosphere furnace at about room temperature (20° C.). The door to the retort chamber of the furnace was then closed and the retort chamber was evacuated to a vacuum of about 29 inches (737 mm) of mercury and backfilled with argon gas. An argon gas flow rate of about 10 slpm was then established and maintained. The furnace and its contents were then heated from about 25° C. to a temperature of about 550° C. at a rate of about 50° C. per hour. After maintaining a temperature of about 550° C. for about 5 hours, the temperature was then increased to a temperature of about 900° C. at a rate of about 100° C. per hour. After maintaining a temperature of about 900° C. for about 1 hour, about 5 slpm of commercially pure nitrogen gas was added to the argon gas flow. After maintaining a temperature of about 900° C. and this argon-nitrogen gas flow for about 20 hours, the temperature was further increased to a temperature of about 1000° C. at a rate of about 100° C. per hour. After maintaining a temperature of about 1000° C. for about 1 hour, the temperature of the furnace and its contents was then decreased at a rate of about 200° C. per hour. When the temperature of the furnace and its contents had dropped to about 125° C., the door to the retort chamber was opened and the set-up was withdrawn. Inspection of the preform revealed that a ceramic composite body had been formed. Specifically, the formed ceramic composite body comprised a filler material of magnesium oxide particulate reinforcing a matrix comprising aluminum nitride. The formed ceramic composite body had dimensions of about 8.11 inches (20.6 cm) square by about 1.66 inches (4.21 cm) thick and had a mass of about 4.227 kg. Thus, the bulk density of the formed ceramic composite body as computed by dividing the mass by the bulk volume (as computed by multiplying the exterior dimensions of this right rectangular tile) was found to be about 2.37 g/cm.

Thus, this Example demonstrates that a ceramic composite body comprising a reinforcement filler comprising magnesium oxide and a matrix comprising aluminum nitride can be fabricated by firing a preform comprising the magnesium oxide filler and an aluminum parent metal particulate in an oxidizing atmosphere comprising a nitrogen-containing gas.

EXAMPLE 34

This Example demonstrates, among other things, the fabrication of a ceramic composite body comprising a zirconium dioxide filler embedded by a matrix phase comprising aluminum nitride.

The method described in Example 30 was substantially repeated with the exception that the setup 260 comprised a thin layer of 220 grit 38 ALUNDUM® aluminum oxide particulate (66 microns average particle diameter, Norton Company, Worcester, Mass.) coated on the top and bottom surfaces of the preform. Furthermore, the coated preform was immersed into a bedding of 90 grit 38 ALUNDUM® aluminum oxide particulate (216 microns average particle size, Norton Company) such that an approximately 1 inch (25 mm) thick layer of this particulate bedding was below the bottom surface of the preform and about 1 inch (25 mm) of this bedding particulate extended above the top surface of the preform.

EXAMPLE 36

This Example demonstrates, among other things, the fabrication of a ceramic composite body comprising a magnesium oxide filler embedded by a matrix comprising aluminum nitride.

The batching and blending of the raw materials was substantially the same as was described in Example 33. The raw material particulate components of the preform were slightly different, however, in that these particulates comprised by weight about 15 percent silicon nitride (−200 mesh, Elkera Metals, Inc., Pittsburgh, Pa.) having substantially all particles smaller than about 75 microns in diameter, about 15 percent parent metal particulate comprising by weight about 3% strontium, 1% silicon, 4% nickel and the balance aluminum (−200 mesh, atomized by Alcan International Limited, Montreal, Quebec, Canada), about 20% fused magnesium oxide (−25+60 mesh, Muscle Shoals, Inc., Muscle Shoals, Ala.) having substantially all particles between about 250 and 710 microns in diameter, about 20% pulverized, calcined magnesium oxide particulate (−325 mesh, Martin Marietta Magnesia Specialties, Inc., Hunt Valley, Md.) having substantially all particles smaller than about 45 microns in diameter and the balance approximately ⅛ inch diameter calcined magnesium oxide particulate (Martin Marietta Magnesia Specialties, Inc.). The binder and plasticizer comprised the same materials as those described in Example 31 and were added to the raw material particulates in the same proportions.

A preform was then fabricated by dry pressing to a final pressure of about 15 ksi (104 MPa) using substantially the same procedure described in Example 31.

The setup employed for fabricating the present composite body was substantially the same as than described in Example 31. Moreover, the heating cycle employed in the present Example was substantially the same as that described in Example 31 with the exception that the commercially pure nitrogen gas flow rate was about 25 slpm at an overpressure of about 2 psig (14 kPag).

Inspection of the preform upon completion of the heating cycle revealed that a ceramic composite body had been formed. Specifically, the formed ceramic composite body comprised magnesium oxide particulate reinforcing a matrix comprising aluminum nitride.

EXAMPLE 36

A ceramic composite body comprising magnesium oxide particulate filler reinforcing a matrix comprising aluminum nitride was fabricated in substantially the same manner as described in Example 35 with the exception that the preform of the present Example comprised by weight about 15% of the fused magnesium oxide particulate (−25 +60 mesh, Muscle Shoals, Inc.) and about 25% of the pulverized, calcined magnesium oxide particulate (−325 mesh, Martin Marietta Magnesia Specialties, Inc.).

EXAMPLE 37

A ceramic composite body comprising a magnesium oxide particulate filler reinforcing a matrix comprising aluminum nitride was fabricated in substantially the same manner as was described in Example 35 with the exception that the preform comprised by weight about 25% pulverized, calcined magnesium oxide particulate (−325 mesh, Martin Marietta Magnesia Specialties, Inc.) and about 25% of the approximately ⅛ inch diameter magnesium oxide particulate (Martin Marietta Magnesia Specialties, Inc., Hunt Valley, Md.).

EXAMPLE 38

This Example demonstrates, among other things, the fabrication of a ceramic composite body comprising a magnesium oxide particulate filler reincomprising a matrix phase comprising aluminum nitride.

A ceramic composite body was fabricated substantially in accordance with the method described in Example 35 with the following notable exceptions. Specifically, the raw material particulates making up the preform comprised by weight about 10% silicon nitride particulate (−200 mesh, Elkem Metals, Inc., Pittsburgh, Pa.) having substantially all particles smaller than about 75 microns in diameter, about 20% parent metal particulate comprising by weight about 3% strontium, 1% silicon, 4% nickel and the balance aluminum (−200 mesh, atomized by Alcan International Limited, Montreal, Quebec, Canada) and the balance pulverized, calcined magnesium oxide particulate (−325 mesh, Martin Marietta Magnesia Specialties, Inc., Hunt Valley, Md.) having substantially all particles smaller than about 45 microns in diameter. Moreover, the dry pressed preform, prior to exposure to the heating cycle, was coated on all surfaces with a slurry comprising the pulverized, calcined magnesium oxide particulate (−325 mesh, Martin Marietta Magnesia Specialties, Inc., Hunt Valley, Md.) and acetone. This coating was permitted to air dry prior to thermal cycling. Finally, the preform of the present Example was heated to a maximum of about 975° C. in contrast to the approximately 1000° C. of Example 35.

EXAMPLE 39

A ceramic composite body comprising a magnesium oxide particulate filler reinforcing a matrix phase comprising aluminum nitride was fabricated in substantially the same manner as was described in Example 38 with the exception that the preform comprised by weight about 20% of the silicon nitride particulate, about 30% of the parent metal particulate and the balance the pulverized, calcined magnesium oxide particulate.

EXAMPLE 40

A ceramic composite body comprising a magnesium oxide particulate filler reinforcing a matrix phase comprising aluminum nitride was fabricated in substantially the same manner as was described in Example 38 with the exception that the preform comprised by weight about 30% of the silicon nitride particulate, about 30% of the parent metal particulate and the balance the pulverized, calcined magnesium oxide particulate.

EXAMPLE 41

A ceramic composite body comprising a magnesium oxide particulate filler reinforcing a matrix phase comprising aluminum nitride was fabricated in substantially the same manner as was described in Example 38 with the exception that the preform comprised by weight about 20% of the silicon nitride particulate, about 20% of the parent metal particulate and the balance the pulverized, calcined magnesium oxide particulate.

EXAMPLE 42

A ceramic composite body comprising a magnesium oxide particulate filler reinforcing a matrix phase comprising aluminum nitride was fabricated in substantially the same manner as was described in Example 38 with the exception that the preform comprised by weight about 30% of the silicon nitride particulate, about 30% of the parent metal particulate and the balance fused magnesium oxide particulate (−25+60 mesh, Muscle Shoals, Inc., Muscle Shoals, Ala.) having substantially all particles between about 250 and 710 microns in diameter.

EXAMPLE 43

A ceramic composite body comprising a magnesium oxide particulate filler reinforcing a matrix phase comprising aluminum nitride was fabricated in substantially the same manner as was described in Example 42 with the exception that the preform comprised by weight about 20% of the silicon nitride particulate, about 20% of the parent metal particulate and the balance fused magnesium oxide particulate.

EXAMPLE 44

This Example demonstrates the fabrication of a magnesium oxide reinforced aluminum nitride matrix composite. Further, this Example demonstrates the fabrication of such bodies wherein the parent metal which is to be oxidized is supplied in particulate form and admixed with the magnesium oxide reinforcement material.

The starting composition for making the aluminum nitride matrix composite body was substantially the same as that employed in Example 33 with the following notable exceptions. Specifically, the silicon nitride particulate features substantially all particles smaller than about 53 microns (−280 mesh, Elkem Metals Inc., Pittsburgh, Pa.). Further, the aluminum alloy particulate comprised substantially all particles having a size within the range of 45 microns to about 75 microns (−200 mesh +325 mesh).

A preform measuring about 4 inches (102 mm) square by about 1 inch (25 mm) thick was dry pressed to a final pressure of about 15 ksi (104 MPa) in substantially the same manner as described in Example 31.

The dry pressed preforms were then thermally processed in substantially the same manner as the preform described in Example 31 with the exception that the dwell time at a temperature of about 1000° C. was for a duration of about 15 hours. Further, the nitrogen gas flow rate was about 25 standard liters per minute.

Dimensional measurement of the ceramic composite body recovered from the furnace showed length and width increases of about 2.6 percent and a thickness increase of about 4.6 percent. The bulk density was computed to be about 2.46 grams per cubic centimeter which in turn was estimated to correspond to a theoretical density of about 80 percent. The open porosity as measured by a mercury porosimiter was determined to be about 12 volume percent, with substantially all of the pores ranging in size from about 0.2 micron to about 75 microns. Semiqualitative x-ray diffraction showed aluminum nitride and magnesium oxide as the only phases present. Semiquantitative image analysis reported 70 percent by volume of magnesium oxide, 10 percent of aluminum nitride, less than 1 percent residual unreacted metal and the balance as porosity.

Figure 26A:
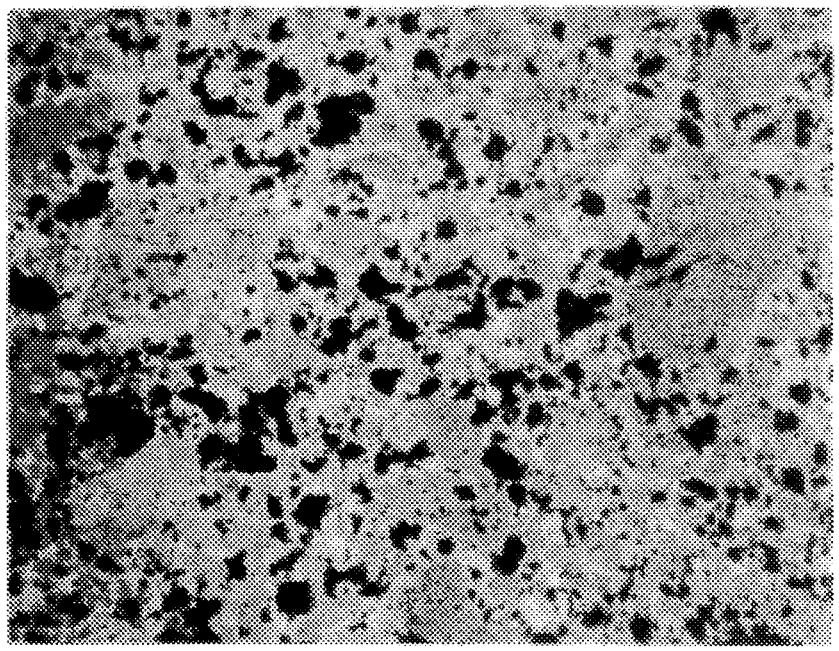
FIGS. 26a and 26b are optical photomicrographs taken at about 50× and 200×, respectively, of a polished cross-section of a MgO reinforced AlN composite material which is very similar to the material described in Example 44.
Figure 26B:
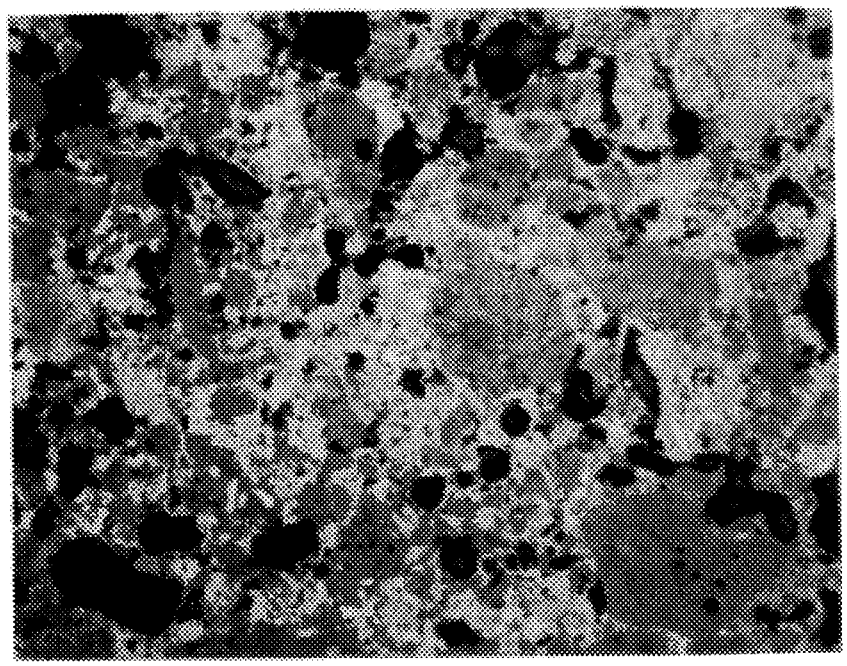

FIGS. 26a and 26b are approximately 50× and 200× optical photomicrographs of MgO reinforced AlN ceramic composite bodies which were similar to the bodies produced according to the present Example. Specifically, unlike the preforms of the present Example, those employed in fabricating the bodies shown in FIGS. 26a and 26b comprised CERASET-SN ceramer (Lanxide Corp.) as the binder; further, these preforms were pressed at about 5000 psi (35 MPa).

EXAMPLE 45

This Example demonstrates the fabrication of a magnesium aluminate spinel reinforced aluminum nitride matrix composite. This example demonstrates the use of a preceramic polymer as a preform binder which pyrolyzes to produce a phase comprising silicon nitride.

The raw materials and the processing to produce the spinel reinforced aluminum nitride composite material of the present Example were the same as those employed in producing the aluminum nitride matrix composite of Example 33 with the following notable exceptions. Magnesium aluminate spinel was substituted for the magnesium oxide filler material reinforcement of Example 33. Specifically, the batch comprised about 3000 grams of magnesium aluminate spinel (−28+48 mesh, North America Refractories Co., Cleveland, Ohio) having substantially all particles between about 300 microns and about 600 microns in size and about 4500 grams of magnesium aluminate spinel (−325 mesh, North American Refractories Co.) having substantially all particles smaller than about 45 microns in size. Further, in place of the binder solution of Example 33 was substituted about 200 grams of a preceramic polymer composition comprising by weight about 1 percent DI-CUP® diphenyl peroxide (Hercules, Inc., Wilmington, Del.) and the balance CERASET-SN ceramer (Lanxide Corporation, Newark, Del.).

A preform bar measuring about 8.75 inches (222 mm) long by about 1.25 inches (32 mm) in height and thickness was dry pressed substantially in accordance with the technique described in Example 33 except that the ultimate force applied was about 5000 pounds or about 457 psi (3150 kPa). Further, immediately after this uniaxial dry pressing, the pressed preform was placed into an air atmosphere furnace at a temperature of about 200° C. for about 2 hours to cure the preceramic polymer binder.

The setup was substantially the same as that described in Example 33 and shown in FIG. 26 with the exception that the setup further comprised a perforated graphite cap placed over the sides of the graphite foil boat leaving a space of about 1 inch (25 mm) between the top of the preform and the graphite foil cap.

The thermal processing was substantially the same as that described in Example 33, except that the initial ramp went directly from ambient temperature to a temperature of about 900° C. at a rate of about 50° C. per hour, without the intermediate dwell at a temperature of about 550° C. as in Example 33. At the conclusion of thermal processing, a ceramic composite body was recovered. A bulk density of about 2.42 grams per cubic centimeter was recorded.

EXAMPLE 46

This Example demonstrates an embodiment of a magnesium oxide reinforced aluminum nitride matrix composite material. This Example also demonstrates, among other things, a graphite powder addition to the starting raw materials.

The raw materials and processing for producing the aluminum nitride matrix composite material of the present example were substantially the same as those employed in Example 45 with the following notable exceptions. Specifically, the 3000 grams of (−28 +48 mesh) magnesium aluminate spinel in the previous example were replaced by an equal amount of fused magnesium oxide particulate (−25+60 mesh, Muscle Shoals, Inc., Muscle Shoals, Ala.) having substantially all particle sizes between about 250 microns and about 710 microns. Further, the 4500 grams of magnesium aluminate spinel in the previous example was replaced by magnesium oxide and graphite. Specifically, this spinel fraction was replaced with about 3500 grams of pulverized, calcined magnesium oxide particulate (−325 mesh, Martin Marietta Magnesia Specialties, Inc., Hunt Valley, Md.) having substantially all particle diameters smaller than about 45 microns, and about 1000 grams of graphite powder (Lonza, Inc., Fair Lawn, N.J.) having an average particle size of about 75 microns. A preform tile measuring about 4 inches (102 mm) square by about 1 inch (25 mm) thick was uniaxially dry pressed to an ultimate pressure of about 5000 psi (35 MPa).

The ceramic composite body recovered from the furnace after thermal processing had a bulk density of about 2.21 grams per cubic centimeter.

EXAMPLE 47

This Example demonstrates the fabrication of an aluminum nitride matrix composite body, specifically a body featuring a graphite and a filler material reinforcement comprising magnesium aluminate spinel.

The raw materials and processing for producing the refractory ceramic composite body of the present example were substantially the same as those described in Example 45 with the following notable exceptions. About 1000 grams of the approximately 4500 grams of the magnesium aluminate spinel fraction having substantially all particles smaller than about 45 microns in diameter was replaced with an approximately 1000 gram quantity of graphite powder (Lonza, Inc.) having an average particle size of about 75 microns. A preform having substantially the same dimensions as in the previous Example was uniaxially dry pressed to substantially the same pressure.

The refractory ceramic composite body recovered from the furnace following thermal processing had a bulk density of about 2.20 grams per cubic centimeter.

EXAMPLE 48

This Example demonstrates the fabrication of an aluminum nitride matrix composite in which the parent metal has been finely divided and admixed with the ceramic filler material reinforcement. This Example furthermore demonstrates the use of a polysilazane-based polymer which serves as a preform binder and additionally as a silicon nitride-based phase to the body upon heating.

The raw materials on the processing employed to produce the aluminum nitride matrix composite material of the present Example were substantially the same as those employed in producing the aluminum nitride matrix composite of Example 33 with the following notable exceptions. First, in place of the binder solution of Example 33, a liquid ceramer solution comprising by weight about 1 percent DI-CUP® diphenyl peroxide (Hercules, Inc., Wilmington, Del.) and the balance CERASET®-SN perceramic polymer (Lanxide Corp., Newark, Del.). The liquid ceramer solution comprised 3 percent of the total weight of the batch. The solids making up the dry pressing batch comprised by weight about 35 percent calcia stabilized zirconia having substantially all particle diameters between about 75 microns and 600 microns (TYK Co., Tokyo, Japan, −28+48 mesh), about 45 percent magnesium aluminate having substantially all particle diameters smaller than about 45 microns (Aluminum Company of America, Pittsburgh, Pa., −325 mesh) and the balance an atomized aluminum alloy comprising by weight about 3 percent strontium, 1 percent silicon, 4 percent nickel and the balance aluminum and having substantially all particle diameters between about 45 microns and about 75 microns in diameter (−200+325 mesh, atomized by Alcan International Ltd., Montreal, Quebec, Canada).

A preform was unaxially dry pressed substantially in accordance with the procedure described in Example 45.

The preform was then thermally processed using a setup substantially as described in Example 45.

The heating cycle and the atmospheric conditions used to thermally process the preform of the present Example were substantially the same as those described in Example 45. A ceramic composite body was recovered from the furnace at a temperature of about 125° C. A bulk density of about 2.76 grams per cubic centimeter was recorded.

These exemplary embodiments described in detail above describe the utility of the present invention and should not be construed as limiting the scope of the invention as defined in the appended claims. Numerous combinations and variations other than those exemplified are within the purview of the artisan of ordinary skill.

What is claimed is:

1. A method for producing a self-supporting ceramic composite structure comprising (1) a ceramic matrix obtained by oxidation of a parent metal with an oxidant comprising a nitrogen-containing gas to form a polycrystalline material comprising an oxidation reaction product of said parent metal; and (2) at least one filler embedded by said matrix, the method comprising the steps of:

(a) providing a permeable mass comprising at least one filler material, at least one dopant, at least one oxidant and at least one parent metal comprising a plurality of discrete, finely divided bodies dispersed among said at least one filler material and contacting at least said oxidant;

(b) heating said permeable mass to a temperature above the melting point of said parent metal but below the melting point of said oxidation reaction product to render said parent metal molten;

(c) reacting the molten parent metal with said oxidant comprising a nitrogen-containing gas at said temperature to form said oxidation reaction product comprising a nitride of said parent metal, and at said temperature maintaining at least a portion of said oxidation reaction product in contact with and extending between said molten parent metal and said oxidant, to draw molten metal through the oxidation reaction product towards the oxidant so that fresh oxidation reaction product continues to form within the permeable mass at an interface between the oxidant and previously formed oxidation reaction product, thereby (1) developing said polycrystalline material and (2) forming a void at each site at which a finely divided parent metal body has oxidized; and (d) continuing said reacting for a time sufficient to enable the developing polycrystalline material to form an at least partially interconnected structure which embeds at least a portion of said at least one filler material.

2. The method of claim 1, wherein said parent metal comprises aluminum and said oxidation reaction product comprises aluminum nitride.

3. The method of claim 1, wherein said oxidant comprising said nitrogen-containing gas comprises elemental nitrogen.

4. The method of claim 1, wherein said filler material comprises at least one material selected from the group consisting of magnesium oxide, magnesium aluminate spinel and zirconium dioxide.

5. The method of claim 1, wherein said permeable mass comprises a substantially homogeneous admixture.

6. The method of claim 2, wherein said temperature is at least about 700° C.

7. The method of claim 1, wherein said permeable mass comprises a self-supporting preform.

8. The method of claim 7, wherein said preform comprises a preceramic polymer, and wherein further said preform is fabricated by dry pressing.

9. The method of claim 1, wherein said at least one filler material comprises by volume from about 35 percent to about 85 percent of said body.

10. The method of claim 1, wherein said plurality of finely divided parent metal bodies range in size from about 15 microns to about 300 microns.

11. The method of claim 1, wherein said permeable mass further comprises silicon nitride.

12. The method of claim 1, wherein said oxidation reaction product comprises aluminum nitride, and further wherein said void replicates at least a portion of the geometry of said finely divided parent metal body.

13. The method of claim 1, wherein said permeable mass further comprises graphite.

14. The method of claim 1, wherein said at least one filler material comprises a plurality of bodies having a size ranging from about 25 microns to about 4,000 microns.

15. The method of claim 1, wherein a phase comprising said void makes up by volume about 15 percent to about 55 percent of said self-supporting ceramic composite structure.

16. The method of claim 1, wherein said at least one oxidant comprises at least one solid oxidant or liquid oxidant.

17. The method of claim 16, wherein said oxidant comprises at least one oxidant selected from the group consisting of silicon nitride, silicon dioxide and boron.

18. The method of claim 1, wherein said parent metal comprises at least one metal selected from the group consisting of aluminum, silicon, hafnium, zirconium and titanium.

19. The method of claim 1, further comprising providing an inert gas to said nitrogen-containing gas.

20. A method for producing a self-supporting ceramic composite structure comprising (1) a ceramic matrix obtained by oxidation of a parent metal with an oxidant comprising a nitrogen-containing gas and at least one reducible compound to form a polycrystalline material comprising at least one oxidation reaction product; and (2) at least one filler embedded by said matrix, the method comprising the steps of:

(a) providing a permeable mass comprising at least one filler material, at least one dopant, an oxidant and a parent metal comprising a plurality of discrete, finely divided bodies dispersed among said at least one filler material and contacting at least said oxidant;

(b) heating said permeable mass to a first temperature above the melting point of said parent metal but below the melting point of said oxidation reaction product to render said parent metal molten;

(c) at said first temperature, reacting a portion of said molten parent metal with said at least one reducible compound to form a first oxidation reaction product and at least one reduced species of said at least one reducible compound;

(d) heating said permeable mass to a second temperature above said first temperature, and at said second temperature reacting a residual portion of said molten parent metal with said nitrogen-containing gas to form a second oxidation reaction product comprising a nitride of said parent metal, and at said second temperature maintaining at least portion of said second oxidation reaction product in contact with and extending between said molten parent metal and said nitrogen-containing gas, to draw molten metal through the second oxidation reaction product towards the nitrogen-containing gas so that fresh oxidation reaction product continues to form within the permeable mass at an interface between the nitrogen-containing gas and previously formed second oxidation reaction product, thereby forming a void at each site at which a finely divided parent metal body has oxidized and also thereby developing said polycrystalline material; and (e) continuing said reacting for a time sufficient to enable the developing polycrystalline material to form an at least partially interconnected structure which embeds at least a portion of said at least one filler material.

21. The method of claim 20, wherein each of said first oxidation reaction product and said second oxidation reaction product comprises aluminum nitride.

* * * * *